(12) United States Patent
Sun

(10) Patent No.: US 10,630,910 B1
(45) Date of Patent: Apr. 21, 2020

(54) IMAGE PROCESSING APPARATUS

(71) Applicant: Keyence Corporation, Osaka (JP)

(72) Inventor: Zhuoli Sun, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 16/727,964

(22) Filed: Dec. 27, 2019

(30) Foreign Application Priority Data

Feb. 15, 2019 (JP) ................................. 2019-025743

(51) Int. Cl.
*H04N 5/235* (2006.01)
*G01B 9/02* (2006.01)
*H05B 45/20* (2020.01)
*G02F 1/13357* (2006.01)

(52) U.S. Cl.
CPC ......... *H04N 5/2354* (2013.01); *G01B 9/0203* (2013.01); *G02F 1/133603* (2013.01); *H05B 45/20* (2020.01)

(58) Field of Classification Search
CPC ......... H04N 21/2393; H04N 21/44218; H04N 21/4722; H04N 2201/0013; H04N 2201/0089; H04N 2201/3242; H04N 2201/3261; H04N 2201/3264; H04N 5/7755; H04N 13/122; H04N 13/31; H04N 13/317; H04N 13/327; H04N 13/349; H04N 13/359; H04N 13/361; H04N 2213/001; G09G 2320/0626; H05B 45/20; H05B 45/37; H05B 45/24; H05B 45/40; H05B 47/105; H05B 47/16

See application file for complete search history.

(56) References Cited

U.S. PATENT DOCUMENTS

2005/0030525 A1 * 2/2005 Forster ............... G01B 11/2755
356/139.09
2019/0293409 A1 9/2019 Matsuda et al.

FOREIGN PATENT DOCUMENTS

JP 4011561 B2 11/2007
JP 2019168286 A 10/2019

OTHER PUBLICATIONS

U.S. Appl. No. 16/727,962, filed Dec. 27, 2019 (175 pages).
U.S. Appl. No. 16/727,965, filed Dec. 27, 2019 (192 pages).

* cited by examiner

*Primary Examiner* — Wei (Victor) Y Chan
(74) *Attorney, Agent, or Firm* — Kilyk & Bowersox, P.L.L.C.

(57) ABSTRACT

To make it possible to generate sinusoidal pattern light as intended and to prevent the occurrence of high-frequency waviness in a height image even if a dimension of a light emitting surface of a light emitting diode is equal to or less than a dimension of a half cycle of a sine-wave. The dimension of the light emitting surface of the light emitting diode 31*b* is set to be equal to or less than a half cycle of a sine-wave of the pattern light. A plurality of light emitting diodes 31*b* are arranged in a direction in which illuminance of the pattern light does not change, and are arranged to be deviated in a direction in which the illuminance of the pattern light changes.

9 Claims, 29 Drawing Sheets

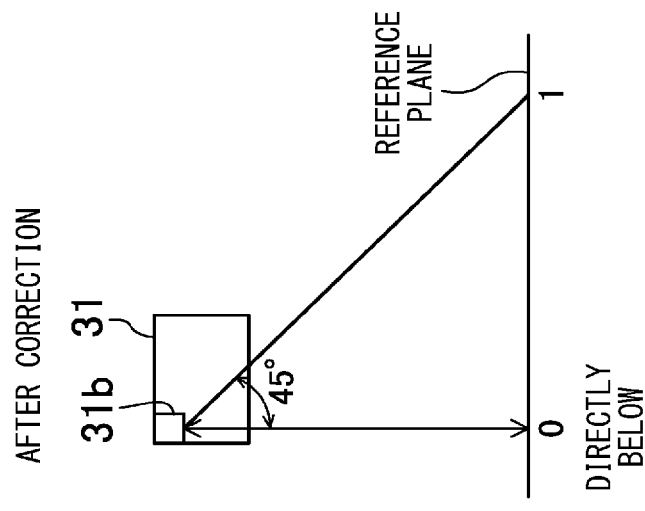
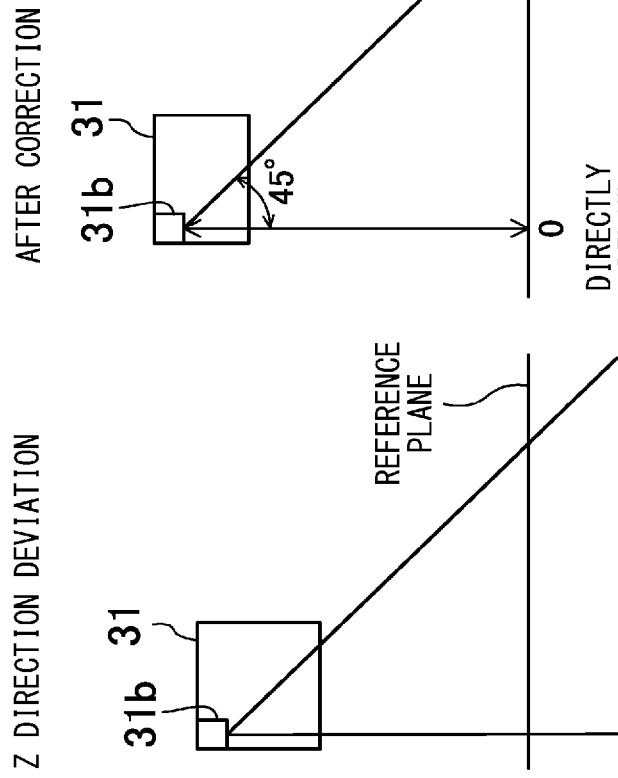
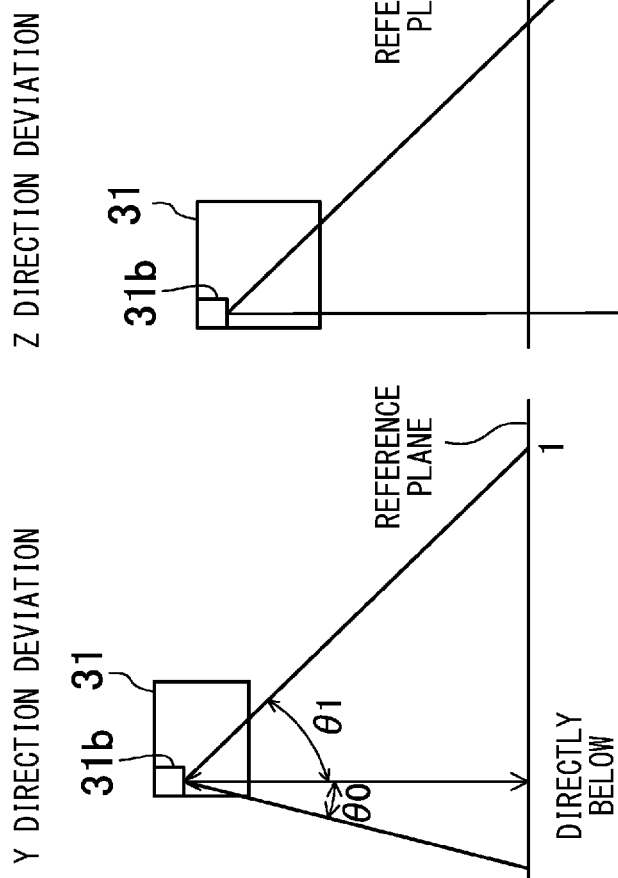

FIG. 25A

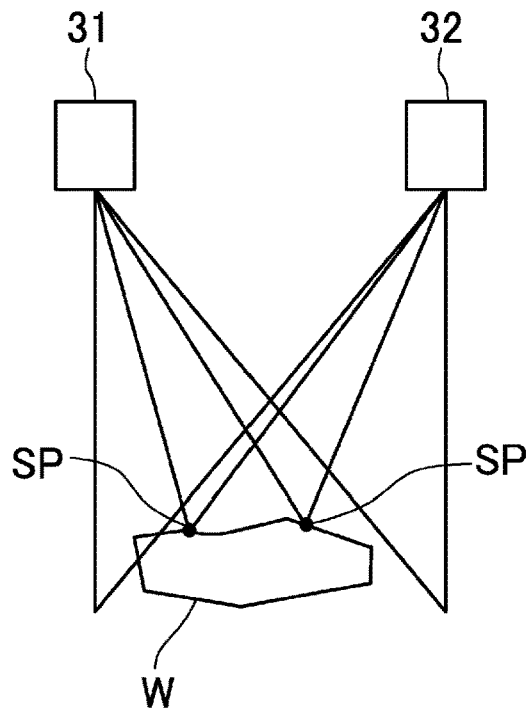

FIG. 25B

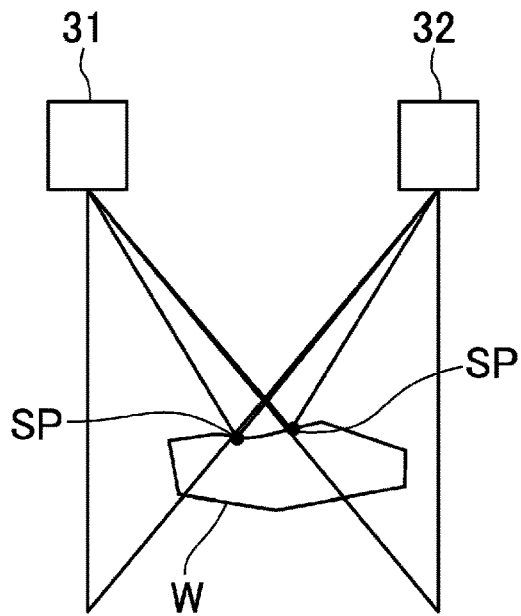

FIG. 26

CAMERA PARAMETER MATRIX $$h \begin{bmatrix} x \\ y \\ 1 \end{bmatrix} = \underbrace{\begin{bmatrix} 1 & s & t_x \\ 0 & a & t_y \\ 0 & 0 & 1 \end{bmatrix} \begin{bmatrix} f & 0 & 0 & 0 \\ 0 & f & 0 & 0 \\ 0 & 0 & 1 & 0 \end{bmatrix}}_{\text{CAMERA INTERNAL PARAMETER}} \underbrace{\begin{bmatrix} \overbrace{r_{11} \quad r_{12} \quad r_{13}}^{R} & \overbrace{t_x}^{T} \\ r_{21} \quad r_{22} \quad r_{23} & t_y \\ r_{31} \quad r_{32} \quad r_{33} & t_z \\ 0 \quad 0 \quad 0 & 1 \end{bmatrix}}_{\text{CAMERA EXTERNAL PARAMETER}} \begin{bmatrix} X \\ Y \\ Z \\ 1 \end{bmatrix}$$

DISTORTION MODEL $\bar{u} = u + (u - c_x) \cdot [\kappa_1 \cdot r^2 + \kappa_2 \cdot r^4 + 2\rho_1 y + \rho_2(r^2/x + 2x)],$ $\bar{v} = v + (v - c_y) \cdot [\kappa_1 \cdot r^2 + \kappa_2 \cdot r^4 + 2\rho_2 x + \rho_1(r^2/y + 2y)],$ $r^2 = x^2 + y^2.$

MEASURING OBJECT: RECTANGULAR PARALLELEPIPED BOX

PHASE SHIFT PATTERN IMAGE

FIRST LED
FIRST LCD

MEASURING OBJECT: RECTANGULAR PARALLELEPIPED BOX
PHASE SHIFT PATTERN IMAGE
SECOND LED
SECOND LCD

FIG. 35
PHASE IMAGE
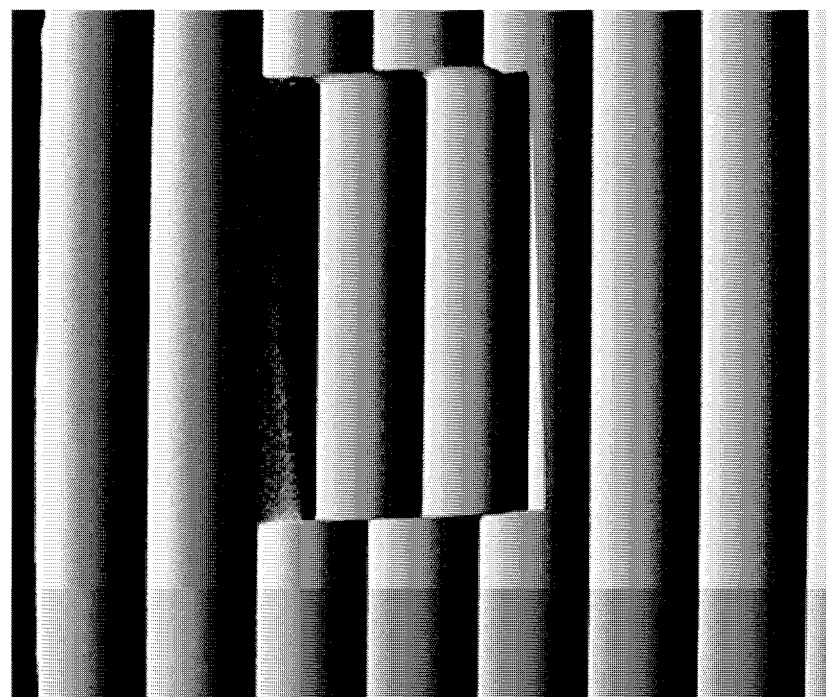
INTERMEDIATE IMAGE (ABSOLUTE PHASE IMAGE)
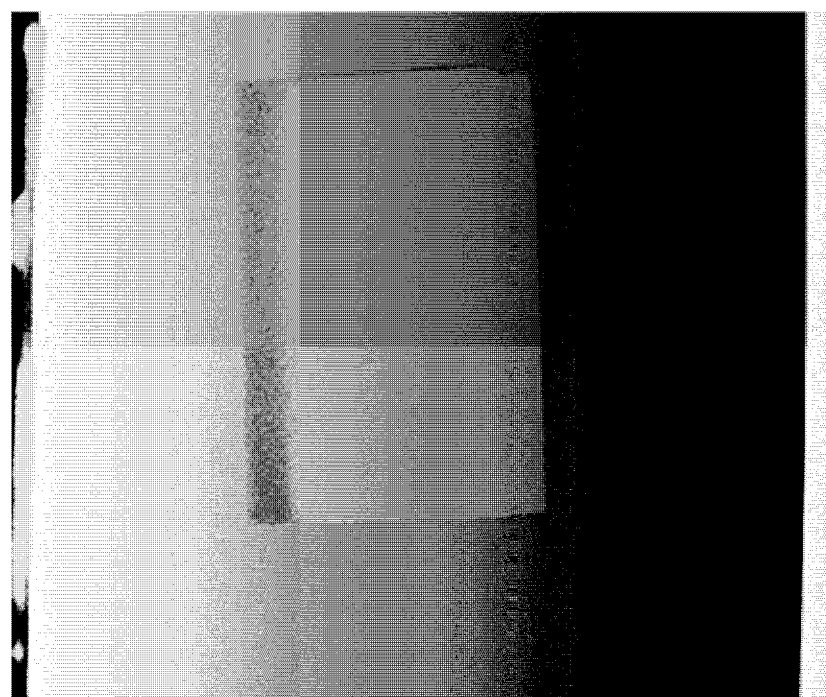

FIG. 36
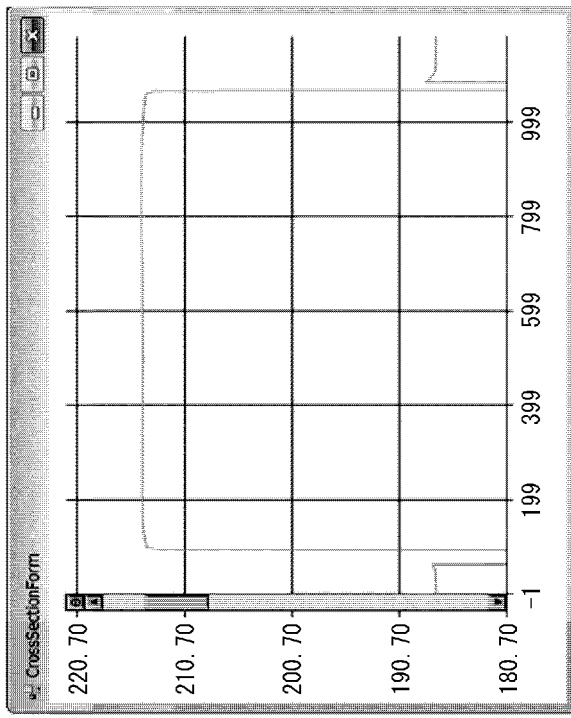
CROSS-SECTION PROFILE
MEASURING OBJECT: RECTANGULAR PARALLELEPIPED BOX
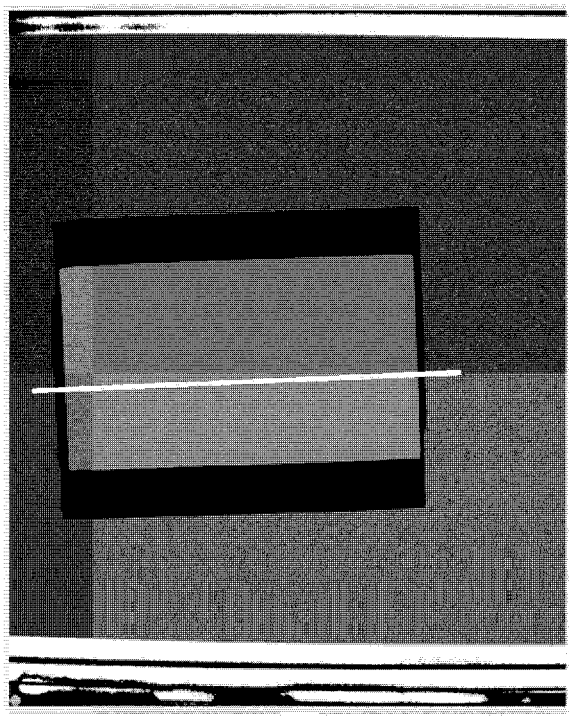
HEIGHT IMAGE

IMAGE PROCESSING APPARATUS

CROSS-REFERENCE TO RELATED APPLICATIONS

The present application claims foreign priority based on Japanese Patent Application No. 2019-025743, filed Feb. 15, 2019, the contents of which is incorporated herein by reference.

BACKGROUND OF THE INVENTION

1. Field of the Invention

The present invention relates to an image processing apparatus including an illumination device which illuminates a measuring object and an imaging device which receives light reflected from the measuring object, and particularly pertains to a technical field of a structure capable of acquiring a three-dimensional shape of the measuring object.

2. Description of Related Art

Conventionally, as this kind of image processing apparatus, it has been known a so-called pattern projection method of projecting pattern light having different light intensity distributions depending on positions onto a measuring object to receive light reflected from the measuring object and acquiring a three-dimensional shape of the measuring object using height information obtained based on a received light amount. As the pattern projection method, there is a phase shift method of projecting pattern light with varying illuminance distribution in a sinusoidal pattern a plurality of times with different phases and imaging each time.

Japanese Patent No. 4,011,561 discloses an illumination device which generates and projects pattern light, where the illumination device includes a light source, a light condensing lens which condenses light emitted from the light source, and a liquid crystal panel onto which light focused by the light condensing lens is incident, and the illumination device is configured to project a pattern formed on the liquid crystal panel onto a measuring object.

A light emitting diode is generally used as the light source. Specifically, in order to generate pattern light in which illuminance distribution is sinusoidally changed, a portion that transmits light and a portion that does not transmit light are alternately formed on a display surface of a liquid crystal panel, and light emitted from the light emitting diode arranged away from the display surface is made incident on the display surface.

The light incident on the display surface passes through the portion that transmits light on the display surface and reaches a measuring object, and is blocked at the portion that does not transmit light on the display surface and does not reach the measuring object. As such, pattern light having an illuminance distribution is generated on the measuring object by the portion that transmits light and the portion that does not transmit light formed on the display surface of the liquid crystal panel.

However, as a result of an experiment conducted by inventors of the present application, when a dimension of a light emitting surface of the light emitting diode is equal to or less than a dimension of the portion that transmits light, that is, a dimension of a half cycle of a wave, formed on the display surface of the liquid crystal panel, the pattern light may not have a proper sinusoidal illuminance distribution in cases. In the case where sinusoidal pattern light is not properly generated, when a height image is obtained by image processing, high-frequency waviness may occur in the height image, that is, a wavy line which is actually a flat surface may be formed, and this becomes an obstacle to inspection.

In this respect, it is conceivable to select a light emitting diode having such a size that the dimension of the light emitting surface of the light emitting diode is larger than the dimension of the half cycle of the wave. However, the size of the generally available light emitting diode is limited, and the dimension of the light emitting surface cannot be freely set. As a result, a light emitting diode in which the dimension of the light emitting surface is equal to or less than the dimension of the half cycle of the wave may have to be used.

SUMMARY OF THE INVENTION

The invention has been made in view of such a point, and an object of the invention is to make it possible to generate wave-shaped pattern light as intended and to prevent the occurrence of high-frequency waviness in a height image even if a dimension of a light emitting surface of alight emitting diode is equal to or less than a dimension of a half cycle of a sine-wave.

In order to achieve the object, in a first invention, an image processing apparatus which measures a height of a measuring object includes an illumination device including a light source including a plurality of light emitting diodes, a liquid crystal panel onto which light emitted from the light source is incident, and a light projection control section which controls the light source and the liquid crystal panel such that a sinusoidal pattern light whose illuminance changes in one direction is projected a plurality of times onto the measuring object by shifting the phase of the pattern light, an imaging device which receives reflected light from the measuring object of the pattern light projected from the liquid crystal panel and generates a pattern image set, an inspection target image generating section which generates an inspection target image including height information of the measuring object in a central axis direction of the illumination device based on the pattern image set generated by the imaging device, and an inspecting section which executes inspection processing based on the inspection target image generated by the inspection target image generating section, a dimension of light emitting surfaces of the light emitting diodes in a direction parallel to the direction in which the illuminance of the pattern light changes is set to be equal to or less than a dimension of a half cycle of the sine-wave formed in the liquid crystal panel, and the plurality of light emitting diodes are arranged in a direction in which the illuminance of the pattern light does not change, and are deviated from each other in a direction in which the illuminance of the pattern light changes.

According to this configuration, in order to generate sinusoidal pattern light, a portion that transmits light and a portion that does not transmit light emitted from the light source are alternately formed on the display surface of the liquid crystal panel by the light projection control section. The light incident on the display surface of the liquid crystal panel passes through the portion that transmits light on the display surface and reaches the measuring object, and is blocked at the portion that does not transmit light on the display surface and does not reach the measuring object. As such, sinusoidal pattern light is projected onto the measuring object.

As described above, generally, the dimension of the light emitting surface of the light emitting diode cannot be freely set, and thus the dimension of the light emitting surface of the light emitting diode may be equal to or less than the dimension of a half cycle of a sine-wave. In such a case, there is a concern that high-frequency waviness will occur in an inspection target image.

In this respect, in the present configuration, the plurality of light emitting diodes included in the light source are arranged to be deviated in the direction in which the illuminance of the pattern light changes. Since the direction in which the illuminance of the pattern light changes is a direction in which the sine-wave is continuous, when the light emitting surfaces of the plurality of light emitting diodes are combined, they become a light emitting surface whose size is larger than the dimension of a half cycle of a sine-wave formed on the liquid crystal panel. As a result, the apparent dimension of the light emitting surfaces is longer than the dimension of the half cycle of the sine-wave formed on the liquid crystal panel, and thus high-frequency waviness is less likely to occur in the inspection target image obtained after image processing.

In a second invention, the plurality of light emitting diodes are arranged such that a center of the light emitting surfaces is positioned within a predetermined range in a direction in which the illuminance of the pattern light changes, the plurality of light emitting diodes include a one-end light emitting diode, a center of the light emitting surface of which is positioned at one end of the predetermined range, and an other-end light emitting diode, a center of the light emitting surface of which is positioned at the other end of the predetermined range.

That is, when a predetermined range in a direction in which the illuminance of the pattern light changes is defined, among the plurality of light emitting diodes, a center of a light emitting surface of at least one light emitting diode is arranged at one end of the predetermined range, and a center of a light emitting surface of at least another light emitting diode is arranged at the other end of the predetermined range. In this way, the light emitting diodes are arranged in at least two stages, and the apparent dimension of the light emitting surface is longer than the dimension of a half cycle of a wave formed on the liquid crystal panel.

In a third invention, the plurality of light emitting diodes include an intermediate light emitting diode, a center of the light emitting surface of which is positioned in a middle of the predetermined range.

According to this configuration, a center of a light emitting surface of a light emitting diode is arranged between one end and the other end of the predetermined range. As a result, the light emitting diodes are arranged in at least three stages, and unevenness of light intensity is less likely to occur.

In a fourth invention, the plurality of intermediate light emitting diodes are arranged so as to be deviated in a direction in which the illuminance of the pattern light changes.

According to this configuration, since the light emitting diodes are arranged in a plurality of stages within the predetermined range, the unevenness of light intensity within the predetermined range becomes smaller. As a result, it is possible to avoid doubling of the wave of the pattern light.

In a fifth invention, the plurality of intermediate light emitting diodes are arranged in a direction in which the illuminance of the pattern light does not change, and are arranged such that the centers of the light emitting surfaces are deviated in multiple stages from a vicinity of one end to a vicinity of the other end of the predetermined range.

According to this configuration, the unevenness of light intensity within the predetermined range can be further reduced.

In a sixth invention, the light projection control section causes, when generating the pattern light, a region that transmits light and a region that does not transmit light to be alternately formed on the liquid crystal panel with a same width in a direction in which the sine-wave is continuous, and a dimension of the light emitting surfaces of the light emitting diodes in the direction in which the sine-wave is continuous is set to be equal to or less than a width of the region that does not transmit light.

That is, the sinusoidal pattern light is generated by alternately forming a region that transmits light and a region that does not transmit light on the liquid crystal panel with a same width. The width of the region that transmits light corresponds to a half cycle of a sine-wave, and the width of the region that does not transmit light also corresponds to a half cycle of a sine-wave.

In a seventh invention, a ratio between the dimension of the half cycle of the sine-wave formed on the liquid crystal panel and the dimension in the direction in which the sine-wave is continuous on the apparent light emitting surfaces of the plurality of light emitting diodes is set within a range of 1:1.2 to 1:1.4.

According to this configuration, high-frequency waviness further becomes less likely to occur in the inspection target image by setting the ratio between the dimension of the half cycle of the sine-wave and the dimension of the light emitting surfaces of the light emitting diodes to the aforementioned range.

In an eighth invention, an image processing apparatus which measures a height of a measuring object includes an illumination device including a light source including a plurality of light emitting diodes, a liquid crystal panel onto which light emitted from the light source is incident, and a light projection control section which controls the light source and the liquid crystal panel such that a sinusoidal pattern light whose illuminance changes in one direction is projected a plurality of times onto the measuring object by shifting the phase of the pattern light, an imaging device which receives reflected light from the measuring object of the pattern light projected from the liquid crystal panel and generates a pattern image set, an inspection target image generating section which generates an inspection target image including height information of the measuring object in a central axis direction of the illumination device based on the pattern image set generated by the imaging device, and an inspecting section which executes inspection processing based on the inspection target image generated by the inspection target image generating section, a dimension of light emitting surfaces of the light emitting diodes in a direction parallel to the direction in which the illuminance of the pattern light changes is set to be equal to or less than a dimension of a half cycle of the sine-wave, and a diffusing unit that diffuses light emitted from the light emitting surfaces and makes the light incident on the liquid crystal panel is provided between the light emitting surfaces of the light emitting diodes and the liquid crystal panel.

According to this configuration, the light emitted from the light emitting surfaces of the light emitting diodes is diffused by the diffusing unit and is then incident on the liquid crystal panel. As a result, even when the dimension of the light emitting surfaces of the light emitting diodes is equal to or less than the dimension of the half cycle of the sine-wave, an incident mode of light to the liquid crystal panel becomes an incident mode in which the dimension of the light emitting surfaces is longer than the dimension of the half cycle of the sine-wave. Therefore, high-frequency waviness is less likely to occur in the inspection target image.

In a ninth invention, the diffusing unit is a diffusing plate or a diffusing lens.

According to this configuration, light incident on the diffusing plate or the diffusing lens is diffracted and/or refracted by the diffusing plate or the diffusing lens, and thus can be diffused at a certain angle and incident on the liquid crystal panel.

According to the invention, when the dimension of the light emitting surfaces of the light emitting diodes is equal to or less than the dimension of a half cycle of a sine-wave, the plurality of light emitting diodes are arranged so as to be deviated in a direction in which the illuminance of the pattern light changes. Therefore, the apparent dimension of the light emitting surfaces can be made longer than the dimension of the half cycle of the sine-wave. As a result, sinusoidal pattern light can be generated as intended, and high-frequency waviness can be prevented from occurring in a height image.

BRIEF DESCRIPTION OF THE DRAWINGS

FIGS. 19A-C are diagrams showing positions of a light emitting diode before correction and after correction;

FIGS. 25A and B are schematic diagrams showing a state of setting camera parameters by changing a height of a measuring object;

FIG. 26 is a diagram showing mathematical formulae of a camera parameter matrix and a distortion model;

FIG. 35 is a diagram showing a relative phase image obtained based on the phase shift pattern image set shown in FIG. 34, and an intermediate image corresponding to the phase shift pattern image set shown in FIG. 34; and FIG. 36 is a diagram showing a user interface displaying a height image and a section profile when a measuring object is a rectangular parallelepiped box.

DESCRIPTION OF EMBODIMENTS

Embodiments of the invention will be described in detail below with reference to the drawings. The following description of preferred embodiments is merely illustrative in nature and is not intended to limit the invention, its application, or its use.

Figure 1:
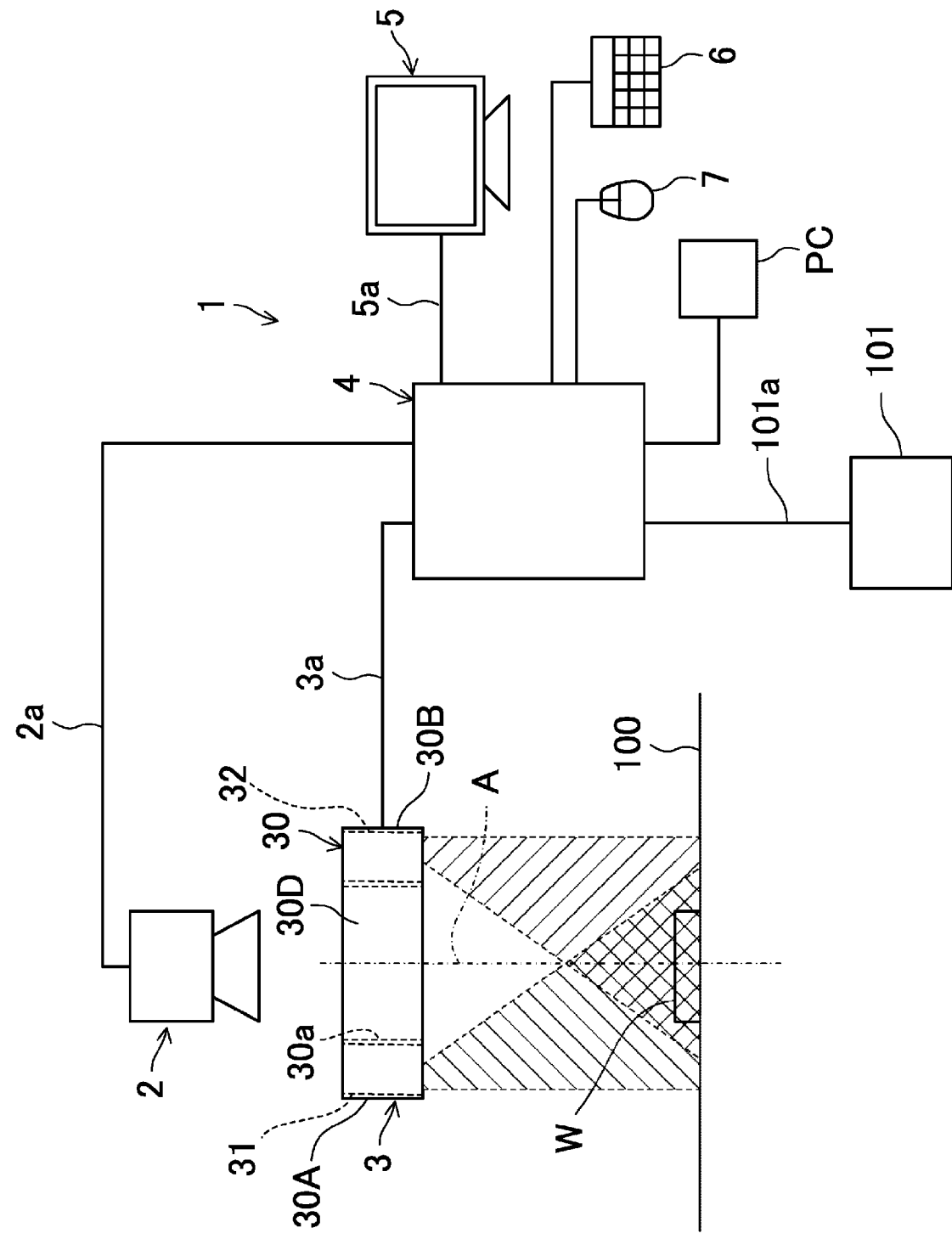
FIG. 1 is a diagram showing a system configuration example of an image processing apparatus according to an embodiment of the invention.

FIG. 1 is a diagram showing a system configuration example of an image processing apparatus 1 according to an embodiment of the invention. The image processing apparatus 1 includes an imaging device 2, an illumination device 3, a controller section 4, a display section 5, a console section 6, and a mouse 7, and is configured to be able to obtain a height image of a measuring object W to measure the height of the measuring object W based on the height image, and to perform various inspections on the measuring object W.

The measuring object W is in a state where it is placed on a placement surface 100 of a conveying device such as a belt conveyor, and performs height measurement and various inspections, etc. on the measuring object W placed on the placement surface 100. The measuring object W is preferably kept stationary during the height measurement.

The image processing apparatus 1 can be wire-connected to a programmable logic controller (PLC) 101 through a signal line 101*a*. However, it is not limited thereto, and it is also possible that a conventionally known communication module is incorporated in the image processing apparatus 1 and the PLC 101, and the image processing apparatus 1 and the PLC 101 are connected wirelessly. The PLC 101 is a control apparatus for performing sequence control of the conveying device and the image processing apparatus 1, and a general-purpose PLC can be used. The image processing apparatus 1 can also be used without being connected to the PLC 101.

The display section 5 is a display device including, for example, a liquid crystal display panel, and constitutes a display unit. The display section 5 can display, for example, a user interface for operation that is for operating the image processing apparatus 1, a user interface for setting that is for setting the image processing apparatus 1, a user interface for height measurement result display that is for displaying a height measurement result of a measuring object, a user interface for inspection result display that is for displaying various inspection results of the measuring object, etc. By visually recognizing the display section 5, a user of the image processing apparatus 1 can perform the operation and setting of the image processing apparatus 1, can also grasp measurement results, inspection results and the like of the measuring object W, and can further grasp an operating state of the image processing apparatus 1.

Figure 2:
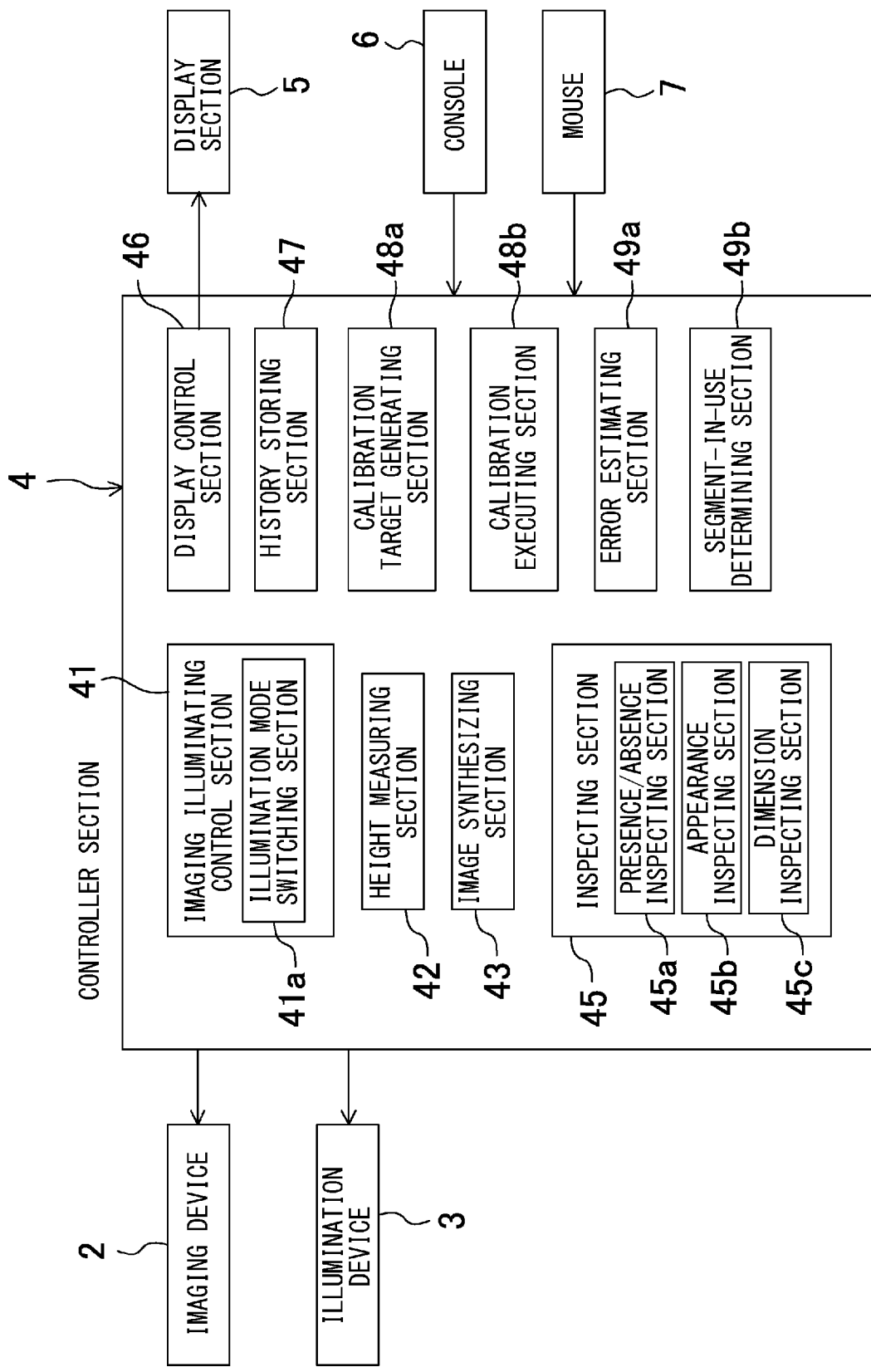
FIG. 2 is a block diagram of a controller section.

As shown in FIG. 2, the display section 5 is connected to a display control section 46 included in the controller section 4, and is configured to be able to be controlled by the display control section 46 to display the aforementioned user interfaces, height image, and the like.

The console section 6 is an input unit for a user to operate the image processing apparatus 1 and input various kinds of information, and the console section 6 is connected to the controller section 4. The mouse 7 is also an input unit for the user to operate the image processing apparatus 1 and input various kinds of information, and the mouse 7 is also connected to the controller section 4. The console section 6 and the mouse 7 are merely examples of input units, and the input unit may be, for example, a touch panel screen and the like provided in the display section 5, or a voice input device, or a configuration combining a plurality of them. In the case of a touch panel screen, the display unit and the input unit can be realized by one device.

The controller section 4 may be connected with a genera-purpose personal computer PC for generating and storing a control program of the controller section 4. Further, an image processing program that performs various settings relating to image processing can be installed in the personal computer PC and various settings of image processing performed by the controller section 4 can be performed. Alternatively, a processing order program that defines a processing order of image processing can be generated by software which operates on the personal computer PC. Image processing is sequentially executed according to the processing order at the controller section 4. The personal computer PC and the controller section 4 are connected via a communication network, and the processing order program generated on the personal computer PC is transferred to the controller section 4 together with, for example, layout information that defines a display mode of the display section 5. Conversely, it is also possible to read the processing order program, layout information, etc. from the controller section 4 and edit on the personal computer PC. The program may be generated not only on the personal computer PC but also in the controller section 4.

The controller section 4 can also be constructed with dedicated hardware. However, the invention is not limited to this configuration. For example, it may be a general-purpose personal computer PC or workstation in which dedicated image processing program, inspection processing program, height measuring program, etc. are installed and which functions as a controller section. In this case, it is only necessary to connect the imaging device 2, the illumination device 3, the display section 5, the console section 6, and the mouse 7 to the personal computer PC or the workstation.

Although the functions of the image processing apparatus 1 will be described later, it is possible to realize all functions of the image processing apparatus 1 by the controller section 4 or by the general-purpose personal computer PC. In addition, it is also possible to realize a part of the functions of the image processing apparatus 1 by the controller section 4 and realize the remaining functions by the general-purpose personal computer PC. The functions of the image processing apparatus 1 can be realized by software or by a combination of hardware.

An interface for connecting the imaging device 2, the illumination device 3, the display section 5, the console section 6, and the mouse 7 to the controller section 4 may be a dedicated interface, and for example, an existing communication standard such as Ethernet (product name), USB, and RS-232C may also be used.

Figure 4:
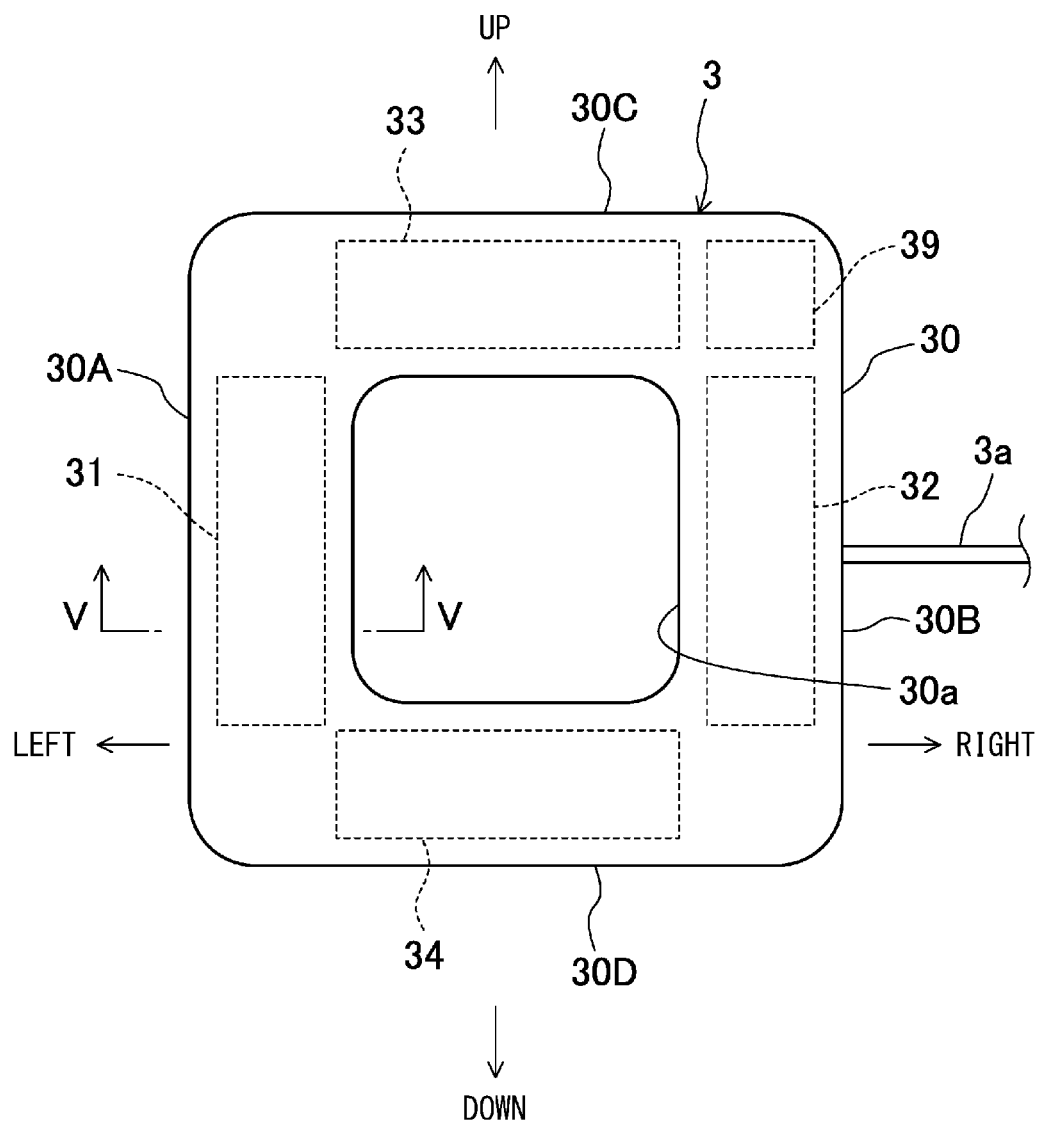
FIG. 4 is a plane view of an illumination device.

The height image representing the height of the measuring object W is an image representing the height of the measuring object W in a direction of a central axis A (shown in FIG. 1) of an opening 30*a* of the illumination device 3 shown in FIG. 4, and it may be referred to as a distance image. The height image can be displayed as a height with reference to the placement surface (also referred to as a reference plane) 100 of the measuring object W, or be displayed as a relative distance in the direction of the central axis A with respect to the illumination device 3, and it is an image in which a gray value of each pixel changes according to the height. In other words, the height image can be referred to as an image in which the gray value is determined based on a height with reference to the placement surface 100 of the measuring object W, and can also be referred to as an image in which the gray value is determined based on a relative distance in the direction of the central axis A with respect to the illumination device 3. Moreover, the height image can be referred to as a multi-value image having gray values corresponding to the height with reference to the placement surface 100 of the measuring object W, and can also be referred to as a multi-value image having gray values corresponding to the relative distance in the direction of the central axis A with respect to the illumination device 3. Further, the height image can be referred to as a multi-value image in which the height with reference to the placement surface 100 of the measuring object W has been converted into a gray value for each pixel of a luminance image, and can also be referred to as a multi-value image in which the relative distance in the direction of the central axis A with respect to the illumination device 3 has been converted into a gray value for each pixel of a luminance image.

Further, the height image is an image including the height information of the measuring object W. For example, a three-dimensional synthesized image in which an optical luminance image has been synthesized and attached to a distance image as texture information can be used as a height image. The height image is not limited to an image displayed in a three-dimensional form, and also includes an image displayed in a two-dimensional form.

As a method for obtaining the height image as described above, it can be generally divided into two types. One is a passive method (passive measurement method) of generating a distance image using an image captured under an illumination condition for obtaining a normal image, and the other is an active method (active measurement method) of generating a distance image by actively irradiating the measuring object W with light for measurement in the height direction. The present embodiment uses the active method to obtain a height image, and specifically uses a pattern projection method.

The pattern projection method is a method of obtaining a three-dimensional shape of the measuring object W by shifting the shape and phase of a pattern of measurement pattern light (also simply referred to as pattern light) projected onto the measuring object W to acquire a plurality of images and analyzing the acquired plurality of images. There are several types of pattern projection methods. For example, there is a phase shift method of shifting the phase of a sine-wave striped pattern to acquire a plurality of (at least three) images, obtaining a phase of a sine-wave for each pixel from the plurality of images, and obtaining a three-dimensional coordinate of the surface of the measuring object W using the obtained phase. There is also a space encoding method of making the pattern projected onto the measuring object W different for each imaging, sequentially projecting a striped pattern with, for example, a black and white duty ratio of 50% and a stripe width which becomes smaller from ½, ¼, ⅛, 16/1, . . . of the full width, acquiring a pattern projection image for each pattern, and obtaining an absolute phase of the height of the measuring object W. The sinusoidal pattern light and the striped pattern light are pattern lights having a periodic illuminance distribution that changes in a one-dimensional direction. Note that "projecting" the measurement pattern light onto the measuring object W is synonymous with "irradiating" the measuring object W with the measurement pattern light.

In the image processing apparatus 1 according to the embodiment, a height image is generated by combining the aforementioned phase shift method and the space encoding method. However, it is not limited thereto, and the height image may be generated only by the phase shift method or only by the space encoding method. In addition, the height image of the measuring object W may be generated using another conventionally known active method.

The outline of the method for measuring the height of the measuring object W by the image processing apparatus 1 is as follows. First, the measuring object W is irradiated with a first measurement pattern light and a second measurement pattern light generated respectively by a first light projecting section 31 and a second light projecting section 32 of the illumination device 3 from different directions. The imaging device 2 receives the first measurement pattern light reflected from the measuring object W and generates a first pattern image set including a plurality of first pattern images, and the imaging device 2 also receives the second measurement pattern light reflected from the measuring object W and generates a second pattern image set including a plurality of second pattern images. Then, a first angle image in which each pixel has irradiation angle information of the first measurement pattern light onto the measuring object W is generated based on the plurality of first pattern images, and a second angle image in which each pixel has irradiation angle information of the second measurement pattern light onto the measuring object W is generated based on the plurality of second pattern images. Next, a height image representing the height of the measuring object W is generated according to the irradiation angle information of each pixel of the first angle image and the irradiation angle information of each pixel of the second angle image, as well as relative position information of the first light projecting section 31 and the second light projecting section 32, and the height of the measuring object W is obtained from the height image.

Although not essential, as shown in FIG. 4, in the image processing apparatus 1, the illumination device 3 includes a third light projecting section 33 and a fourth light projecting 34 in addition to the first light projecting section 31 and the second light projecting section 32. As a result, it is also possible to irradiate the measuring object W with a third measurement pattern light and a fourth measurement pattern light generated respectively by the third light projecting section 33 and the fourth light projecting section 34 of the illumination device 3 from different directions. In this case, the imaging device 2 receives the third measurement pattern light reflected from the measuring object W and generates a third pattern image set including a plurality of third pattern images, and the imaging device 2 also receives the fourth measurement pattern light reflected from the measuring object W and generates a fourth pattern image set including a plurality of fourth pattern images. Then, a third angle image in which each pixel has irradiation angle information of the third measurement pattern light onto the measuring object W is generated based on the plurality of third pattern images, and a fourth angle image in which each pixel has irradiation angle information of the fourth measurement pattern light onto the measuring object W is generated based on the plurality of fourth pattern images. Next, a height image representing the height of the measuring object W is generated according to the irradiation angle information of each pixel of the third angle image and the irradiation angle information of each pixel of the fourth angle image, as well as relative position information of the third light projecting section 33 and the fourth light projecting section 34, and the height of the measuring object W is obtained from the height image.

(Phase Shift Method)

The phase shift method will be described herein. In the phase shift method, when pattern light having patterns in which the illuminance distribution is sinusoidally changed is sequentially projected onto the measuring object W, pattern light having three or more patterns having different sine-wave phases is projected. Each brightness value at a height measurement point is obtained from an image captured for each pattern from an angle different from the projecting direction of the pattern light, and a phase value of the pattern light is calculated from each brightness value. The phase of the pattern light projected on the measurement point changes according to the height of the measurement point, and light with a phase different from a phase observed by the pattern light reflected at a reference position is to be observed. Therefore, the phase of the pattern light at the measurement point is calculated, and the height of the measurement point is measured by substituting the phase into a geometric relational expression using a principle of triangulation. In this way, the three-dimensional shape of the measuring object W can be obtained. According to the phase shift method, the height of the measuring object W can be measured with high resolution by reducing the cycle of the pattern light. However, the range of the height that can be measured is only a low height (with a small height difference) that is within 2n in terms of phase shift amount. Therefore, the space encoding method is also used.

(Space Encoding Method)

According to the space encoding method, a space irradiated with light can be divided into a plurality of small spaces having a substantially fan-shaped cross section, and a series of space code numbers can be assigned to the small spaces. For this reason, even if the height of the measuring object W is large, that is, even if the height difference is large, the height can be calculated from the space code numbers as long as it is within the space irradiated with light. Therefore, the shape of the measuring object W having a large height can be measured for the whole measuring object W. According to the space encoding method, a range of allowable height (dynamic range) is widened.

(Detailed Configuration of Illumination Device 3)

As shown in FIG. 4, the illumination device 3 according to a first embodiment includes an illumination housing 30, the first light projecting section 31, the second light projecting section 32, the third light projecting section 33, the fourth light projecting section 34, and a light projection control section 39. The illumination device 3 and the controller section 4 are connected by a connection line 3a as shown in FIG. 1. However, the illumination device 3 and the controller section 4 may also be wirelessly connected.

The illumination device 3 may be a pattern light projection-dedicated device only for projecting pattern light, or may be a device that also serves as illumination for observation for observing the measuring object W. When the illumination device 3 is a pattern light projection-dedicated device, an illumination device for observation can be provided separately from the pattern light projection-dedicated device or integrally with the pattern light projection-dedicated device. As the illumination device for observation, a light emitting diode, a semiconductor laser, a halogen light, HID, etc. can be used.

The illumination housing 30 has an opening 30a at its central portion in a planar view, and a first side portion 30A, a second side portion 30B, a third side portion 30C, and a fourth side portion 30D are continuously formed in a shape close to a rectangle in a planar view. Since the first side portion 30A, the second side portion 30B, the third side portion 30C, and the fourth side portion 30D extend in a straight line, the opening 30a also has a shape close to a rectangle in a planar view.

An outer shape of the illumination housing 30 and the shape of the opening 30a are not limited to the shapes shown in the drawings, and may be, for example, a circle, etc. The central axis A of the opening 30a shown in FIG. 1 is an axis that passes through the center of the opening 30a and extends in a direction orthogonal to a lower surface of the illumination housing 30. When the illumination device 3 is installed such that the lower surface of the illumination housing 30 is horizontal, the central axis A of the opening 30a extends vertically. However, the illumination device 3 can also be installed such that the lower surface of the illumination housing 30 is inclined, and in this case, the central axis A of the opening 30a is inclined.

The central axis A of the opening 30a does not need to pass through the center of the opening 30a strictly. Although it depends on the size and the like of the measuring object W, an axis that passes through a place about several millimeters away from the center of the opening 30a can also be the central axis A. That is, an axis passing through the center of the opening 30a and the vicinity of the center of the opening 30a can be defined as the central axis A. An extension line of the central axis A intersects the placement surface 100.

In the following description, as shown in FIG. 4, the first side portion 30A side is referred to as the left side of the illumination device 3, the second side portion 30B side is referred to as the right side of the illumination device 3, the third side portion 30C side is referred to as the upper side of the illumination device 3, and the fourth side portion 30D side is referred to as the lower side of the illumination device 3 for convenience. However, this does not specify the direction when the illumination device 3 is in use, and the illumination device 3 may be in any direction when it is in use.

The interiors of the first side portion 30A, the second side portion 30B, the third side portion 30C, and the fourth side portion 30D of the illumination housing 30 are hollow. The first light projecting section 31 is accommodated in the interior of the first side portion 30A. The second light projecting section 32, the third light projecting section 33, and the fourth light projecting section 34 are respectively accommodated in the interiors of the second side portion 30B, the third side portion 30C, and the fourth side portion 30D. The first light projecting section 31 and the second light projecting section 32 are a pair, and the third light projecting section 33 and the fourth light projecting section 34 are a pair. In addition, the light projection control section 39 is also accommodated inside the illumination housing 30.

The first side portion 30A and the second side portion 30B are arranged to face each other while sandwiching the central axis A, and thus the first light projecting section 31 and the second light projecting section 32 are arranged to be bilaterally symmetric (point symmetric) with the central axis A as the center of symmetry, and the first light projecting section 31 and the second light projecting section 32 are separated from each other in the circumferential direction of the central axis A.

Further, the third side portion 30C and the fourth side portion 30D are also arranged to face each other while sandwiching the central axis A, and thus the third light projecting section 33 and the fourth light projecting section 34 are arranged to be vertically symmetric (point symmetric) with the central axis A as the center of symmetry, and the third light projecting section 33 and the fourth light projecting section 34 are separated from each other in the circumferential direction of the central axis A. In a planar view, four light projecting sections are arranged in the order of the first light projecting section 31, the third light projecting section 33, the second light projecting section 32, and the fourth light projecting section 34 in a clockwise direction around the central axis A.

Figure 5:
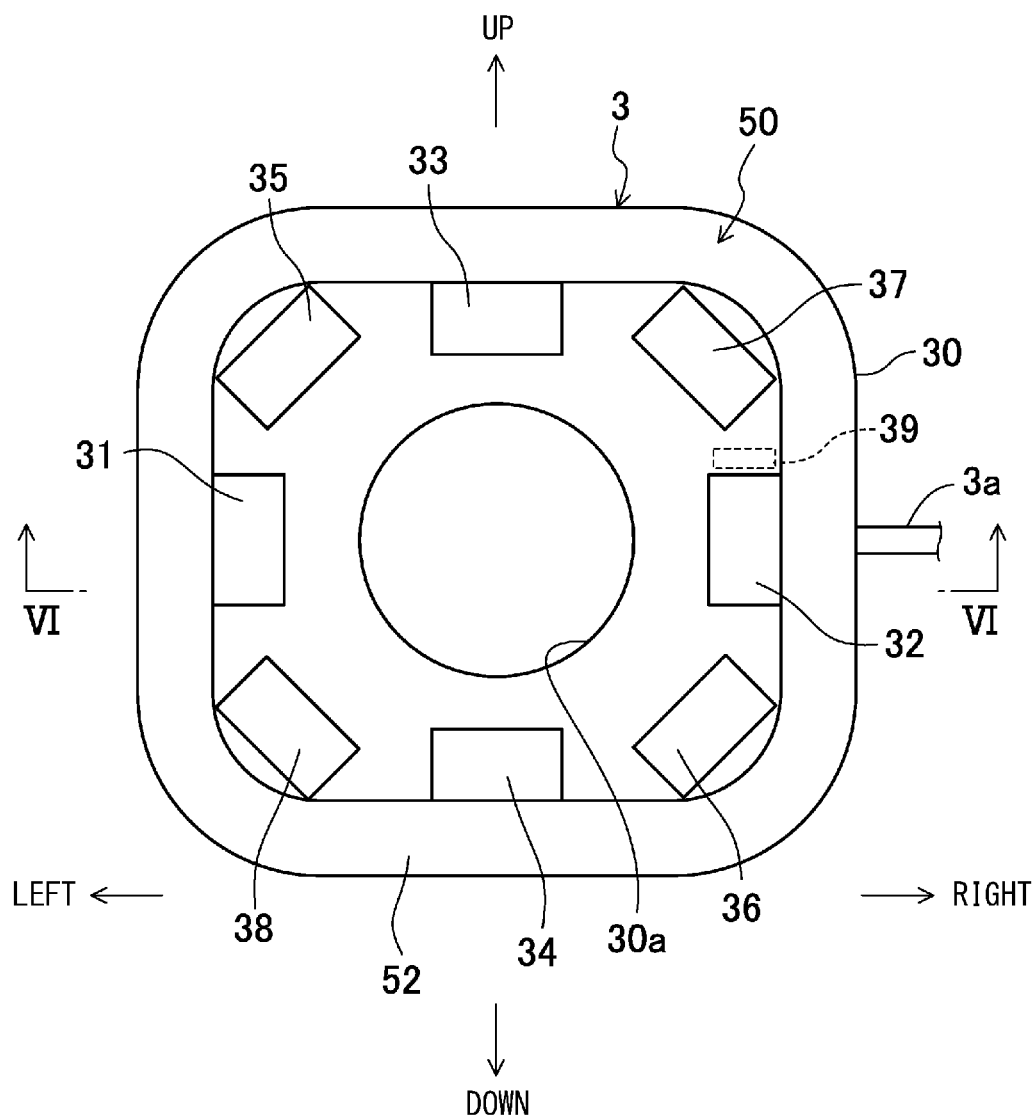
FIG. 5 is a bottom view of an illumination device according to a second embodiment.

FIG. 5 is a bottom view of the illumination device 3 according to a second embodiment of the invention. In the second embodiment, eight light projecting sections 31 to 38 are provided inside the illumination housing 30. A fifth light projecting section 35 is provided between the first light projecting section 31 and the third light projecting section 33, a sixth light projecting section 36 is provided between the second light projecting section 32 and the fourth light projecting section 34, a seventh light projecting section 37 is provided between the second light projecting section 32 and the third light projecting section 33, and an eighth light projecting section 38 is provided between the first light projecting section 31 and the fourth light projecting section 34. The fifth light projecting section 35 and the sixth light projecting section 36 are a pair, and are arranged so as to be symmetric with the central axis A as the center of symmetry.

The seventh light projecting section 37 and the eighth light projecting section 38 are a pair, and are arranged so as to be symmetric with the central axis A as the center of symmetry. In a planar view, the first light projecting section 31, the fifth light projecting section 35, the third light projecting section 33, the seventh light projecting section 37, the second light projecting section 32, the sixth light projecting section 36, the fourth light projecting section 34, and the eighth light projecting section 38 are arranged in this order in a clockwise direction around the central axis A.

Figure 6:
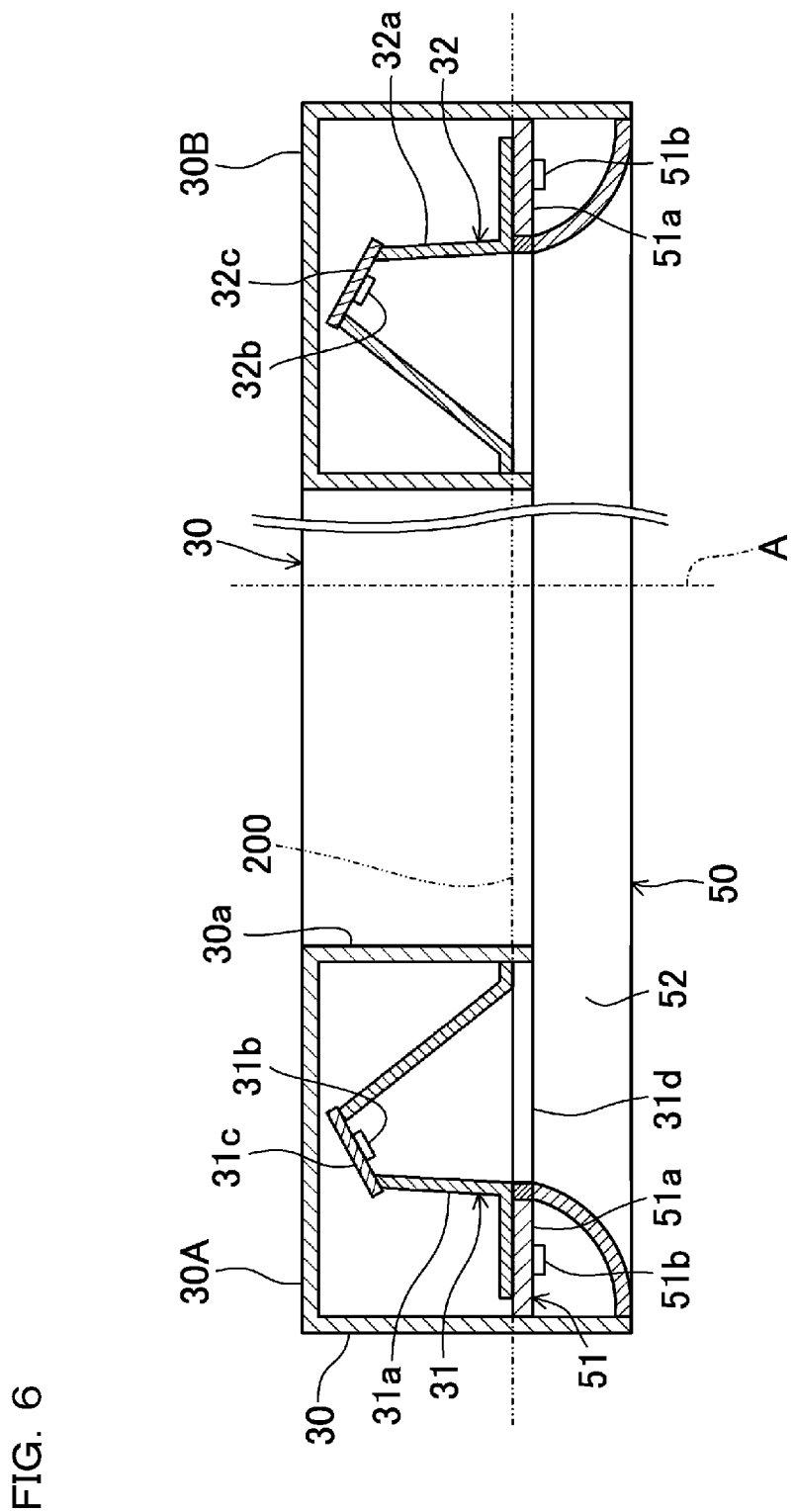
FIG. 6 is a cross-sectional view along line VI-VI in FIG. 5.

In the illumination device 3 of the second embodiment, an illumination for observation 50 for illuminating and observing the measuring object W is provided separately from the light projecting sections 31 to 38. The illumination for observation 50 is provided in an outer peripheral portion at the bottom of the illumination housing 30 and forms in an annular shape surrounding the first to eighth light projecting sections 31 to 38. As shown in FIG. 6, the illumination for observation 50 includes a substrate 51a, a plurality of light emitting diodes for observation 51b which are mounted on the substrate 51a and emit illumination light for observation, and a cover member 52. The substrate 51a is arranged so as to surround the first to eighth light projecting sections 31 to 38. The plurality of light emitting diodes for observation 51b are provided at intervals in the circumferential direction so as to surround the first to eighth light projecting sections 31 to 38. The cover member 52 is provided so as to cover the light emitting diodes for observation 41b from a light emitting surface side, and is made with a material having light transmissivity and a property of diffusing light.

(Configuration of First Light Projecting Section 31)

The first to the fourth light projecting sections 31 to 34 of the illumination device 1 of the first embodiment are the same as the first to the fourth light projecting sections 31 to 34 of the illumination device 1 of the second embodiment.

As shown in FIG. 6, the first light projecting section 31 includes a casing 31a, a first LED (light emitting diode) 31b which serves as a first light source that emits diffused light, and a first LCD (first pattern light generating section) 31d which receives the diffused light emitted from the first LED 31d to sequentially generate a plurality of first measurement pattern light having different patterns and irradiate the measuring object W with the first measurement pattern light. LCD is for liquid crystal display, that is, a liquid crystal panel, and thus the first LCD 31d is a first liquid crystal panel. The light source is not limited to a light emitting diode, and may be any light emitter that emits diffused light.

Figure 7:
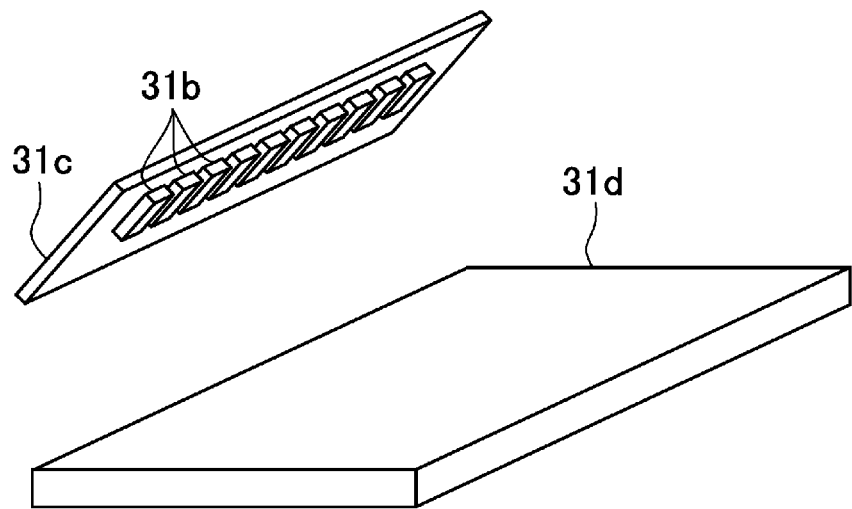
FIG. 7 is a diagram illustrating a positional relation between a light emitting diode and a liquid crystal panel.

As shown in FIG. 7, the first LCD 31d is arranged corresponding to the first LED 31b, and a light emitting surface of the first LED 31b faces the first LCD 31d. This ensures that light emitted from the first LED 31b is incident on the first LCD 31d. As the light emitting diode, for example, a white light emitting diode may be used. The first LCD 31d is provided such that a display surface (emitting surface) of the first LCD 31d is positioned on a plane (indicated by a virtual line 200 in FIG. 6) orthogonal to the central axis A of the opening 30a of the illumination housing 30, and the plane 200 and the display surface of the first LCD 31d are positioned on the same plane.

The second light projecting section 32 is configured in the same manner as the first light projecting section 31. Specifically, as shown in FIG. 6, the second light projecting section 32 includes a casing 32a, a second LED 32b mounted on a substrate 32c, and a second LCD (second pattern light generating section) 32d arranged corresponding to the second LED 32b. The first LED 31b and the second LED 32b are paired. The first LED 31b and the second LED 32b are attached to the illumination housing 30 such that their relative position can be corrected. Details of the correction of the relative position will be described later.

The configuration of the first light projecting section 31 will be described in detail below. As shown in FIG. 6 and FIG. 7, there are a plurality of first LEDs 31b of the first light projecting section 31, and the first LEDs 31b are provided in an upper portion inside the illumination housing 30. The arrangement direction of the first LEDs 31b is a direction that intersects the light emitting direction.

That is, inside the casing 31a, a substrate 31c is disposed above. The plurality of first LEDs 31b are mounted on a surface facing the lower side of the substrate 31c. The plurality of first LEDs 31b can be linearly arranged, or adjacent first LEDs 31b can be arranged so as to be displaced in the vertical direction. In a case of generating pattern light having a periodic illuminance distribution which changes in a one-dimensional direction, the first LEDs 31b are arranged in a direction in which the illuminance of the pattern light does not change. By arranging the plurality of first LEDs 31b along a longitudinal direction of the first side portion 30A of the illumination housing 30 shown in FIG. 4, the light emitted from the first LEDs 31b becomes light that is substantially continuous in the longitudinal direction of the first side portion 30A.

The light emitting directions of the plurality of first LEDs 31b can be the same, and in this embodiment, as indicated by left-downward oblique lines in FIG. 1, the light is set so as to reach at least the second side portion 30B side (the right side of the illumination device 3) than the central axis A of the opening 30a of the illumination housing 30 from directly below the first LEDs 31b. A light irradiation range by the plurality of first LEDs 31b is set wider than an imaging visual field by the imaging device 2.

Figure 17:
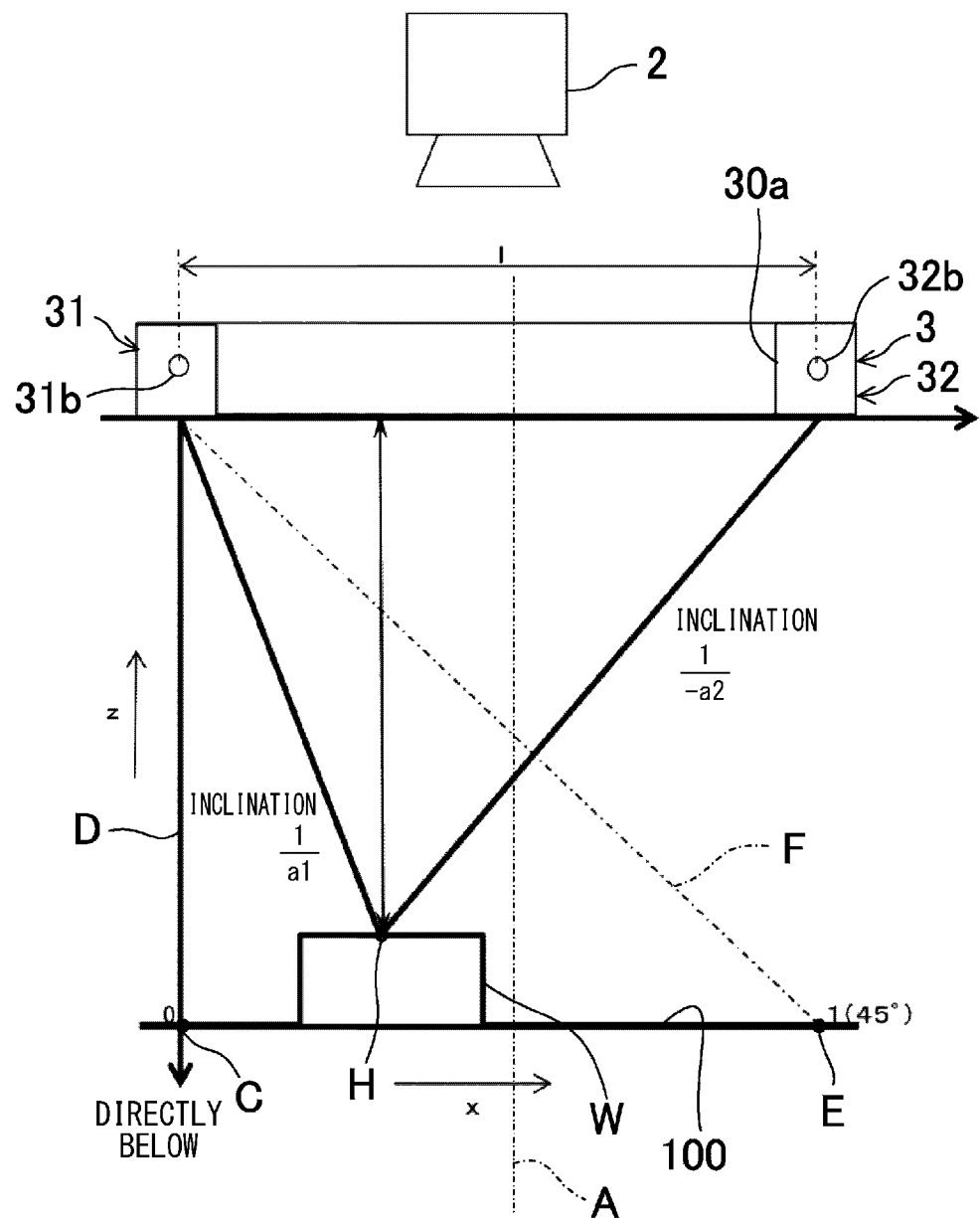
FIG. 17 is a diagram explaining a height measuring method by a height measuring section.

The light emitting range of the plurality of first LEDs 31b will be specifically described. As shown in FIG. 17, a separation direction between the first light projecting section 31 and the second light projecting section 32 is an X direction, and the vertical direction is a Z direction. The illumination device 3 is arranged such that the lower surface of the illumination device 3 becomes horizontal (parallel to the placement surface 100), and the illumination device 3 is placed at a distance of "1" above the placement surface 100 of the measuring object W. A place where X=0 is directly below the first LED 31b, and a straight line D extending from the first LED 31b to a point C where (X,Z)=(0,0) is drawn. Further, a straight line F extending from the first LED 31b to a point E where (X,Z)=(1,0) is drawn. At this time, the directions of the first LEDs 31b are set and a lens for light source of the first LEDs 31b is designed such that the light emitting range of the plurality of first LEDs 31b is a region sandwiched between the straight line D and the straight line F.

As shown in FIG. 6, the first LCD 31d is provided in the illumination housing 30 in a state of being separated downward from the first LED 31b. The driving method of the first LCD 31d is a TN (Twisted Nematic) method. Therefore, when a voltage applied to the first LCD 31d is 0, a liquid crystal composition (liquid crystal molecules) is arranged in parallel to the display surface to let the light of the first LED 31b pass through. When the voltage is increased from this state, the liquid crystal composition rises perpendicularly to the display surface, and blocks the light of the first LED 31b when the voltage reaches the maximum voltage.

(Relative Position Between LED and LED)

The relative positional relation between the first LED 31b and the first LCD 31d will be described. As shown in FIG.

9, the display surface of the first LCD 31*d* is positioned on the same plane as the plane 200 orthogonal to the central axis A of the opening 30*a* of the illumination housing 30, and an end portion in the first LCD 31*d* radially outward of the illumination housing 30 is the outer end portion side while an end portion in the first LCD 31*d* radially inward of the illumination housing 30 is the inner end portion side. The first LED 31*b* is arranged above the outer end portion side of the first LCD 31*d*. The reference sign SEG in FIG. 9 refers to segments included in the first LCD 31*d*. A black segment SEG is a segment that does not transmit light, and a white segment SEG is a segment that transits light. By alternately forming the black segment SEG and the white segment SEG on the display surface of the first LCD 31*d*, the light transmitted through the first LCD 31*d* forms sinusoidal pattern light having an intensity that changes periodically as shown below. This is the principle of pattern light generation. The number, interval, and formation position of the black segment SEG and the white segment SEG can be arbitrarily changed, and a plurality of types of pattern light having different wave cycles and phases can be generated.

The number of the black segments SEG can be set as the same as the number of the white segments SEG. As a result, at the time of generating the pattern light, a region that transmits light and a region that does not transmit light are alternately formed in the first LCD 31*d* with the same width. This is performed by the light projection control section 39 which will be described later.

Here, general properties of a liquid crystal panel will be described. When the light is incident in parallel to the normal line of the display surface of the liquid crystal panel, the light transmittance becomes the highest. The greater an angle formed between the normal line of the display surface and the incident direction of the light, the lower the light transmittance. Since the liquid crystal panel has an angle characteristic where the light transmittance changes depending on the incident direction of the light, when the pattern light is generated using the liquid crystal panel, there is a risk that luminance unevenness corresponding to the position of the pattern light would occur.

In this respect, the relative position between the first LCD 31*d* and the first LED 31*b* is set such that the light emitted from the first LED 31*b* is incident on the first LCD 31*d* within the effective angle range of the first LCD 31*d* in this embodiment. Since the diffused light emitted from the first LED 31*b* is incident on the first LCD 31*d* within the effective angle range of the first LCD 31*d*, the luminance unevenness corresponding to the position of the pattern light due to the angle characteristics of the first LCD 31*d* is less likely to occur.

The effective angle range of the first LCD 31*d* may be an angle range in which contrast of the pattern light can be secured equal to or more than a predetermined value. That the contrast of the pattern light is equal to or more than a predetermined value means a level where, when the imaging device 2 receives the pattern light reflected from the measuring object W, the imaging device 2 can obtain a pattern image that can generate an inspection target image. That is, due to the angle characteristics of the first LCD 31*d*, the greater the angle formed between the normal line of the display surface of the first LCD 31*d* and the incident direction of the light, the lower the light transmittance. Therefore, it is considered that the contrast of the pattern light is lowered depending on the incident angle of the light. However, in the embodiment, the relative position between the first LCD 31*d* and the first LED 31*b* is set so as to have a contrast where it is possible to obtain the height information of the measuring object W based on the pattern image captured by the imaging device 2.

Further, the effective angle range of the first LCD 31*d* may be defined as follows. For example, when the light emitted from the first LED 31*b* passes through the first LCD 31*d* in a liquid crystal molecular arrangement state in which light is most easily transmitted, an angle range in which the attenuation rate of the light that attenuates is 10% or less is the effective angle range of the first LCD 31*d*. By setting the relative position between the first LCD 31*d* and the first LED 31*b* such that the attenuation rate of the light is 10% or less, it is possible to secure a contrast where it is possible to obtain the height information of the measuring object W based on the pattern image captured by the imaging device 2.

The liquid crystal molecular arrangement state in which light is most easily transmitted refers to a state in which an alignment of the liquid crystal molecules is in a direction that most hardly blocks an optical path. The effective angle range of the first LCD 31*d* may also be set such that the attenuation rate is 5% or less.

Figure 9:
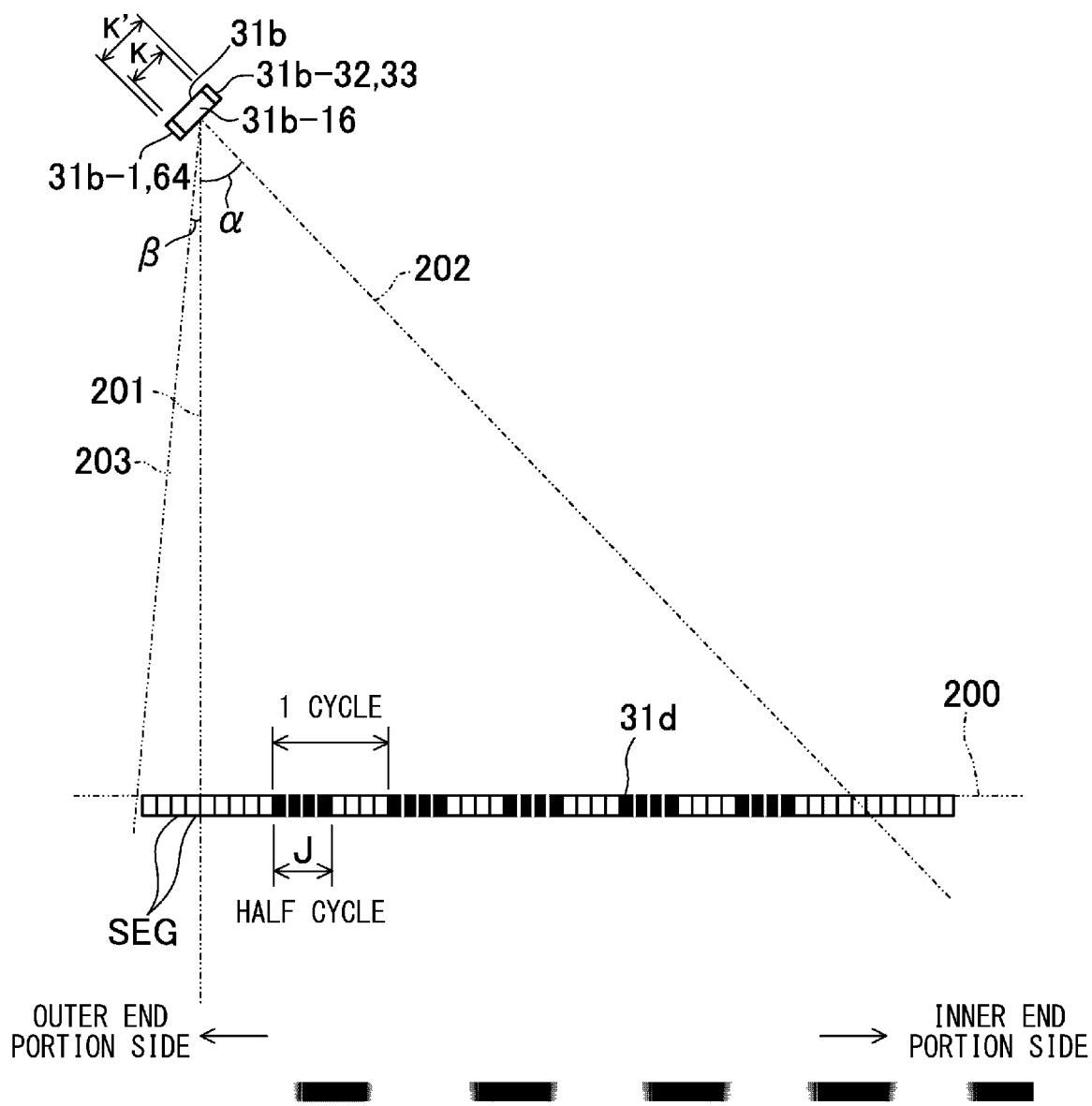
FIG. 9 is a diagram explaining a pattern light generation gist.

Further, as shown in FIG. 9, the relative position between the first LED 31*b* and the first LCD 31*d* can be set such that an angle α formed by a normal line 201 drawn from the center (the center of the light emitting surface) of the first LED 31*b* toward the display surface of the first LCD 31*d* and an inner side virtual line 202 drawn from the center of the first LED 31*b* toward a boundary on an inner end portion side positioned radially inward of the illumination housing 30 in the effective angle range of the first LCD 31*d* is 50° or less. In this way, the angle range when the light emitted from the first LED 31*b* is incident on the first LCD 31*d* becomes an optimum range for the TN liquid crystal panel, and as a result, the contrast of the pattern light can be secured to equal to or more than a predetermined value. The angle α formed by the normal line 201 and the inner side virtual line 202 can be set to 45° or less, and can also be set to 40° or less.

Further, an angle β formed by the normal line 201 drawn from the center of the first LED 31*b* toward the display surface of the first LCD 31*d* and an outer side virtual line 203 drawn from the center of the first LED 31*b* toward a boundary on an outer end portion side in the effective angle range of the first LCD 31*d* is set to be 10° or less. The angle formed by the normal line 201 and the outer side virtual line 203 can be set to 5° or less, and can also be set to 0°. In this way, the angle range when the light emitted from the first LED 31*b* is incident on the first LCD 31*d* becomes an optimum range for the TN liquid crystal panel, and as a result, the contrast of the pattern light can be secured to equal to or more than a predetermined value.

A distance between the first LED 31*b* and the surface (display surface) of the first LCD 31*d* may be substantially equal to a width (a distance between the outer end portion and the inner end portion of the first LCD 31*d*) of the effective angle range of the first LCD 31*d*.

(Size of LED)

As shown in FIG. 9, a dimension K in a direction in which a wave is continuous on the light emitting surface of the first LED 31*b* is set to be equal to or less than the dimension of a half cycle of the wave formed in the first LCD 31*d*. In the embodiment, one wave is formed by eight segments SEG arranged in the direction in which the waves in the first LCD 31*d* are continuous, and thus four segments SEG correspond to a half cycle of the wave. That is, a dimension J of the four segments SEG arranged in the direction in which the wave is continuous is equal to the dimension K of the light emitting surface of the first LED 31*b*, or longer than the dimension K.

As a result of an experiment, it has been found that, when the dimension K of the light emitting surface of the first LED 31*b* is equal to or less than the dimension (the same as the dimension of the portion that transmits light) of a half cycle of the wave formed in the display surface of the first LCD 31*d*, that is, the dimension J, the pattern light may not have a proper sinusoidal illuminance distribution in cases. In the case where sinusoidal pattern light is not properly generated, when a height image is obtained by image processing, high-frequency waviness may occur in the height image, that is, a wavy surface which is actually a flat surface may be formed, and this becomes an obstacle to inspection. The same applies to the case of generating wavy pattern light other than sinusoidal pattern light.

In this respect, it is conceivable to select a light emitting diode having such a size that the dimension K of the light emitting surface of the first LED 31*b* is larger than the dimension J of the half cycle of the wave. However, the size of the generally available light emitting diodes is limited, and the dimension K of the light emitting surface cannot be freely set. As a result, a light emitting diode in which the dimension K of the light emitting surface is equal to or less than the dimension J of the half cycle of the wave may have to be used as in the embodiment.

Figure 10:
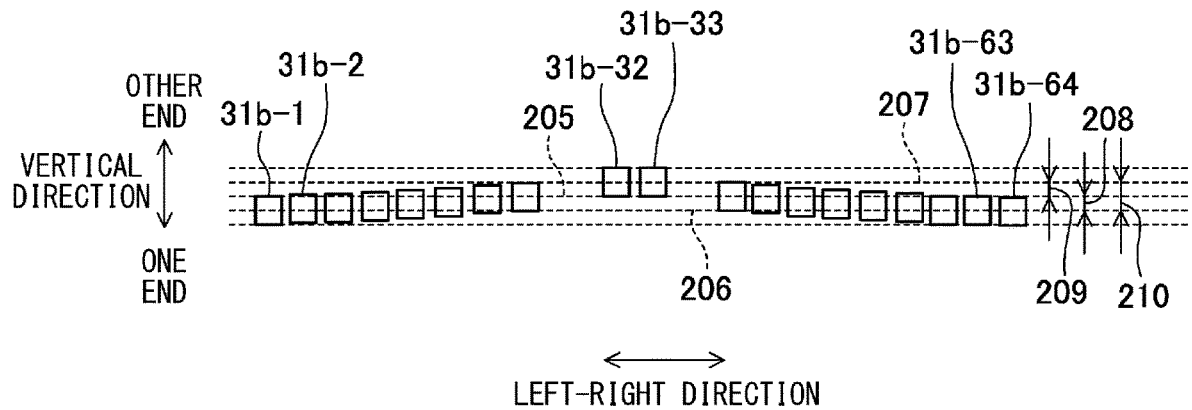
FIG. 10 is a diagram illustrating an arrangement example of a first light emitting diode.

FIG. 10 shows an arrangement form of the first LED 31*b*. The left-right direction in FIG. 10 is a direction in which the illuminance of the pattern light does not change, and 64 first LEDs 31*b* are arranged in order from the left side to the right side in FIG. 10. The number of the first LEDs 31*b* is an example, and can be arbitrarily set.

The first LED 31*b* positioned at the left end in FIG. 10 is referred to as a first LED 31*b*-1, and the other first LEDs 31*b* are sequentially referred to as a first LED 31*b*-2, a first LED 31*b*-3, . . . . The first LED 31*b* positioned at the right end in FIG. 10 is referred to as a first LED 31*b*-64. The first LEDs 31*b*-1 to 64 are arranged in a direction in which the illuminance of the pattern light does not change, and are deviated from each other in a direction (the vertical direction in FIG. 10) in which the illuminance of the pattern light changes. An optical axis irradiated by the first LEDs 31*b*-1 to 64 is positioned on a straight line 205. The straight line 205 is a straight line that extends in the direction in which the illuminance of the pattern light does not change, and passes through a portion where the light amount of the LED array is the largest.

The first LEDs 31*b*-1 to 64 are arranged such that the centers of their light emitting surfaces are positioned within a predetermined range in the direction (the vertical direction in FIG. 10) in which the illuminance of the pattern light changes. The center of the light emitting surface of the first LED 31*b*-1 and the center of the light emitting surface of the first LED 31*b*-64 are positioned on a straight line 206 parallel to the straight line 205, and the centers of the light emitting surfaces of the first LEDs 31*b*-1 and 64 are arranged at one end of the predetermined range. The center of the light emitting surface of the first LED 31*b*-32 and the center of the light emitting surface of the first LED 31*b*-33 are positioned on a straight line 207 parallel to the straight line 205, and the centers of the light emitting surfaces of the first LEDs 31*b*-32 and 33 are arranged at the other end of the predetermined range.

A separation dimension 208 between the straight line 205 on which the optical axis is positioned and the straight line 206 which passes through one end of the predetermined range is set equal to a separation dimension 209 between the straight line 205 on which the optical axis is positioned and the straight line 207 which passes through the other end of the predetermined range. A dimension 210 that is a combination of the dimension 208 and the dimension 209 becomes a dimension representing the predetermined range. The first LEDs 31*b*-1 and 64 are one-end light emitting diodes whose centers of the light emitting surfaces are positioned at one end of the predetermined range, and the first LEDs 31*b*-32 and 33 are other-end light emitting diodes whose centers of the light emitting surfaces are positioned at the other end of the predetermined range. The first LEDs 31*b*-2 to 31, and 34 to 63 are intermediate light emitting diodes whose centers of the light emitting surfaces are positioned in the middle of the predetermined range. The first LEDs 31*b*-2 to 63 are arranged so as to be deviated from each other in the direction in which the illuminance of the pattern light changes. Specifically, the first LEDs 31*b*-2 to 31 and 34 to 63 are arranged so as to be deviated in multiple stages from the vicinity of one end to the vicinity of the other end of the predetermined range.

Since the first LEDs 31*b*-1 to 64 are arranged such that the centers of their light emitting surfaces are deviated within the predetermined range, as shown in FIG. 9, when viewed from the direction in which the first LEDs 31*b*-1 to 64 are arranged, the first LEDs 31*b*-32 and 33 are displaced upward while the first LEDs 31*b*-1 and 64 are displaced downward, and for example, the first LED 31*b*-16, etc. are positioned near the center in the vertical direction. As described above, the dimension of the light emitting surface of each first LED 31*b* is K. However, by arranging the first LEDs 31*b*-1 to 64 so as to be deviated within the predetermined range, the apparent dimension of the light emitting surfaces of the first LED 31*b*-1 to 64 is K' which is longer than K. The dimension K' is longer than the dimension J of the half cycle of the wave formed on the first LCDs 31*d*. As a result, high-frequency waviness is less likely to occur in the inspection target image.

Figure 11:
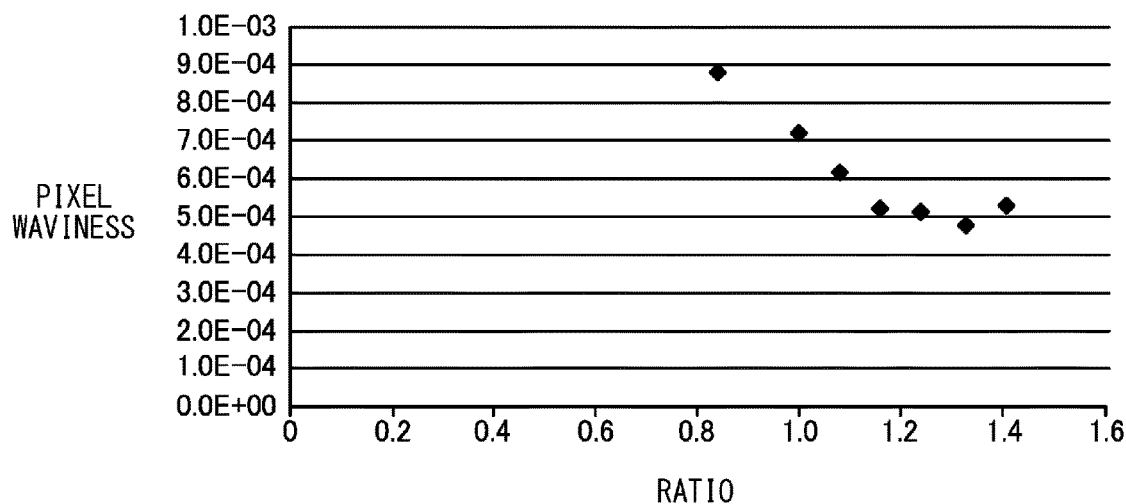
FIG. 11 is a graph showing a relation between pixel waviness and a ratio between a dimension of a light emitting diode and a half cycle of a wave.

The ratio between the dimension J of the half cycle of the wave formed on the first LCDs 31*d* and the dimension K' in the direction in which the wave is continuous on the apparent light emitting surfaces of the first LEDs 31*b*-1 to 64 is set within a range of 1:1.2 to 1:1.4. FIG. 11 is a graph showing a relation between pixel waviness and the ratio between the dimension J and the dimension K'. In FIG. 11, the horizontal axis represents the ratio between the dimension J and the dimension K' and the vertical axis represents the degree of pixel waviness, and the upper on the vertical axis, the stronger the pixel waviness. As shown in the graph, when the ratio between the dimension J and the dimension K' is 1 or less, the pixel waviness becomes strong. On the other hand, when the ratio is greater than 1.2, the pixel waviness becomes small and is kept at a low level until the ratio goes up to 1.4. Therefore, it is preferably to set the ratio within the range of 1:1.2 to 1:1.4.

Figure 12:
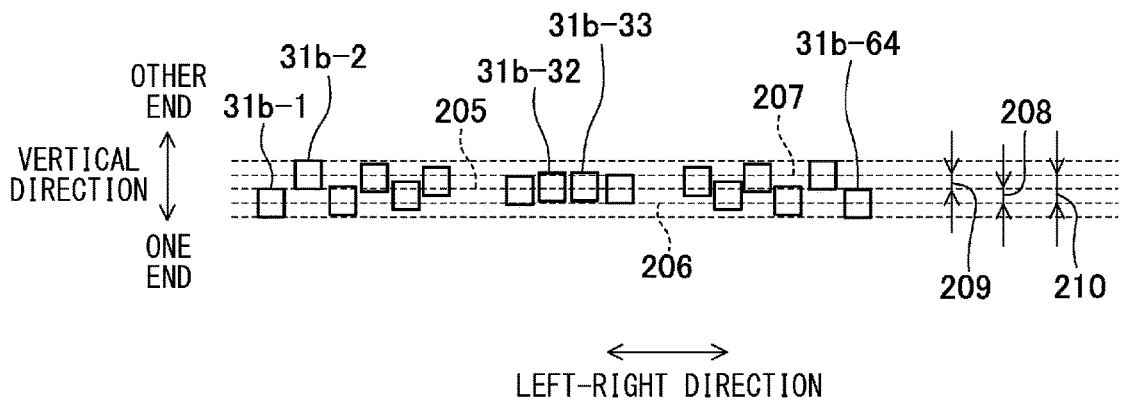
FIG. 12 is a diagram illustrating another arrangement example of the first light emitting diode.

FIG. 12 is a diagram showing another arrangement example of the first LEDs 31*b*-1 to 64. In this example, the centers of the light emitting surfaces of the first LEDs 31*b*-32 and 33 are positioned at the center of the predetermined range, the centers of the light emitting surfaces of the first LEDs 31*b*-1 and 64 are positioned at one end of the predetermined range, and the centers of the light emitting surfaces of the first LEDs 31*b*-2 and 63 are positioned at the other end of the predetermined range. Each first LED 31*b* is arranged such that the center of the light emitting surface approaches the center of the predetermined range as it approaches the center in the arrangement direction of the first LEDs 31*b*. In this example, as shown in FIG. 9, the apparent dimension of the light emitting surfaces of the first LED 31*b*-1 to 64 is also K' which is longer than K.

Figure 8:
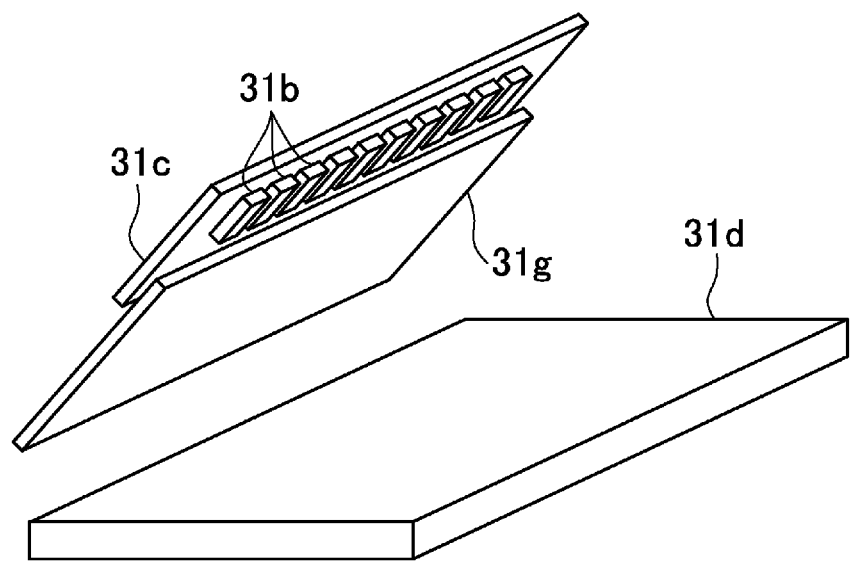
FIG. 8 is a diagram illustrating a positional relation between a light emitting diode and a liquid crystal panel according to a variation.

As shown in FIG. 8, a diffusing unit 31*g* that diffuses light emitted from the light emitting surfaces and makes the light incident on the first LCDs 31*d* may be provided between the light emitting surfaces of the first LEDs 31*b* and the first LCDs 31*d*. In this way, even if the dimension K of the light emitting surfaces of the first LEDs 31*b* is equal to or less than the dimension of the half cycle of the wave formed on the first LCDs 31*d*, the incident form of the light onto the first LCDs 31*d* is an incident form as in a case where the dimension of the light emitting surface is longer than the dimension of the half cycle of the wave. Therefore, high-frequency waviness is less likely to occur in the inspection target image. The diffusing unit 31*g* may be, for example, a diffusing plate or a diffusing lens. When the diffusing unit 31*g* is provided, the pixel waviness is suppressed due to the diffusion effect. Therefore, the first LEDs 31*b*-1 to 64 do not need to be arranged being shifted in the vertical direction. However, the first LEDs 31*b*-1 to 64 may be arranged being shifted in the vertical direction.

(LED Driving Circuit and LCD Driving Circuit)

Figure 13:
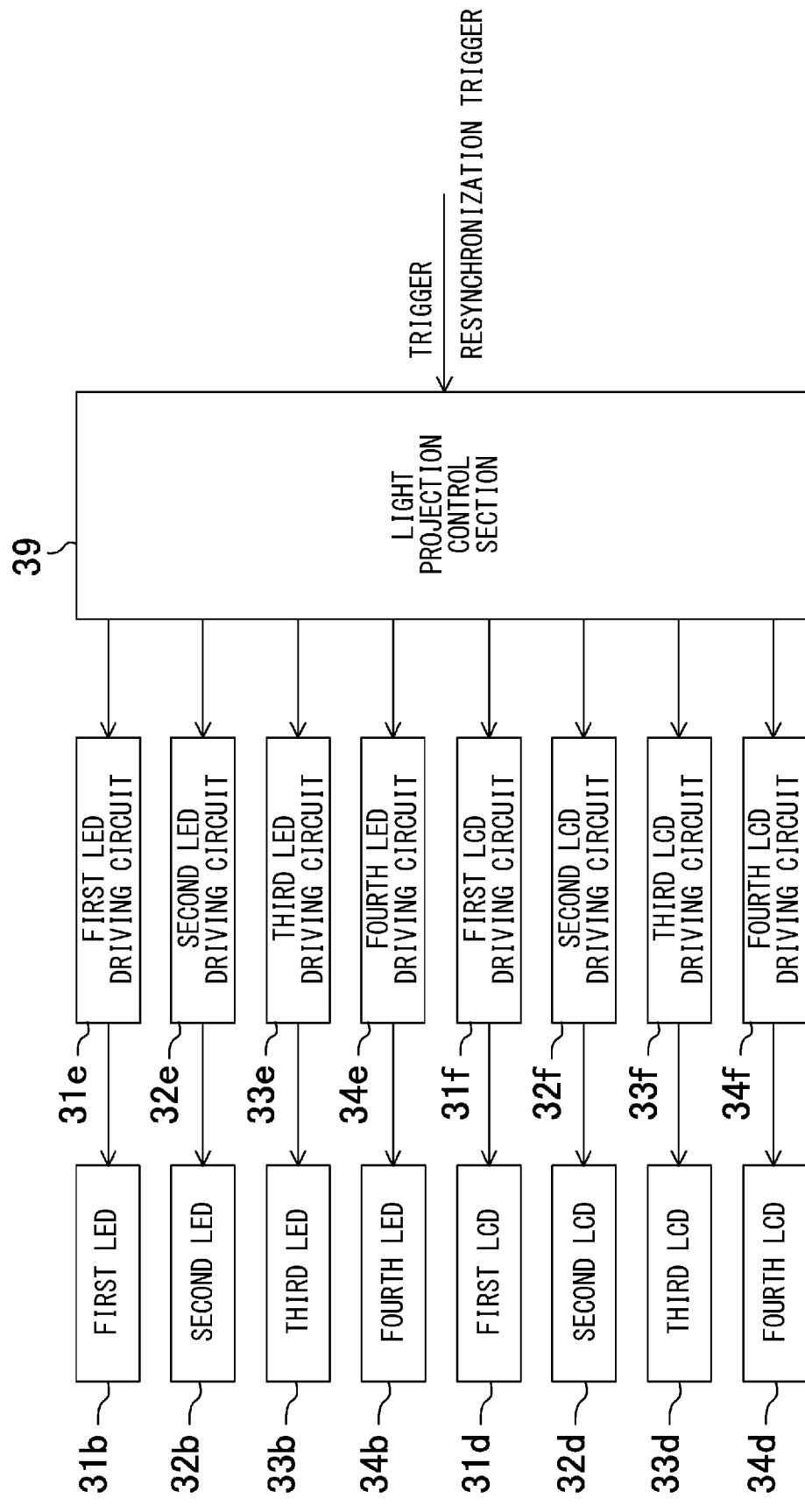
FIG. 13 is a block diagram of an illumination device.

As shown in FIG. 13, a first LED driving circuit (light source driving circuit) 31*e* that drives the first LED 31*b*, and a first LCD driving circuit (liquid crystal panel driving circuit) 31*f* that drives the first LCD 31*d* are provided in the first light projecting section 31. The first LED driving circuit 31*e* is a circuit for changing a supply current value to the first LED 31*b*, and is controlled by the light projection control section 39. Therefore, the first LED 31*b* is controlled by the light projection control section 39 via the first LED driving circuit 31*e*. The current value control by the first LED driving circuit 31*e* is a DAC control.

Figure 16:
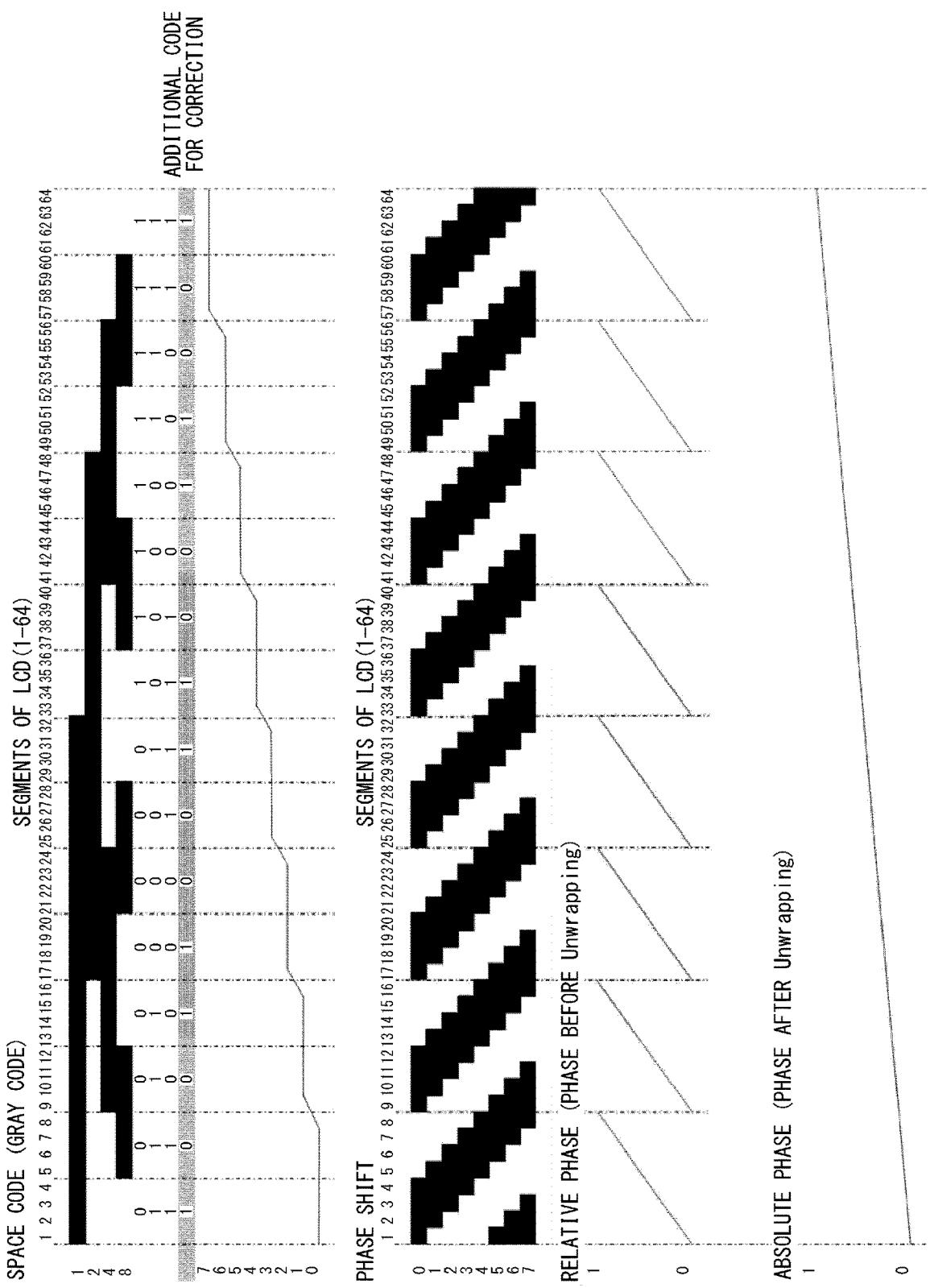
FIG. 16 is a diagram showing relations of formation processing of a gray code pattern and a phase shift pattern, relative phase, and absolute phase.

The first LCD driving circuit 31*f* is a circuit for changing the alignment of the liquid crystal composition of each segment SEG by changing a voltage applied to each segment SEG (shown in FIG. 9) included in the first LCD 31*d*. In the embodiment, as shown in FIG. 16 as an example, there are 64 segments SEG included in the first LCD 31*d*, and the voltage applied to each of the 64 segments SEG can be changed. For each segment SEG, it is possible to switch between a state of transmitting the light emitted from the first LED 31*b* and a state of not transmitting the light emitted from the first LED 31*b*. The first LCD driving circuit 31*f* is controlled by the light projection control section 39 which is common to the first LED driving circuit 31*e*. Therefore, the first LCD 31*d* is controlled by the light projection control section 39 via the first LCD driving circuit 31*f*. In addition, since the first LED driving circuit 31*e* and the first LCD driving circuit 31*f* are controlled by the common light projection control section 39, the first LED driving circuit 31*e* and the first LCD driving circuit 31*f* can be precisely synchronized.

The first LCD driving circuit 31*f* controlled by the light projection control section 39 drives the first LCD 31*d*, and thus the first LCD driving circuit 31*f* can receive the diffused light emitted from the first LED 31*b* to sequentially generate a plurality of first measurement pattern lights having different patterns and irradiate the measuring object W with the first measurement pattern lights. The plurality of first measurement pattern lights include a pattern light for space code (gray code) used in the space encoding method, and a pattern light having a periodic illuminance distribution used in the phase shift method.

The upper side of FIG. 16 shows a case where a pattern light for space code is generated by the first LCD 31*d*, and the lower side of FIG. 16 shows a case where a pattern light having a periodic illuminance distribution used in the phase shift method is generated. In FIG. 16, a portion colored in black is a segment SEG that does not transmit the diffused light emitted from the first LED 31*b*, and a portion colored in white is a segment SEG that transmits the diffused light emitted from the first LED 31*b*. Further, FIG. 16 shows a case where the 64 segments SEG included in the first LCD 31*d* are arranged in the horizontal direction in FIG. 16.

The case of generating the pattern light for space code on the upper side of FIG. 16 shows a case of generating a striped pattern having a stripe width which becomes smaller from ½, ¼, . . . of the full width with a black and white duty ratio of 50%. By controlling the first LCD 31*d*, it is possible to sequentially generate a pattern light for space code.

In the case of generating the pattern light for the phase shift method on the lower side of FIG. 16, a plurality of pattern lights are generated by shifting the phase of a sine-wave striped pattern. In this example, a binary control is used for LCD display to generate a rectangular wave pattern. However, as shown in FIG. 9, a rectangular wave pattern generated by the first LCD 31*d* is blurred on a light irradiation surface so that a sinusoidal pattern can be obtained. More specifically, a pattern close to a sine-wave can be obtained by combining a pattern on a rectangular wave formed on the liquid crystal panel and a light emitting pattern of a light emitting diode having an area. Assume that an ideal point light source or line light source is used instead of an LED, a binary pattern would be obtained instead of a sine-wave pattern. For this reason, in order to obtain a sine-wave pattern, a balance between an LED light source size and an LCD opening size is important. In the example, eight pattern lights are generated. By controlling the first LCD 31*d* in this way, it is possible to sequentially generate a pattern light for the phase shift method.

That is, the light projection control section 39 controls the first LED 31*b* and the first LCD 31*d* such that a plurality of pattern lights according to the phase shift method and/or the space encoding method are sequentially generated. When projection of one pattern light of the plurality of pattern lights is completed, a next pattern light is projected, and all the pattern lights are projected by repeating the processing. Pattern formation processing by the first LCD 31*d* will be described later.

Note that the number of pattern lights for space code and the number of pattern lights for the phase shift method are not limited to the numbers shown in the drawings.

(Configuration of Second Light Projecting Section 32)

As shown in FIG. 1, a light emitting range of the second LED 32*b* of the second light projecting section 32 is set so as to reach at least the first side portion 30A side (the left side of the illumination device 3) than the central axis A of the opening 30*a* of the illumination housing 30 from directly below the second LED 32*b*. That is, the light emitting range of the second LED 32*b* of the second light projecting section 32 is set so as to be bilaterally symmetrical to the light emitting range of the first LED 31*b* of the first light projecting section 31 with the central axis A of the opening 30*a* of the illumination housing 30 as the center of symmetry. The light emitting range of the second LED 32*b* is indicated by right-downward oblique lines in FIG. 1

As shown in FIG. 13, a second LED driving circuit (light source driving circuit) 32*e* that drives the second LED 32*b*, and a second LCD driving circuit (liquid crystal panel driving circuit) 32*f* that drives the second LCD 32*d* are provided in the second light projecting section 32, and the second LED driving circuit 32*e* and the second LCD driving circuit 32*f* are controlled by the light projection control section 39. Since the second LCD 32*d* is driven in the same manner as the first LCD 31*d*, it is possible to receive the diffused light emitted from the second LED 32*b* to sequentially generate a plurality of second measurement pattern lights having different patterns and irradiate the measuring object W with the second measurement pattern lights. The plurality of second measurement pattern lights include a pattern light for space code, and a pattern light for the phase shift method.

The first light projecting section 31 and the second light projecting section 32 are integrally supported by the illumination housing 30 in a state of being separated from each other in the circumferential direction of the central axis A such that the pattern light emitted from the first light projecting section 31 and the pattern light emitted from the second light projecting section 32 have approximately the same spread angle so that they intersect on the central axis A of the opening 30*a* of the illumination housing 30. Being "integrally supported" means that the first light projecting section 31 and the second light projecting section 32 are fixed to the illumination housing 30 such that the relative positional relation between the first light projecting section 31 and the second light projecting section 32 does not change during installation or use. Accordingly, the relative position between the first light projecting section 31 and the second light projecting section 32 inside the illumination housing 30 does not change during operation. Therefore, as shown in FIG. 17 for example, when a separation distance between the central portion of the first LED 31*b* and the central portion of the second LED 32*b* is preset to l, the separation distance between the central portion of the first LED 31*b* and the central portion of the second LED 32*b* is fixed to l during operation. The separation distance between the central portion of the first LED 31*b* and the central portion of the second LED 32*b* is relative position information of the first light projecting section 31 and the second light projecting section 32 inside the illumination housing 30, and can be stored in the controller section 4 or the imaging device 2 in advance. The separation distance between the central portion of the first LED 31*b* and the central portion of the second LED 32*b* can be changed when not in operation.

Further, the relative position information of the first light projecting section 31 and the second light projecting section 32 inside the illumination housing 30 may be a linear distance between the central portion of the first LED 31*b* and the central portion of the second LED 32*b*, and may also be, when light irradiated from each LED is returned by a mirror, etc. and is irradiated onto the measuring object W, a distance set in consideration of a path length of that light.

Since the first LCD 31*d* is arranged on the left side of the illumination device 3, the first LCD 31*d* projects the pattern light from the left side onto the measuring object W placed on the placement surface 100. Further, since the second LCD 32*d* is arranged on the right side of the illumination device 3, the second LCD 32*d* projects the pattern light from the right side onto the measuring object W placed on the placement surface 100. The first LCD 31*d* and the second LCD 32*d* are liquid crystal panels that project pattern lights from different directions onto the measuring object W.

(Configurations of Third Light Projecting Section 33 and Fourth Light Projecting Section 34)

The third light projecting section 33 and the fourth light projecting section 34 are configured in the same manner as the first light projecting section 31. As shown in FIG. 13, the third light projecting section 33 includes a third LED (third light source) 33*b*, and a third LCD (third pattern light generating section) 33*d* arranged corresponding to the third LED 33*b*. The fourth light projecting section 34 includes a fourth LED (fourth light source) 34*b*, and a fourth LCD (fourth pattern light generating section) 34*d* arranged corresponding to the fourth LED 34*b*. The third LED 33*b* and the fourth LED 34*b* are paired. The third LED 33*b* and the fourth LED 34*b* are attached to the illumination housing 30 such that their relative position can be corrected. Details of the correction of the relative position will be described later.

The display surfaces of the third LCD 33*d* and the fourth LCD 34*d* are positioned on the same plane as the plane (plane indicated by reference numeral 200 in FIG. 6) orthogonal to the central axis A of the opening 30*a* of the illumination housing 30.

A light emitting range of the third LED 33*b* of the third light projecting section 33 and a light emitting range of the fourth LED 34*b* of the fourth light projecting section 34 are set to be same as the relation between the light emitting range of the first LED 31*b* of the first light projecting section 31 and the light emitting range of the second LED 32*b* of the second light projecting section 32. Specifically, the light emitting range of the third LED 33*b* of the third light projecting section 33 is set so as to reach at least the fourth side portion 30D side than the central axis A of the opening 30*a* of the illumination housing 30 from directly below the third LED 33*b*. The light emitting range of the fourth LED 34*b* of the fourth light projecting section 34 is set so as to reach at least the third side portion 30C side than the central axis A of the opening 30*a* of the illumination housing 30 from directly below the fourth LED 34*b*. Accordingly, when the central axis A of the opening 30*a* of the illumination housing 30 is set as the center of symmetry, the light emitting range of the third LED 33*b* of the third light projecting section 33 and the light emitting range of the fourth LED 34*b* of the fourth light projecting section 34 are set to be longitudinally symmetric.

As shown in FIG. 13, a third LED driving circuit (light source driving circuit) 33*e* that drives the third LED 33*b*, and a third LCD driving circuit (liquid crystal panel driving circuit) 33*f* that drives the third LCD 33*d* are provided in the third light projecting section 33, and the third LED driving circuit 33*e* and the third LCD driving circuit 33*f* are controlled by the light projection control section 39. Since the third LCD 33*d* is driven in the same manner as the first LCD 31*d*, it is possible to receive the diffused light emitted from the third LED 33*b* to sequentially generate a plurality of third measurement pattern lights having different patterns and irradiate the measuring object W with the third measurement pattern lights. The plurality of third measurement pattern lights include a pattern light for space code, and a pattern light for the phase shift method.

Further, a fourth LED driving circuit (light source driving circuit) 34*e* that drives the fourth LED 34*b*, and a fourth LCD driving circuit (liquid crystal panel driving circuit) 34*f* that drives the fourth LCD 34*d* are provided in the fourth light projecting section 34, and the fourth LED driving circuit 34*e* and the fourth LCD driving circuit 34*f* are controlled by the light projection control section 39. Since the fourth LCD 34*d* is driven in the same manner as the first LCD 31*d*, it is possible to receive the diffused light emitted from the fourth LED 34*b* to sequentially generate a plurality of fourth measurement pattern lights having different patterns and irradiate the measuring object W with the fourth measurement pattern lights. The plurality of fourth measurement pattern lights include a pattern light for space code, and a pattern light for the phase shift method.

The third light projecting section 33 and the fourth light projecting section 34 are integrally supported by the illumination housing 30 in a state of being separated from each other in the circumferential direction of the central axis A such that the pattern light emitted from the third light projecting section 33 and the pattern light emitted from the fourth light projecting section 34 have approximately the same spread angle so that they intersect on the central axis A of the opening 30a of the illumination housing 30. Accordingly, the relative position between the third light projecting section 33 and the fourth light projecting section 34 inside the illumination housing 30 does not change during operation. Therefore, when a separation distance between the central portion of the third LED 33b and the central portion of the fourth LED 34b is set to a predetermined value in advance, the separation distance between the central portion of the third LED 33b and the central portion of the fourth LED 34b is fixed to the predetermined value during operation. The separation distance between the central portion of the third LED 33b and the central portion of the fourth LED 34b is relative position information of the third light projecting section 33 and the fourth light projecting section 34 inside the illumination housing 30, and can be stored in the controller section 4 or the imaging device 2 in advance.

Since the third LCD 33d is arranged on the upper side of the illumination device 3, the third LCD 33d projects the pattern light from that direction onto the measuring object W placed on the placement surface 100. Further, since the fourth LCD 34d is arranged on the lower side of the illumination device 3, the fourth LCD 34d projects the pattern light from that direction onto the measuring object W placed on the placement surface 100. The third LCD 33d and the fourth LCD 34d are liquid crystal panels that project pattern lights from different directions onto the measuring object W.

The fifth to eighth light projecting sections 35 to 38 shown in FIG. 5 are configured in the same manner as the first to fourth light projecting sections 31 to 34.

(Control by Light Projection Control Section 39)

As shown in FIG. 13, in the embodiment, the first LED driving circuit 31e, the second LED driving circuit 32e, the third LED driving circuit 33e, the fourth LED driving circuit 34e, the first LCD driving circuit 31f, the second LCD driving circuit 32f, the third LCD driving circuit 33f, and the fourth LCD driving circuit 34f are controlled by the common light projection control section 39, and thus these driving circuits can be precisely synchronized. Similarly, the fifth to eighth light projecting sections 35 to 38 also have LED driving circuits and LCD driving circuits, and they can be precisely synchronized.

The light projection control section 39 controls the first LCD 31d, the second LCD 32d, the third LCD 33d, and the fourth LCD 34d so as to complete, by the time the projection of one pattern light of the plurality of pattern lights from any one liquid crystal panel of the first LCD 31d, the second LCD 32d, the third LCD 33d, and the fourth LCD 34d is completed, formation processing of a pattern to be projected next at least on another liquid crystal panel onto which the pattern light is to be projected next, and to repeat, after the projection of the pattern light by the aforementioned one liquid crystal panel is completed, the processing of projecting the next pattern light onto the aforementioned other liquid crystal panel.

Specifically, the light projection control section 39 of the illumination device 3 is configured such that a trigger signal for starting projection of pattern light and a resynchronization trigger signal for synchronizing with the imaging device 2 during projection of pattern light are input to the light projection control section 39 from the controller section 4. The trigger signal may also be input from the PLC 101. For example, the trigger signal may be input to the light projection control section 39 based on a detection result obtained by a photoelectric sensor, etc. connected to the PLC 101. A device that generates the trigger signal does not need to be the PLC 101, and may be a photoelectric sensor, etc. In this case, the photoelectric sensor, etc. can be directly connected to the light projection control section 39, or can be connected to the light projection control section 39 via the controller section 4.

When the trigger signal is input, the light projection control section 39 controls the first LCD 31d via the first LCD driving circuit 31f so as to switch a pattern formed on the first LCD 31d to a pattern different from the current display form. Here, in order to switch the pattern on the first LCD 31d, the first LED driving circuit 31e changes the voltage applied to the liquid crystal composition of each segment included in the first LCD 31d by a well-known method. The time from that the voltage applied to the liquid crystal composition is changed to that the liquid crystal composition changes its alignment is longer than an imaging interval of the imaging device 2 which will be described later. That is, in order to switch the pattern currently formed on the first LCD 31d to a different pattern, predetermined pattern switching time which is longer than the imaging interval of the imaging device 2 is required, and time for switching from one pattern to another pattern is required. Similarly, for the second LCD 32d, the third LCD 33d, and the fourth LCD 34d, time for sequentially switching patterns is required.

While a pattern on the first LCD 31d is completely formed, control is performed such that light is emitted from the first LED 31b in synchronization with the formation of the pattern and light is not emitted from the second LED 32b, the third LED 33b, and the fourth LED 34b. As a result, only the pattern formed on the first LCD 31d is projected onto the measuring object W as pattern light, and the patterns formed on the second LCD 32d, the third LCD 33d, and thus the fourth LCD 34d will not be projected onto the measuring object W.

The time for forming a pattern on the first LCD 31d is part of the pattern switching time for forming a pattern on the second LCD 32d. The time for forming a pattern on the second LCD 32d is longer than the time for forming a pattern on the first LCD 31d, and specifically, it starts before the pattern formation is completed on the first LCD 31d.

When imaging of the pattern light of the pattern projected on the measuring object W is completed, control is performed such that, during the complete formation of the pattern on the second LCD 32d, light is emitted from the second LED 32b in synchronization with the formation of the pattern and light is not emitted from the first LED 31b, the third LED 33b, and the fourth LED 34b. As a result, only the pattern formed on the second LCD 32d is projected onto the measuring object Was pattern light.

The time for forming a pattern on the second LCD 32d is part of the pattern switching time for forming a pattern on the third LCD 33d. The time for forming a pattern on the third LCD 33d is longer than the time for forming a pattern on the second LCD 32d, and specifically, it starts before the pattern formation is completed on the first LCD 31d.

When imaging of the pattern light of the pattern projected on the measuring object W is completed, control is performed such that, during the complete formation of the pattern on the third LCD 33*d*, light is emitted from the third LED 33*b* in synchronization with the formation of the pattern and light is not emitted from the first LED 31*b*, the second LED 32*b*, and the fourth LED 34*b*. As a result, only the pattern formed on the third LCD 33*d* is projected onto the measuring object Was pattern light.

The time for forming a pattern on the third LCD 33*d* is part of the pattern switching time for forming a pattern on the fourth LCD 34*d*. The time for forming a pattern on the fourth LCD 34*d* is longer than the time for forming a pattern on the third LCD 33*d*, and specifically, it starts before the pattern formation is completed on the first LCD 31*d*.

When imaging of the pattern light of the pattern projected on the measuring object W is completed, control is performed such that, during the complete formation of the pattern on the fourth LCD 34*d*, light is emitted from the fourth LED 34*b* in synchronization with the formation of the pattern and light is not emitted from the first LED 31*b*, the second LED 32*b*, and the third LED 33*b*. As a result, only the pattern formed on the fourth LCD 34*d* is projected onto the measuring object W as pattern light. Part of the time for forming this pattern is part of the switching time for forming a next pattern on the first LCD 31*d*.

That is, in the embodiment, it is not to sequentially and continuously project a plurality of pattern lights by one liquid crystal panel among the first LCD 31*d*, the second LCD 32*d*, the third LCD 33*d*, and the fourth LCD 34*d*. The first LCD 31*d*, the second LCD 32*d*, the third LCD 33*d*, and the fourth LCD 34*d* are controlled such that when the projection of a first pattern light by one liquid crystal panel is completed, another liquid crystal panel projects a first pattern light, and when the projection of the first pattern light by this another liquid crystal panel is completed, further another liquid crystal panel projects a first pattern light, and when the projection of the first pattern light is completed in all of the liquid crystal panels in this manner, the aforementioned one liquid crystal panel projects a second pattern light, and when the projection of the second pattern light by the liquid crystal panel is completed, the aforementioned another liquid crystal panel projects a second pattern light, and when the projection of the second pattern light by this another liquid crystal panel is completed, further another liquid crystal panel projects a second pattern light. As a result, preparation for forming a pattern to be projected next can be made at a liquid crystal panel which is not performing the projection of pattern light, and thus it is possible to cover a slow response speed of the liquid crystal panels.

The above example has described a case where pattern light is projected by all of the first LCD 31*d*, the second LCD 32*d*, the third LCD 33*d*, and the fourth LCD 34*d*. However, it is not limited thereto, and pattern light can be projected only by the first LCD 31*d* and the second LCD 32*d*, or only by the third LCD 33*d* and the fourth LCD 34*d*. When pattern light is projected only by the first LCD 31*d* and the second LCD 32*d*, the projection of pattern light may be performed alternately. For example, while the first LCD 31*d* is performing the projection of the first pattern light, formation processing of a first pattern is performed on the second LCD 32*d*. Then, while the second LCD 32*d* is performing the projection of the first pattern light, formation processing of a second pattern is performed on the first LCD 31*d*. This process is repeated. The same applies to the case where pattern light is projected only by the third LCD 33*d* and the fourth LCD 34*d*.

In addition to the trigger signal and the resynchronization trigger signal, pattern light formation information is also transmitted to the light projection control section 39 from the control section 4. The transmitted pattern light formation information is temporarily stored in the light projection control section 39, and the first LED 31*b*, the second LED 32*b*, the third LED 33*b*, and the fourth LED 34*b*, as well as the first LCD 31*d*, the second LCD 32*d*, the third LCD 33*d*, and the fourth LCD 34*d* are controlled based on the pattern light formation information.

The pattern light formation information includes, for example, irradiation mode, presence/absence of irradiation of pattern light for space code, specific pattern and number of pattern lights for space code, presence/absence of irradiation of pattern light for the phase shift method, specific pattern and number of pattern lights for the phase shift method, irradiation order of pattern lights, etc. The irradiation mode includes a first irradiation mode in which pattern light is irradiated and projected on the measuring object W only by the first LCD 31*d* and the second LCD 32*d*, a second irradiation mode in which pattern light is projected by all of the first LCD 31*d*, the second LCD 32*d*, the third LCD 33*d*, and the fourth LCD 34*d*, and a third irradiation mode in which pattern light is irradiated and projected on the measuring object W only by the third LCD 33*d* and the fourth LCD 34*d*.

(Configuration of Imaging Device 2)

As shown in FIG. 1, etc., the imaging device 2 is provided separately from the illumination device 3. As shown in FIG. 1, the imaging device 2 and the controller section 4 are connected via a connection line 2*a*. However, the imaging device 2 and the controller section 4 may also be wirelessly connected.

The imaging device 2 constitutes a part of the image processing apparatus 1, and thus it can also be referred to as an imaging section. Since the imaging device 2 is provided separately from the illumination device 3, the imaging device 2 and the illumination device 3 can be installed separately. Therefore, an installation location of the imaging device 2 and an installation location of the illumination device 3 can be changed, and the installation location of the imaging device 2 and the installation location of the illumination device 3 can be separated. As a result, the degree of freedom of installation of the imaging device 2 and the illumination device 3 is greatly improved, and it becomes possible to introduce the image processing apparatus 1 to all kinds of production sites, etc.

Note that in a site where the installation location of the imaging device 2 and the installation location of the illumination device 3 can be made the same, the imaging device 2 and the illumination device 3 can be attached to a same member and an installation state can be arbitrarily changed by a user according to the site. Further, the imaging device 2 and the illumination device 3 can be attached to the same member and used integrally.

The imaging device 2 is arranged above the illumination housing 30 of the illumination device 3, that is, on a side opposite to the pattern light emitting direction so as to look into the opening 30*a* of the illumination housing 30. Therefore, the imaging device 2 can receive the first measurement pattern light reflected from the measuring object W via the opening 30*a* of the illumination housing 30 of the illumination device 3 to generate a plurality of first pattern images, and at the same time receive the second measurement pattern light reflected from the measuring object W via the opening 30*a* of the illumination housing 30 of the illumination device 3 to generate a plurality of second pattern images. When the illumination device 3 includes the third light projecting section 33 and the fourth light projecting section 34, the imaging device 2 can receive the third measurement pattern light reflected from the measuring object W via the opening 30a of the illumination housing 30 of the illumination device 3 to generate a plurality of third pattern images, and at the same time receive the fourth measurement pattern light reflected from the measuring object W via the opening 30a of the illumination housing 30 of the illumination device 3 to generate a plurality of fourth pattern images. Similarly, when the fifth to the eighth light projecting sections 35 to 38 are included, fifth to eighth pattern images can be generated.

Figure 3:
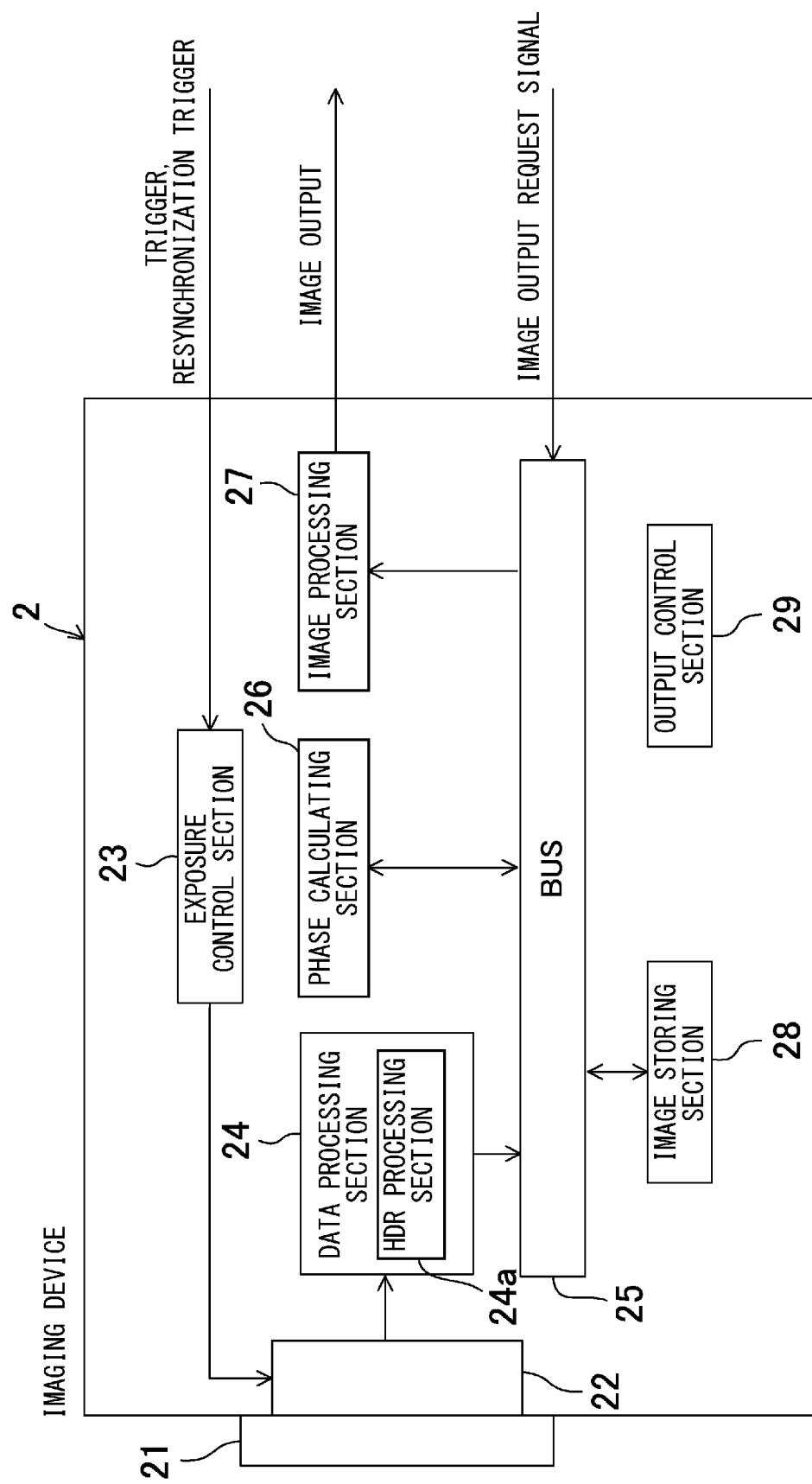
FIG. 3 is a block diagram of an imaging device.

As shown in FIG. 3, the imaging device 2 includes a lens included in an optical system, and an imaging element 22 which includes a light receiving element that receives light incident from the lens 21. A so-called camera is constituted with the lens 21 and the imaging element 22. The lens 21 is a member for forming an image of at least a height measurement area or an inspection target area on the measuring object W on the imaging element 22. An optical axis of the lens 21 and the central axis A of the opening 30a of the illumination housing 30 of the illumination device 3 maybe matched or not matched. In addition, the distance between the imaging device 2 and the illumination device 3 in the direction of the central axis A can be arbitrarily set within a range where the illumination device 3 does not interfere with imaging by the imaging device 2, and is designed with a high degree of freedom in installation.

A CCD or CMOS sensor, etc. can be used as the imaging element 22. The imaging element 22 receives reflected light from the measuring object W to acquire an image, and outputs the acquired image data to a data processing section 24. In this example, a high-resolution CMOS sensor is used as the imaging element 22. An imaging element that can capture an image in color may also be used. The imaging element 22 can also capture a normal luminance image in addition to a pattern projection image. In the case of capturing a normal luminance image, it is only necessary to turn on all the LEDs 31b, 32b, 33b, and 34b of the illumination device 3 and control all the LCDs 31d, 32d, 33d, and 34d so as not to form pattern light. When there is illumination for observation 50 as shown in FIG. 5 and FIG. 6, the imaging device 2 can capture a normal luminance image using the illumination for observation 50.

In addition to the camera, the imaging device 2 further includes an exposure control section 23, the data processing section 24, a phase calculating section 26, an image processing section 27, an image storing section 28, and an output control section 29. The data processing section 24, the phase calculating section 26, the image processing section 27, and the image storing section 28 are connected to a built-in common bus line 25 in the imaging device 2 and can transmit and receive data to and from each other. The exposure control section 23, the data processing section 24, the phase calculating section 26, the image processing section 27, the image storing section 28, and the output control section 29 can be configured with hardware, and can also be configured with software.

(Configuration of Exposure Control Section 23)

A trigger signal for starting imaging and a resynchronization trigger signal for synchronizing with the illumination device 3 during imaging are input to the exposure control section 23 from the controller section 4. The input timing of the trigger signal and the resynchronization trigger signal to be input to the exposure control section 23 is set to be the same as the timing of the trigger signal and the resynchronization trigger signal to be input to the illumination device 3.

The exposure control section 23 is a part that directly controls the imaging element 22, and controls the imaging timing and exposure time of the imaging element 22 according to the trigger signal and the resynchronization trigger signal input to the exposure control section 23. Information relating to imaging conditions is input from the controller section 4 to the exposure control section 23 and stored in the exposure control section 23. The information relating to imaging conditions includes, for example, the number of times of imaging, imaging interval (time until the next imaging is performed after imaging), exposure time at the time of imaging (shutter speed), etc.

As a trigger signal sent from the controller section 4 is input, the exposure control section 23 causes the imaging element 22 to start imaging. In the embodiment, it is necessary to generate a plurality of pattern images for one time of input of the trigger signal. Therefore, it is configured such that a resynchronization trigger signal is input from the controller section 4 during imaging, and synchronization with the illumination device 3 can be achieved by the input of the resynchronization trigger signal.

Specifically, the exposure control section 23 controls the imaging element 22 such that the imaging element 22 captures (exposures) an image while a pattern which is completely formed on the first LCD 31d is being projected onto the measuring object W as pattern light. The exposure time may be set the same as the time during which the pattern is being projected as the pattern light onto the measuring object W. However, the timing for starting exposure may be set slightly later than the timing at which projection of the pattern light is started.

Thereafter, the exposure control section 23 controls the imaging element 22 such that the imaging element 22 captures an image while a pattern which is formed on the second LCD 32d is being projected onto the measuring object W as pattern light. When this imaging is completed, the exposure control section 23 controls the imaging element 22 such that the imaging element 22 captures an image while a pattern which is formed on the third LCD 33d is being projected onto the measuring object W as pattern light. Then, the exposure control section 23 controls the imaging element 22 such that the imaging element 22 captures an image while a pattern which is formed on the fourth LCD 34d is being projected onto the measuring object W as pattern light. By repeating this, a plurality of first pattern images, a plurality of second pattern images, a plurality of third pattern images, and a plurality of fourth pattern images are generated.

The imaging element 22 transfers the image data to the data processing section 24 every time imaging is completed. The image data can be stored in the image storing section 28 shown in FIG. 3. That is, since the imaging timing of the imaging element 22 does not coincide with an image requesting timing of the controller section 4, the image storing section 28 functions as a buffer to absorb this time lag.

The image data is transferred to the data processing section 24 shown in FIG. 3 between imaging and next imaging. However, it is not limited thereto and, for example, imaging and data transferring can be performed in parallel. As imaging of the measuring object W irradiated with a pattern light is completed, the image data of the previous pattern is transferred to the data processing section 24 while imaging of the measuring object W irradiated with pattern light of a next pattern is being performed. In this way, the previously captured image data can be transferred to the data processing section 24 at the time of next imaging.

Moreover, it is possible to image a plurality of times the measuring object W irradiated with the pattern light of a pattern. In this case, the first LED 31*b* may be turned on only during imaging by the imaging element 22. The exposure time of the imaging element 22 maybe set such that imaging of the first time is longer than imaging of the second time, and it may also be set such that imaging of the second time is longer than imaging of the first time. When imaging the measuring object W irradiated with pattern light of another pattern, it is also possible to image a plurality of times. In this way, it is possible to generate a plurality of images having different exposure times while one of the plurality of pattern lights is being projected onto the measuring object W. The plurality of images having different exposure times are used when high dynamic range processing which will be described later is performed. The first LED 31*b* may be kept turned on while the measuring object W irradiated with pattern light of a pattern is being imaged a plurality of times.

(Configuration of Data Processing Section 24)

The data processing section 24 shown in FIG. 3 generates a plurality of pattern image sets based on the image data output from the imaging element 22. When the imaging element 22 generates a plurality of first pattern images, the data processing section 24 generates a first pattern image set including a plurality of first pattern images. Similarly, a second pattern image set including a plurality of second pattern images is generated, a third pattern image set including a plurality of third pattern images is generated, and a fourth pattern image set including a plurality of fourth pattern images is generated. Therefore, the imaging device 2 can receive reflected light from the measuring object W of the plurality of pattern lights projected from each liquid crystal panel and generate a plurality of pattern image sets corresponding to each liquid crystal panel.

When pattern light is projected only by the first LCD 31*d* and the second LCD 32*d*, the first pattern image set and the second pattern image set are generated. When pattern light is projected only by the third LCD 33*d* and the fourth LCD 34*d*, the third pattern image set and the fourth pattern image set are generated.

The data processing section 24 can generate a phase shift pattern image set by projecting pattern light according to the phase shift method, and can also generate a gray code pattern image set by projection pattern light according to the space encoding method.

The pattern light according to the phase shift method is a pattern light in which the illuminance distribution is changed, for example, in a sine-wave shape. However, it may also be other pattern lights. Although in the embodiment, the number of the pattern lights according to the phase shift method is eight, it is not limited thereto. The pattern light according to the space encoding method is a striped pattern having a stripe width which becomes smaller from ½, ¼, . . . of the full width with a black and white duty ratio of 50%. Although in the embodiment, the number of the pattern lights according to the space encoding method is four, it is not limited thereto. Note that the pattern described in the example is in a case where a gray code is used as a space code, and although forming pattern light by halving the stripe width is not for the purpose of the gray code, the result simply turns in this way. In addition, the gray code is a type of code system in which noise resistance is taken into consideration by setting the Hamming distance with an adjacent code to 1.

Figure 15:
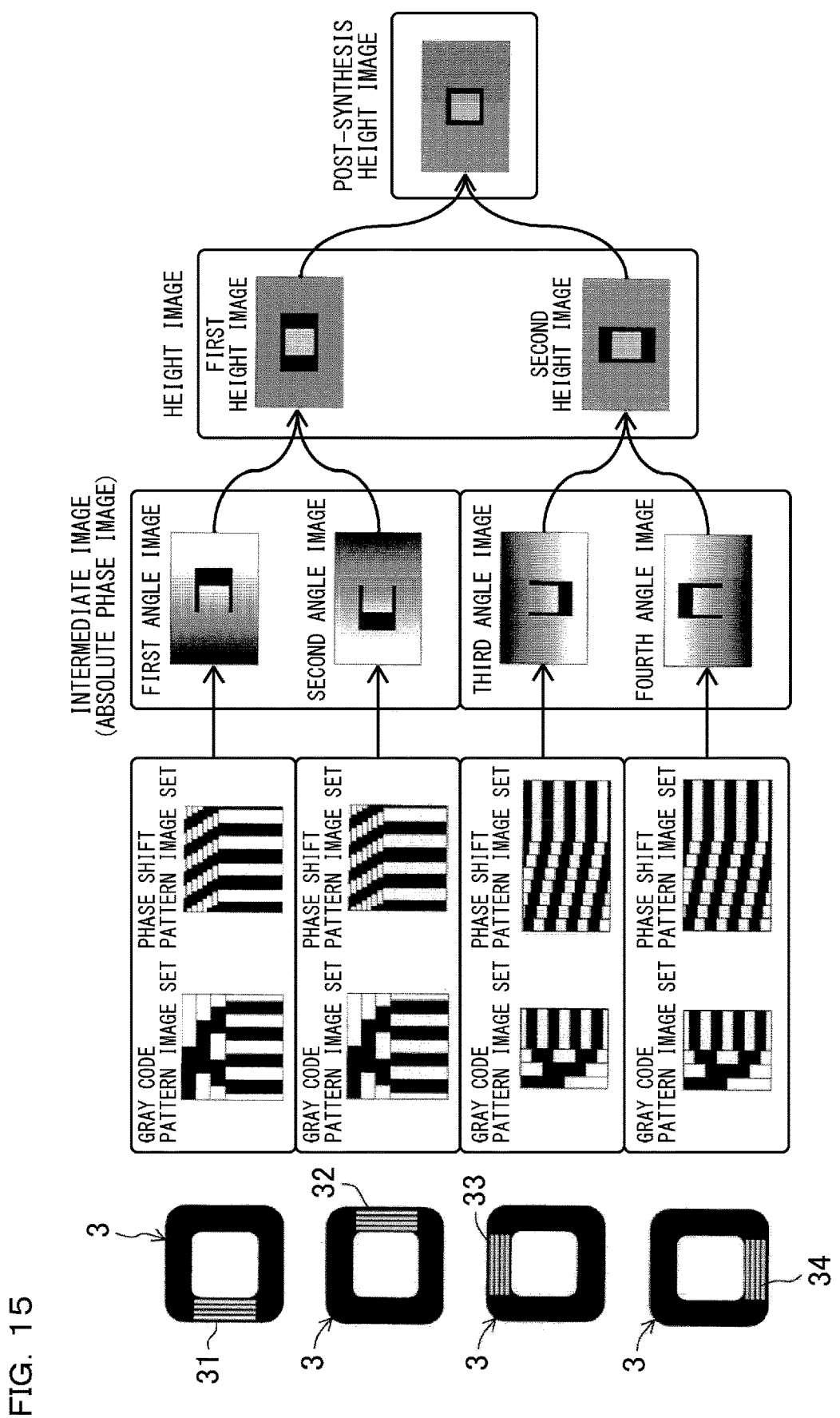
FIG. 15 is a diagram explaining a procedure of generating an intermediate image and a reliability image from a pattern image set using an image example.

As shown in FIG. 15, when the first light projecting section 31 of the illumination device 3 irradiates the measuring object W with four pattern lights according to the space encoding method, the data processing section 24 generates a gray code pattern image set including four different images. When the first light projecting section 31 of the illumination device 3 irradiates the measuring object W with eight pattern lights according to the phase shift method, the data processing section 24 generates a phase shift pattern image set including eight different images. The gray code pattern image set and the phase shift pattern image set obtained by irradiation of pattern light by the first light projecting section 31 are together the first pattern image set.

Similarly, when the second light projecting section 32 of the illumination device 3 irradiates the measuring object W with pattern light according to the space encoding method, a gray code pattern image set is generated. When the measuring object W is irradiated with pattern light according to the phase shift method, a phase shift pattern image set is generated. The gray code pattern image set and the phase shift pattern image set obtained by irradiation of pattern light by the second light projecting section 32 are together the second pattern image set.

Similarly, when the third light projecting section 33 of the illumination device 3 irradiates the measuring object W with pattern light according to the space encoding method, a gray code pattern image set is generated. When the measuring object W is irradiated with pattern light according to the phase shift method, a phase shift pattern image set is generated. The gray code pattern image set and the phase shift pattern image set obtained by irradiation of pattern light by the third light projecting section 33 are together the third pattern image set.

Similarly, when the fourth light projecting section 34 of the illumination device 3 irradiates the measuring object W with pattern light according to the space encoding method, a gray code pattern image set is generated. When the measuring object W is irradiated with pattern light according to the phase shift method, a phase shift pattern image set is generated. The gray code pattern image set and the phase shift pattern image set obtained by irradiation of pattern light by the fourth light projecting section 34 are together the fourth pattern image set.

Each pattern image set can be stored in the image storing section 28 shown in FIG. 3.

As shown in FIG. 3, the data processing section 24 includes an HDR processing section 24*a*. HDR processing refers to high dynamic range (high dynamic range imaging) synthesis processing, and in the HDR processing section 24*a*, a plurality of images having different exposure times are synthesized. That is, as described above, when the measuring object W irradiated with the pattern light of a pattern is imaged a plurality of times with different exposure times, a plurality of luminance images with different exposure times are obtained, and an image having a dynamic range wider than the dynamic range of each luminance image can be generated by synthesizing these luminance images. A conventionally known method may be used as the HDR synthesis method. Instead of changing the exposure time, it is also possible to change the intensity of the irradiated light to obtain a plurality of luminance images having different brightness and then synthesize these luminance images.

(Configuration of Phase Calculating Section 26)

Figure 14:
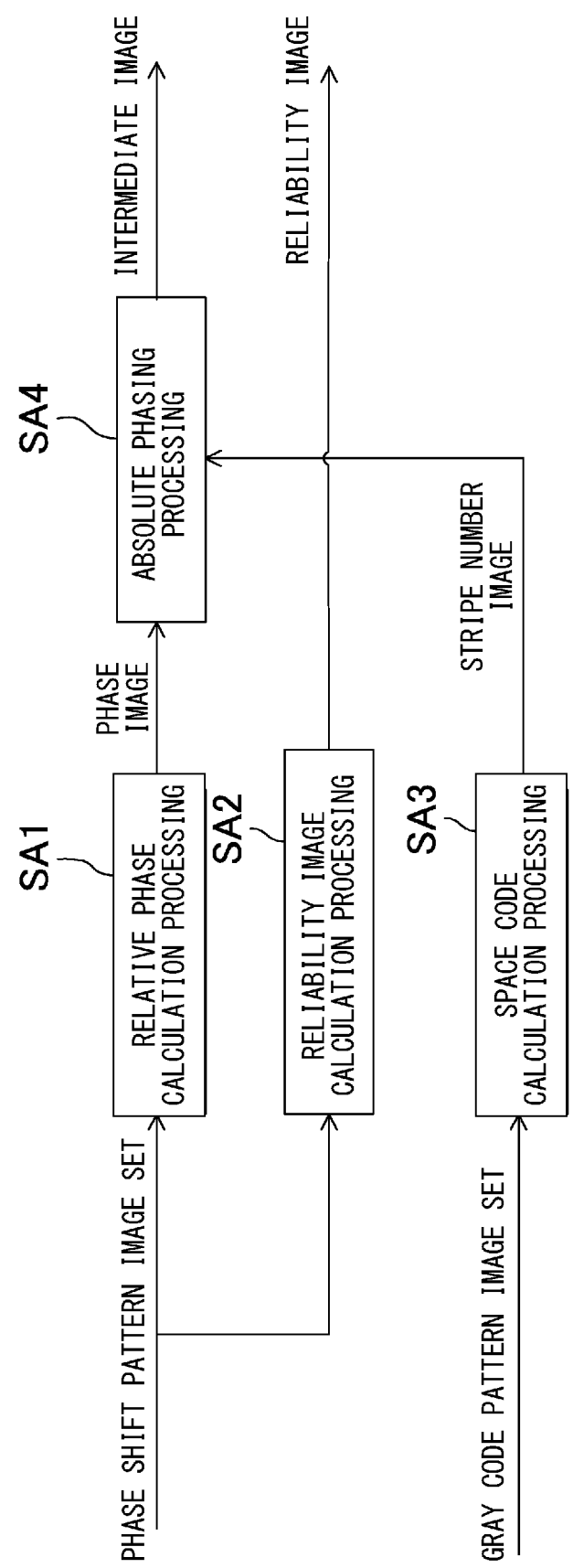
FIG. 14 is a diagram showing a procedure of generating an intermediate image and a reliability image from a pattern image set.

The phase calculating section 26 shown in FIG. 3 is a part that calculates an absolute phase image serving as original data of a height image. As shown in FIG. 14, in step SA1, relative phase calculation processing is performed by acquiring each image data of the phase shift pattern image set and using the phase shift method. This can be expressed as a relative phase (phase before unwrapping) in FIG. 16, and a phase image is obtained by the relative phase calculation processing in step SA1.

On the other hand, in step SA3 in FIG. 14, space code calculation processing is performed and a stripe number image is obtained by acquiring each image data of the gray code pattern image set and using the space encoding method. The stripe number image is an image which, when a space irradiated with light is divided into a plurality of small spaces, can be identified by assigning a series of space code numbers to the small spaces. FIG. 16 shows a gist of assigning a series of space codes.

In step SA4 in FIG. 14, absolute phase phasing processing is performed. In the absolute phase phasing processing, an absolute phase image (intermediate image) is generated by synthesizing (unwrapping) the phase image obtained in step SA1 and the stripe number image obtained in step SA3. Since phase jump correction (phase unwrapping) by the phase shift method can be performed using the space code number obtained by the space encoding method, it is possible to obtain a high-resolution measurement result while ensuring a wide dynamic range of height.

Height measurement maybe performed only by the phase shift method. In this case, the height measurement dynamic range becomes narrow. Therefore, in a case of the measuring object W having such a large height different that the phase shifts by one cycle or more, the height cannot be measured correctly. On the contrary, in a case of the measuring object W having a small change in height, imaging or synthesis of the stripe image by the space encoding method is not performed, and thus there is an advantage that the processing speed can be increased accordingly. For example, when measuring the measuring object W with small difference in height direction, it is not necessary to take a wide dynamic range. Therefore, it is possible to shorten the processing time while maintaining high-precision height measurement performance even by the phase shift method alone. In addition, since the absolute height is known, it may be configured to measure the height by the space encoding method alone. In this case, the precision can be improved by increasing the number of codes.

Further, in step SA2 in FIG. 14, each image data of the phase shift pattern image set is acquired, and reliability image calculation processing is performed. In the reliability image calculation processing, a reliability image indicating phase reliability is calculated. This is an image that can be used for determination of invalid pixels.

The phase image, the stripe number image, and the reliability image can be stored in the image storing section 28 shown in FIG. 3.

The absolute phase image generated by the phase calculating section 26 can also be called as an angle image in which each pixel has irradiation angle information of measurement pattern light onto the measuring object W. That is, since the first pattern image set (phase shift pattern image set) includes eight first pattern images imaged by shifting the phase of a sine-wave striped pattern, each pixel has the irradiation angle information of the measurement pattern light onto the measuring object W by using the phase shift method. In other words, since the phase calculating section 26 is a part that generates, based on a plurality of first pattern images, a first angle image in which each pixel has irradiation angle information of the first measurement pattern light onto the measuring object W, the phase calculating section 26 can also be called an angle image generating section. The first angle image is an image in which an angle of light irradiated to the measuring object W from the first LED 31b is imaged.

Similarly, the phase calculating section 26 can generate a second angle image in which each pixel has irradiation angle information of the second measurement pattern light onto the measuring object W based on a plurality of second pattern images, a third angle image in which each pixel has irradiation angle information of the third measurement pattern light onto the measuring object W based on a plurality of third pattern images, and a fourth angle image in which each pixel has irradiation angle information of the fourth measurement pattern light onto the measuring object W based on a plurality of fourth pattern images. The second angle image is an image in which an angle of light irradiated to the measuring object W from the second LED 32b is imaged. The third angle image is an image in which an angle of light irradiated to the measuring object W from the third LED 33b is imaged. The fourth angle image is an image in which an angle of light irradiated to the measuring object W from the fourth LED 34b is imaged. The uppermost image of the intermediate images in FIG. 15 is the first angle image, the second image from the top is the second angle image, the third image from the top is the third angle image, and the bottom image is the fourth angle image. The portion of each angle image that appears to be completely black is a portion that is a shadow of illumination (each LED), and becomes an invalid pixel without angle information.

(Configuration of Image Processing Section 27)

The image processing section 27 is a part that performs image processing such as gamma correction, white balance adjustment, and gain correction on each of the pattern images, phase images, stripe number images, and reliability images. Each of the pattern images, phase images, stripe number images, and reliability images after image processing can be stored in the image storing section 28. Image processing is not limited to the processing described above.

(Configuration of Output Control Section 29)

The output control section 29 is a part that outputs, when an image output request signal output from the controller section 4 is received, only an image instructed by the image output request signal among the images stored in the image storing section 28 to the controller section 4 via the image processing section 27 according to that image output request signal. In this example, each of the pattern images, phase images, stripe number images, and reliability images before image processing is stored in the image storing section 28, and only the image requested by the image output request signal from the controller section 4 is subjected to image processing by the image processing section 27 and is output to the controller section 4. The image output request signal can be output when the user performs various measurement operations and inspection operations.

In the embodiment, the data processing section 24, the phase calculating section 26, and the image processing section 27 are provided in the imaging device 2. However, it is not limited thereto, and they can be provided in the controller section 4. In this case, the image data output from the imaging element 22 is output to the controller section 4 and processed.

(Configuration of Controller Section 4)

As shown in FIG. 2, the controller section 4 includes an imaging light projection control section 41, a height measuring section 42, an image synthesizing section 43, an inspecting section 45, a display control section 46, and a history storing section 47. The controller section 4 is provided separately from the imaging device 2 and the illumination device 3.

(Configuration of Imaging Light Projection Control Section 41)

The imaging light projection control section 41 outputs formation information of the pattern light, a trigger signal, and a resynchronization trigger signal to the illumination device 3 at a predetermined timing, and outputs information relating to the imaging conditions, a trigger signal, and a resynchronization trigger signal to the imaging device 2 at a predetermined timing. The trigger signal and the resynchronization trigger signal output to the illumination device 3 are synchronized with the trigger signal and the resynchronization trigger signal output to the imaging device 2. The formation information of the pattern light and the information relating to the imaging conditions can be stored in the imaging light projection control section 41 or another storing section (not shown), for example. As the user performs a predetermined operation (height measurement preparation operation, inspection preparation operation), the formation information of the pattern light is output to the illumination device 3 and temporarily stored in the light projection control section 39 of the illumination device 3, and the information relating to the imaging conditions is output to the imaging device 2 and temporarily stored in the exposure control section 23. In the example, the illumination device 3 is configured to control the LEDs and the LCDs by the light projection control section 39 integrated in the illumination device 3, and thus the illumination device 3 can also be called a smart type illumination device. The imaging device 2 is configured to control the imaging element 22 by the exposure control section 23 integrated in the imaging device 2, and thus the imaging device 2 can also be called a smart type imaging device.

When the imaging device 2 and the illumination device 3 individually perform controls, there is a problem that, as the number of times of imaging increases, the imaging timing and the illumination timing (pattern light projection timing) are shifted and the image obtained by the imaging device 2 becomes darker. In particular, as described above, the first pattern image set includes a total of 12 images, that is, eight images in the phase shift pattern image set and four in the gray code pattern image set, and the second pattern image set includes the same. When imaging for HDR is further performed, the number of times of imaging increases and the time lag between the imaging timing and the illumination timing becomes significant.

In the example, the resynchronization trigger signal is output in synchronization with the illumination device 3 and the imaging device 2, and thus the illumination device 3 and the imaging device 2 can be synchronized in the middle of imaging. As a result, even if the number of times of imaging increases, the time lag between the imaging timing and the illumination timing is so small that it does not cause a problem. Further, it is possible to suppress the image from becoming dark during irradiation of the phase shift pattern or the gray code pattern, and it is possible to reduce phase distortion and the possibility of erroneous code determination. The resynchronization trigger signal can be output a plurality of times.

The imaging light projection control section 41 includes an irradiation mode switching section 41a. It is possible to switch to any one irradiation mode of a first irradiation mode in which the first measurement pattern light and the second measurement pattern light are irradiated by the first light projecting section 31 and the second light projecting section 32 respectively, a second irradiation mode in which, after the first measurement pattern light and the second measurement pattern light are irradiated by the first light projecting section 31 and the second light projecting section 32 respectively, the third measurement pattern light and the fourth measurement pattern light are irradiated by the third light projecting section 33 and the fourth light projecting section 34 respectively, and a third irradiation mode in which the third measurement pattern light and the fourth measurement pattern light are irradiated by the third light projecting section 33 and the fourth light projecting section 34 respectively. The user can switch the irradiation mode by operating the console section 6 or the mouse 7 while looking at the display section 5. In addition, the controller section 4 may be configured to automatically switch the irradiation mode.

(Configuration of Height Measuring Section 42)

The height measuring section 42 is configured to be capable of measuring the height of the measuring object W in the direction of the central axis A of the illumination device 3 according to the irradiation angle information of each pixel of the first angle image and the irradiation angle information of each pixel of the second angle image generated by the phase calculating section 26, and the relative position information between the first light projecting section 31 and the second light projecting section 32 inside the illumination housing 30 of the illumination device 3.

A specific method for measuring the height by the height measuring section 42 will be described hereinafter. As described above, by generating an angle image by phase unwrapping, an angle from illumination to each pixel is determined. The first angle image is an image showing an angle of light irradiated from the first LED 31b to the measuring object W, and the second angle image is an image showing an angle of light irradiated from the second LED 32b to the measuring object W. The first LED 31b and the second LED 32b are integrally supported by the illumination housing 30, and the distance between the first LED 31b and the second LED 32b is 1 (shown in FIG. 17) as described above.

FIG. 17 illustrates a case of obtaining a height of an arbitrary point H on the measuring object W. The direction directly below the first LED 31b is set as 0°, and the direction 45° from the first LED 31b is set as 1. The right direction in FIG. 17 is positive, and the left direction is negative. The angle of light irradiated from the first LED 31b to the point H can be obtained from a pixel corresponding to the point H in the first angle image, and an inclination of a straight line connecting the point H and the first LED 31b is 1/a1. Further, the angle of light irradiated from the second LED 32b to the point H can be obtained from a pixel corresponding to the point H in the second angle image, and an inclination of a straight line connecting the point H and the second LED 32b is −1/a2. The a1 and a2 are phases.

$$Z = 1/a1 * X + 0 \quad \text{Equation 1}$$

$$Z = -1/a2 * (X - 1) \quad \text{Equation 2}$$

The height is obtained by solving Z for Equation 1 and Equation 2.

a1Z=X
a2Z=−X+1
Z=1/(a1+a2)
X=a1*1/(a1+a2)

In this way, the height of each point on the measuring object W can be obtained. Since there is no variable related to the position of the imaging device 2 in each of the above equations, it can be seen that the position of the imaging device 2 is irrelevant in obtaining the height of each point on the measuring object W. However, since there is no angle information for a pixel that is an invalid pixel in the angle image, the height of that point cannot be obtained. That is, a calculated Z coordinate indicates not a distance between the imaging device 2 and the measuring object W but a distance to the measuring object W when viewed from the illumination device 3. Regardless of the installation position of the imaging device 2, the Z coordinate obtained by the installation position of the illumination device 3 is determined.

Although not shown in the drawings, similarly, the angle of the light irradiated from the third LED 33b to the point H can be obtained from a pixel corresponding to the point H in the third angle image, and the angle of the light irradiated from the fourth LED 34b to the point H can be obtained from a pixel corresponding to the point H in the fourth angle image. Therefore, the height of each pixel can be obtained based on the third angle image and the fourth angle image.

For example, FIG. 15 shows a case where the height measuring section 42 generates a first height image indicating a height of the measuring object W according to the irradiation angle information of each pixel of the first angle image and the irradiation angle information of each pixel of the second angle image as well as the relative position information between the first light projecting section 31 and the second light projecting section 32 inside the illumination housing 30, and also generates a second height image indicating a height of the measuring object W according to the irradiation angle information of each pixel of the third angle image and the irradiation angle information of each pixel of the fourth angle image as well as the relative position information between the third light projecting section and the fourth light projecting section 34 inside the illumination housing 30.

The first height image can grasp the height of each pixel, and thus it can be used as an inspection target image used when performing various inspections. In addition, the second height image can also grasp the height of each pixel, and thus it can be used as an inspection target image used when performing various inspections. Accordingly, the height measuring section 42 can also be called an inspection target image generating section that generates an inspection target image based on a plurality of intermediate images.

In the case shown in FIG. 15, first, the first angle image is generated from the first pattern image set obtained by the projection of pattern light by the first light projecting section 31, and the second angle image is generated from the second pattern image set obtained by the projection of pattern light by the second light projecting section 32. In the first angle image, since the first light projecting section 31 irradiates light from the left side of the measuring object W, a shadow is formed on the right side of the measuring object W and that portion becomes an invalid pixel. On the other hand, in the second angle image, since the second light projecting section 32 irradiates light from the right side of the measuring object W, a shadow is formed on the left side of the measuring object W and that portion becomes an invalid pixel. Since the first height image is generated by the first angle image and the second angle image, a pixel that is an invalid pixel in one of the angle images is also an invalid pixel in the first height image.

Similarly, the third angle image is generated from the third pattern image set obtained by the projection of pattern light by the third light projecting section 33, and the fourth angle image is generated from the fourth pattern image set obtained by the projection of pattern light by the fourth light projecting section 34. In the third angle image, since the third light projecting section 33 irradiates light from an upper side (the upper side in the drawing) of the measuring object W, a shadow is formed on a lower side (the lower side in the drawing) of the measuring object W and that portion becomes an invalid pixel. On the other hand, in the fourth angle image, since the fourth light projecting section 34 irradiates light from the lower side of the measuring object W, a shadow is formed on the upper side of the measuring object W and that portion becomes an invalid pixel. Since the second height image is generated by the third angle image and the fourth angle image, a pixel that is an invalid pixel in one of the angle images is also an invalid pixel in the second height image. In order to reduce invalid pixels as much as possible, in this embodiment, the image synthesizing section 43 is provided in the controller section 4 as shown in FIG. 2.

In the embodiment, the case where the height measuring section 42 is provided in the controller section 4 has been described. However, it is not limited thereto, and although not shown in the drawings, the height measuring section may be provided in the imaging device 2.

(Configuration of Image Synthesizing Section 43)

The image synthesizing section 43 is configured to synthesize the first height image and the second height image to generate a post-synthesis height image. As a result, a portion that is an invalid pixel in the first height image is represented as a valid pixel in the post-synthesis height image for a portion that is not an invalid pixel in the second height image. On the contrary, a portion that is an invalid pixel in the second height image is represented as a valid pixel in the post-synthesis height image for a portion that is not an invalid pixel in the first height image. Therefore, the number of invalid pixels in the post-synthesis height image can be reduced. Conversely, in a case where it is desired to obtain a height with high reliability, only when both the first height image and the second height image are valid and the difference therebetween is small, that is, equal to or smaller than a predetermined value, an average height thereof may be made valid.

In other words, by irradiating the measuring object W with pattern light from four different directions, it is possible to increase the number of valid pixels in the height image and reduce blind spots, and it is also possible to improve the reliability of the measurement result. For the measuring object W where invalid pixels are sufficiently reduced by irradiation of pattern light from two directions, it is only necessary to generate one height image. In this case, it may be configured to let the user select whether to generate the first height image or the second height image. When only one height image is generated, there is an advantage that the measurement time is shortened.

Since the post-synthesis height image can also grasp the height of each pixel, it can be used as an inspection target image used when performing various inspections. Therefore, the image synthesizing section 43 can also be called an inspection target image generating section that generates an inspection target image.

In the embodiment, the case where the image synthesizing section 43 is provided in the controller section 4 has been described. However, it is not limited thereto, and although not shown in the drawings, the image synthesizing section may be provided in the imaging device 2.

(Configuration of Inspecting Section 45)

The inspecting section 45 is a part that executes inspection processing based on an arbitrary image among the first height image, the second height image, and the post-synthesis height image. A presence/absence inspecting section 45*a*, an appearance inspecting section 45*b*, and a dimension inspecting section 45*c* are provided in the inspecting section 45. However, this is an example, and not all of these inspecting sections are essential, and an inspecting section other than these inspecting sections may be provided. The presence/absence inspecting section 45*a* is configured to be capable of determining the presence/absence of the measuring object W and the presence/absence of a component attached to the measuring object W, etc. by image processing. The appearance inspecting section 45*b* is configured to be capable of determining whether an outer shape or the like of the measuring object W is a predetermined shape or not by image processing. The dimension inspecting section 45*c* is configured to be capable of determining whether the dimension of each portion of the measuring object W is a predetermined dimension or not, or determining the dimension of each portion by image processing. The determination methods are conventionally known methods, and thus a detailed description thereof will be omitted.

(Configuration of Display Control Section 46)

The display control section 46 is configured to be capable of displaying the first height image, the second height image, and the post-synthesis height image, etc. on the display section 5, and generating a user interface for operation that is for operating the image processing apparatus 1, a user interface for setting that is for setting the image processing apparatus 1, a user interface for height measurement result display that is for displaying a height measurement result of a measuring object, a user interface for inspection result display that is for displaying various inspection results of the measuring object, etc to display the same on the display section 5.

(Configuration of History Storing Section 47)

The history storing section 47 can be configured with a storing device such as an RAM. The first height image, the second height image, and the post-synthesis height image, etc. output from the imaging device 2 to the controller section 4 can be stored in the history storing section 47. An image stored in the history storing section 47 can be read out and displayed on the display section 5 by operating the console section 6 or the mouse 7.

(Correction Processing)

As described above, in the embodiment, the first pattern image is generated by imaging the measuring object W in a state in which the pattern light is projected from the first light projecting section 31, and the second pattern image is generated by imaging the measuring object W in a state in which the pattern light is projected from the second light projecting section 32. An angle image having irradiation angle information is generated based on the first pattern image and the second pattern image. The height of the measuring object W can be measured based on the known relative position between the first LED 31*b* and the second LED 32*b* and the irradiation angle information regardless of the relative positional relation between the imaging device 2 and the illumination device 3.

In this case, since the relative position between the first LED 31*b* and the second LED 32*b* affects the height measurement result, it is necessary to strictly define the relative position between the first LED 31*b* and the second LED 32*b*. However, in manufacture, variations in components and assembling positions are inevitable, and it is difficult to strictly define the relative position between the first LED 31*b* and the second LED 32*b*. Therefore, in the example, it is configured such that the position of the first LED 31*b* or the second LED 32*b* in the illumination device 3 can be corrected.

Figure 18:
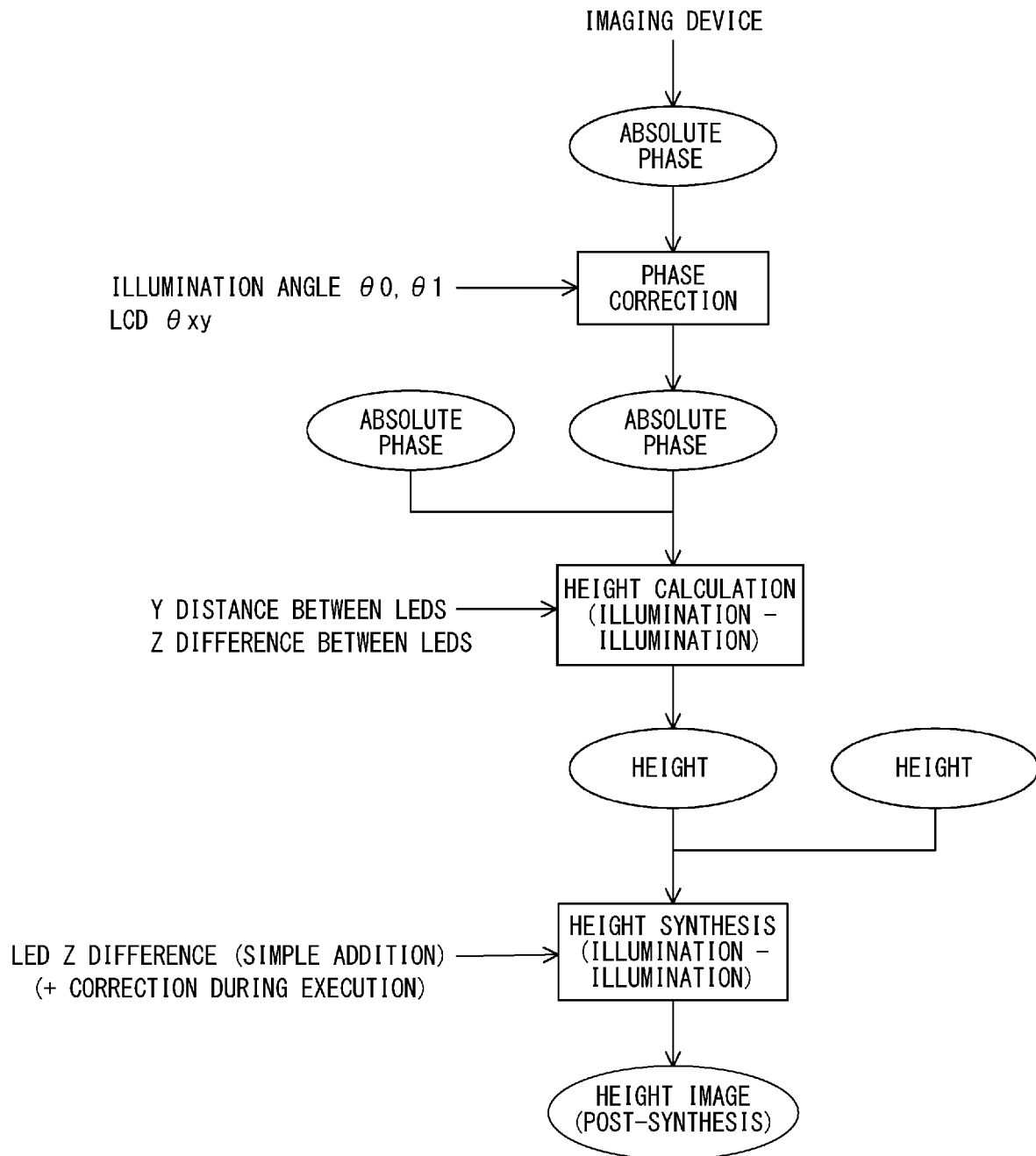
FIG. 18 is a diagram explaining a flow of correction processing.

An overall flow of the correction processing is shown in FIG. 18. A specific example of deviation will be described with reference to FIG. 19. FIG. 19A shows a case where, when the "0" point is to be positioned directly below the first LED 31*b*, a mounting angle of the first LED 31*b* will be deviated by θ0, and thus the "0" point is positioned in a minus direction (the left direction in the drawing) by only a predetermined amount from directly below the first LED 31*b*. FIG. 19B shows a case where the first LED 31*b* is deviated in the Z direction, and in the example, the first LED 31*b* is deviated downward from a regular mounting position.

As shown in FIG. 19C, these deviations are corrected so that the "0" point is positioned directly below the first LED 31*b* and on a reference plane and has an irradiation angle of 0 to 45°. Specifically, it can be performed based on the flow shown in FIG. 18. First, a coordinate of an absolute phase 0 is estimated and a coordinate of an absolute phase 1 is estimated. Further, a correction coefficient is derived after the position of the first LED 31*b* is estimated. The correction can be a linear correction. For example, an equation of $\Phi'=a*\Phi+b$ can be used, where $\Phi'$ is an absolute phase after correction, and $\Phi$ is an absolute phase before correction. In the equation, $a=\tan\theta1+\tan\theta0$, $b=-\tan\theta0$.

Figure 20:
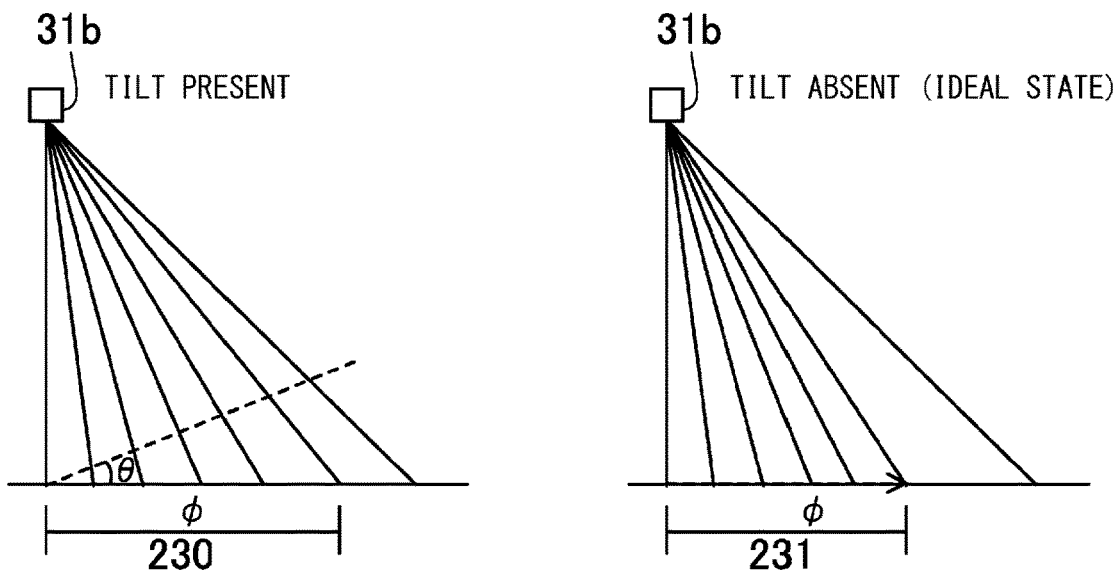
FIG. 20 is a diagram showing presence and absence of tilt.

Further, as shown in FIG. 20, when there is a tilt angle, the larger the absolute phase, the wider the interval thereof. However, in an ideal state where there is no tilt angle, the absolute phase has equal pitches. When a length of a line segment 230 where a tilt angle is present is compared with a length of a line segment 231 where there is no tilt angle, the length of the line segment 230 where a tilt angle is present is longer, and the difference in the length becomes an error. In other words, in contrast to the ideal state, the value of the absolute phase $\Phi$ where a tilt angle is present shifts, and is smaller than the value when there is no tilt angle.

To correct the tilt angle, first, the tilt is directly measured and a conversion equation is applied. When the tilt angle cannot be directly measured, the absolute phase may be secondarily corrected. The conversion equation is $\Phi'=\Phi\cos\theta/(1-\Phi\sin\theta)$, where $\Phi$ is an observed absolute phase, and $\Phi'$ is an absolute phase after conversion (absolute phase when there is no tilt angle).

Figure 21:
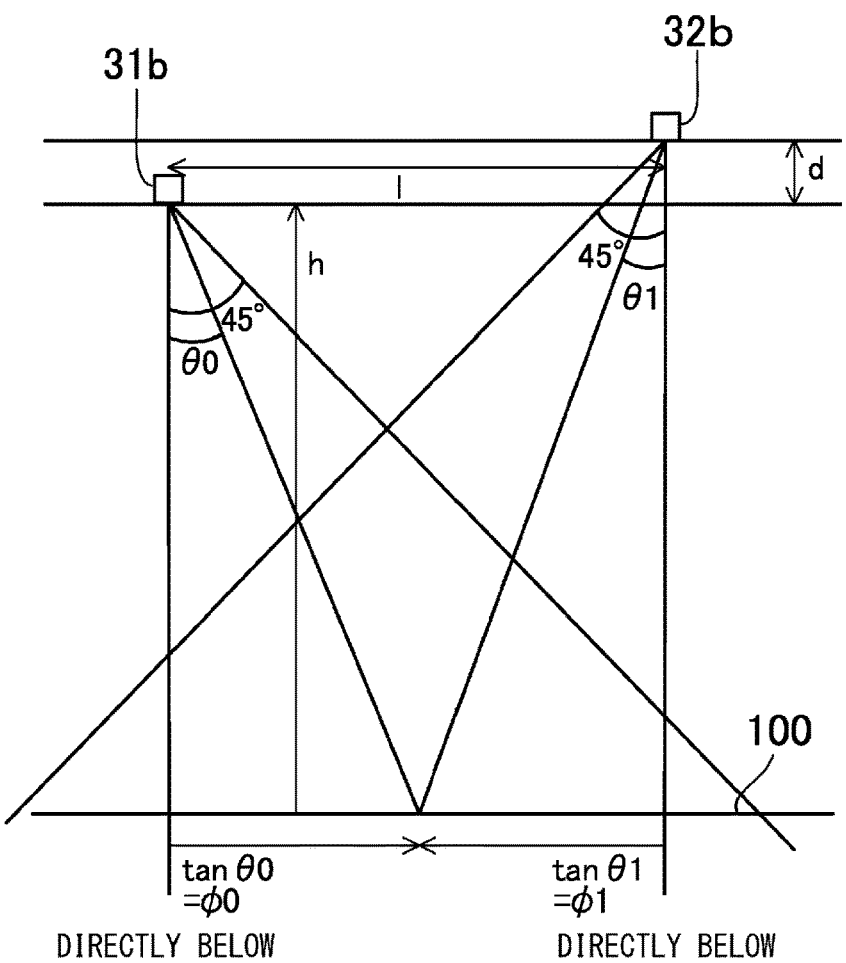
FIG. 21 is a schematic diagram showing a case where a height deviation occurs in a pair of light emitting diodes.

FIG. 21 schematically shows a case where a height deviation occurs in the pair of the first LED 31*b* and the second LED 32*b*. In the example, the second LED 32*b* is positioned above the first LED 31*b* by a dimension d. As a precondition for performing height correction of the first LED 31*b* and the second LED 32*b*, it is necessary that the irradiation angle range of the first LED 31*b* and the second LED 32*b* has already been normalized (adjusted) to 0° to 45°. The correction equation for height correction is $h=(l-d*\phi1)/(\phi0+\phi1)$.

That is, the distance l between the first LED 31*b* and the second LED 32*b* is $l=h*\tan\theta0+(h+d)*\tan\theta1$. The relation is solved for h.

$h*(\tan\theta0+\tan\theta1)=l-d*\tan\theta1$ $h=(l-d*\tan\theta1)/(\tan\theta0+\tan\theta1)$ Here, since $\tan\theta0$ and $\tan\theta1$ are the same as the absolute phases after normalization, it becomes $h=(l-d*\phi1)/(\phi0+\phi1)$.

Figure 22:
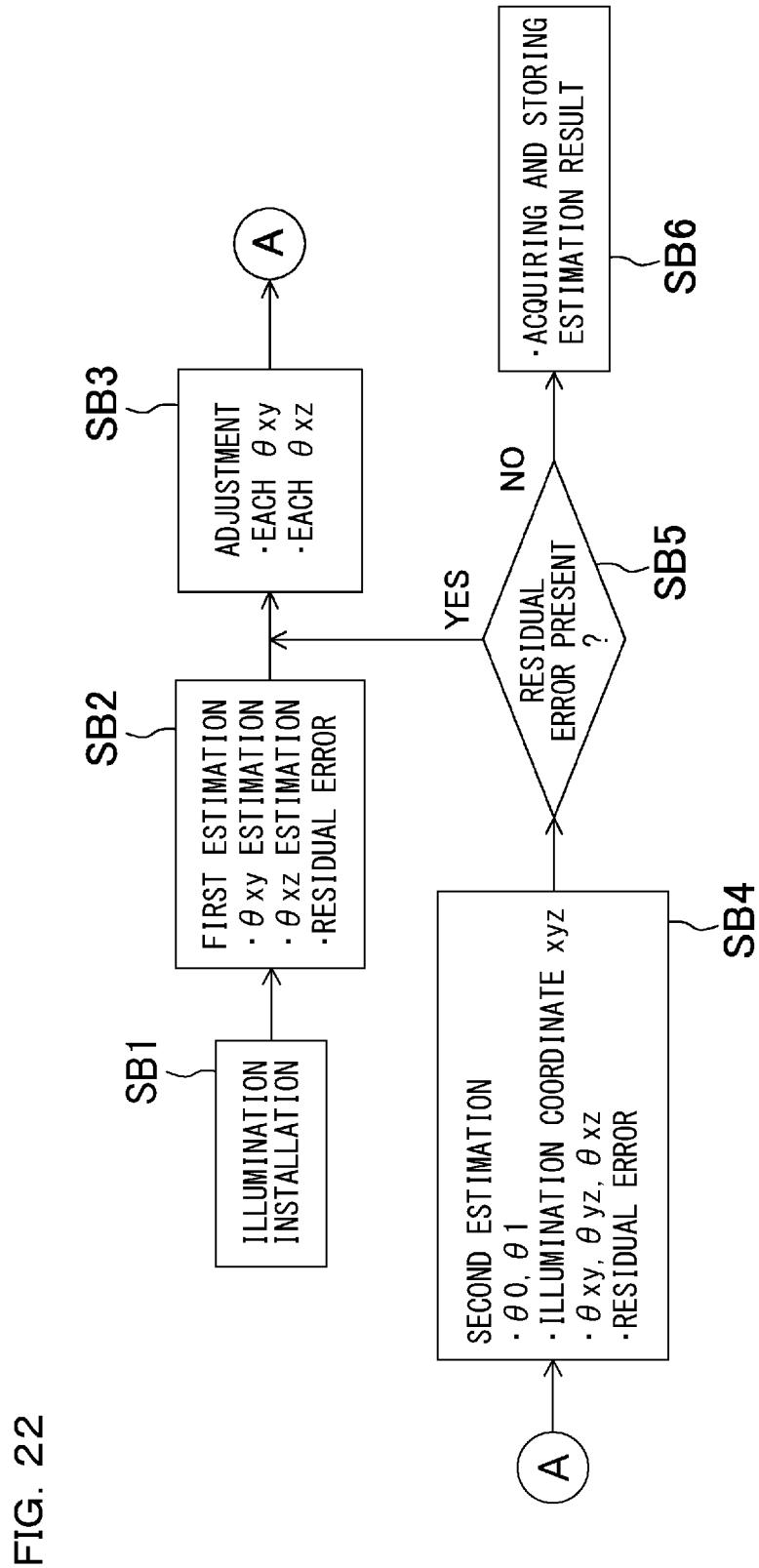
FIG. 22 is a diagram explaining a flow of estimation of a deviation and adjustment of each portion.

FIG. 22 is a diagram explaining a flow of estimation of a portion where correction is necessary, and adjustment of each portion for performing correction. First, illumination is installed in step SB1. For example the first LED 31*b* and the second LED 32*b* are attached to the illumination housing 30. Then, after θxy, θxz, and a residual error are estimated in a first estimation in step SB2, each θxy and each θxz are adjusted in step SB3. After adjustment, the process proceeds to step SB4, θ0, θ1, illumination coordinates X, Y, Z, θxy, θyz, θxz, and a residual error are estimated in a second estimation. In step SB5, it is determined whether there is a residual error or not, and when it is determined that there is a residual error, the process proceeds to step SB3 to perform each adjustment, and the second estimation is performed again. The adjustment and the second estimation are repeated until there is no residual error. When there is no residual error, the process proceeds to step SB6, where an estimation result is acquired and stored. The first estimation and the second estimation can be made the same. The above steps can be performed by an error estimating section 49a shown in FIG. 2.

Figure 23:
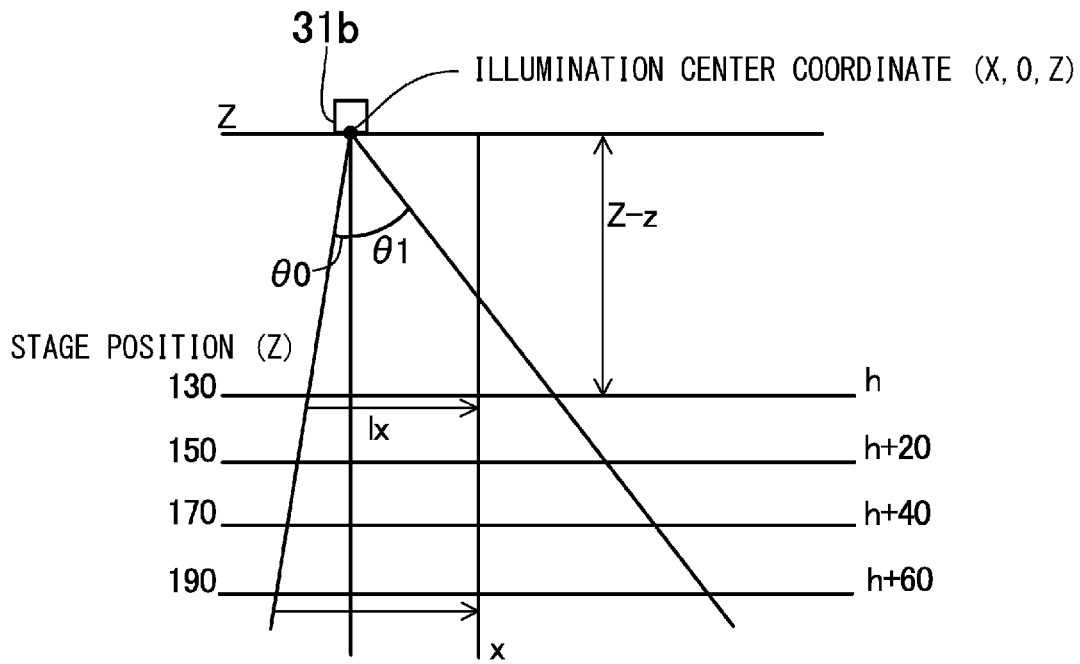
FIG. 23 is a schematic diagram explaining a method of estimating a deviation.

FIG. 23 is a schematic diagram explaining a specific method of estimating a deviation. A center coordinate of the first LED 31b is (X, 0, Z). A phase P of the coordinate x is as follows.

t0=tan θ0
t1=tan θ1
Base line length 1=(Z−z)*(t0+t1)
Distance from θ0 side end to x is 1x=(x−X)+(Z−z*t0
P=1x/1
P={(x−X)+(Z−z*t0}/{(Z−z*(t0+t1}

When the first LED 31b is tilted, it may be set that the illumination central position X has Y dependency.

X(y)=X0+axy*y
P={(x−(X0+a*y))+(Z−z)*t0}/{(Z−z*(t0+t1)}
  ={(x−(X0+a*y))}/{(Z−z*(t0+t1)}+t0/{t0+t1}

Unknown coefficients are summarized as follows.

t0—Irradiation width 0 of the first LED 31b
t1—Irradiation width 1 of the first LED 31b
X0—X coordinate of illumination center
a—Inclination xy of the first LED 31b (a=tan θxy)
Z—Height of the first LED 31b
P={(x−(X0+a*y))*Ti}/{(Z−z)+t0*Ti}

Here, an objective function of the least squares method is $J=(p-P)^2$. In the equation, p is a measured phase.

Since P is not a linear combination of unknown coefficients, it is necessary to use an iteration method such as the gradient method, and the Levenberg-Marquardt method may be used.

After each coefficient is obtained, t0, t1, and θxy are corrected.

t0'=t0/cos θxy
t1'=t1/cos θxy (Camera Calibration)

Figure 24:
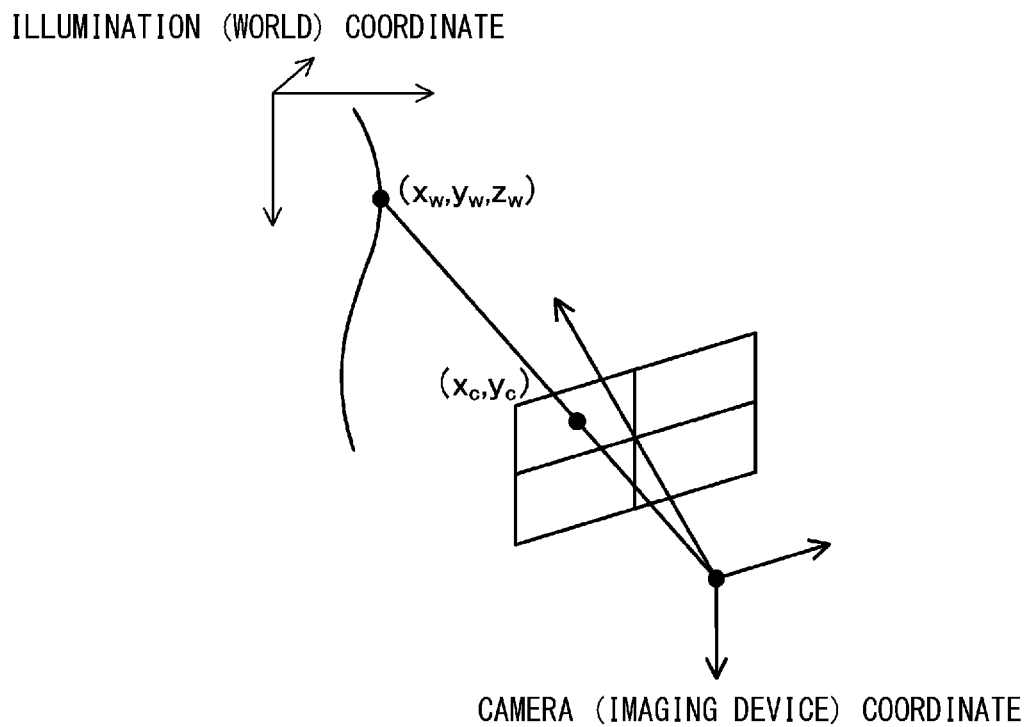
FIG. 24 is a conceptual diagram of camera calibration.

FIG. 24 is a diagram showing a concept of camera calibration. First, a coefficient (camera parameter) for associating a world coordinate with a camera coordinate is estimated. The "camera" refers to the imaging device 2. In the embodiment, the world coordinate=the illumination coordinate. In other words, the measurement pattern light can be projected onto the measuring object W by the two pairs, that is, the first light projecting section 31 and the second light projecting section 32, and the third light projecting section 33 and the fourth light projecting section 34, from different directions. Therefore, XYZ can be obtained without using a calibration board.

The camera coordinate corresponding to the world coordinate of the measuring object W is known. The height of the measuring object W is changed and images are taken a plurality of times. A sampling point (specific point) having a high reliability is used and the camera parameter is estimated by the conventionally known method of Tsai (1987). Although a flat plate is a premise in Tsai's paper, in the embodiment, X, Y, and Z coordinates are obtained using the heights of the first LED 31b and the second LED 32b. Therefore, it does not have to be a flat plate, and may be basically a free shape. However, since the phase may be deviated in cases, RANSAC, which is a robust estimation method, is used together to remove error factors.

FIG. 25A is a diagram illustrating a case of acquiring X, Y, and Z coordinates of a sampling point SP when the measuring object W is at an initial position (first height). As described above, the X, Y, and Z coordinates of the sampling point SP can be obtained using the first pattern image set, the second pattern image set, the third pattern image set, the fourth pattern image set, the distance information of the first LED 31b and the second LED 32b, and the distance information of the third LED 33b and the fourth LED 34b. FIG. 25B is a diagram illustrating a case of acquiring the X, Y, and Z coordinates of the sampling point SP when the measuring object W is at a position (second height) higher than the initial position. The X, Y, Z coordinates of the sampling point SP can be obtained in the same manner as in the case of FIG. 25A.

FIG. 26 shows mathematical formulae of a camera parameter matrix and a distortion model, and is used to obtain parameters for associating a world coordinate with a camera coordinate. Here, x and y are camera coordinates after a lens distortion is corrected, and are known. X, Y, and Z are world coordinates and are also known. Other parameters are estimated using x, y, X, Y, and Z. Here, s and a are a skew and an aspect ratio, respectively, and generally both may be 1. Here, tx and ty are center coordinates of an image sensor used as the imaging element 22, and f is a vertical and horizontal focal distance. R is a rotation matrix and T is a translation vector. In addition, k1, k2, p1, and p2 are distortion parameters.

Figure 27:
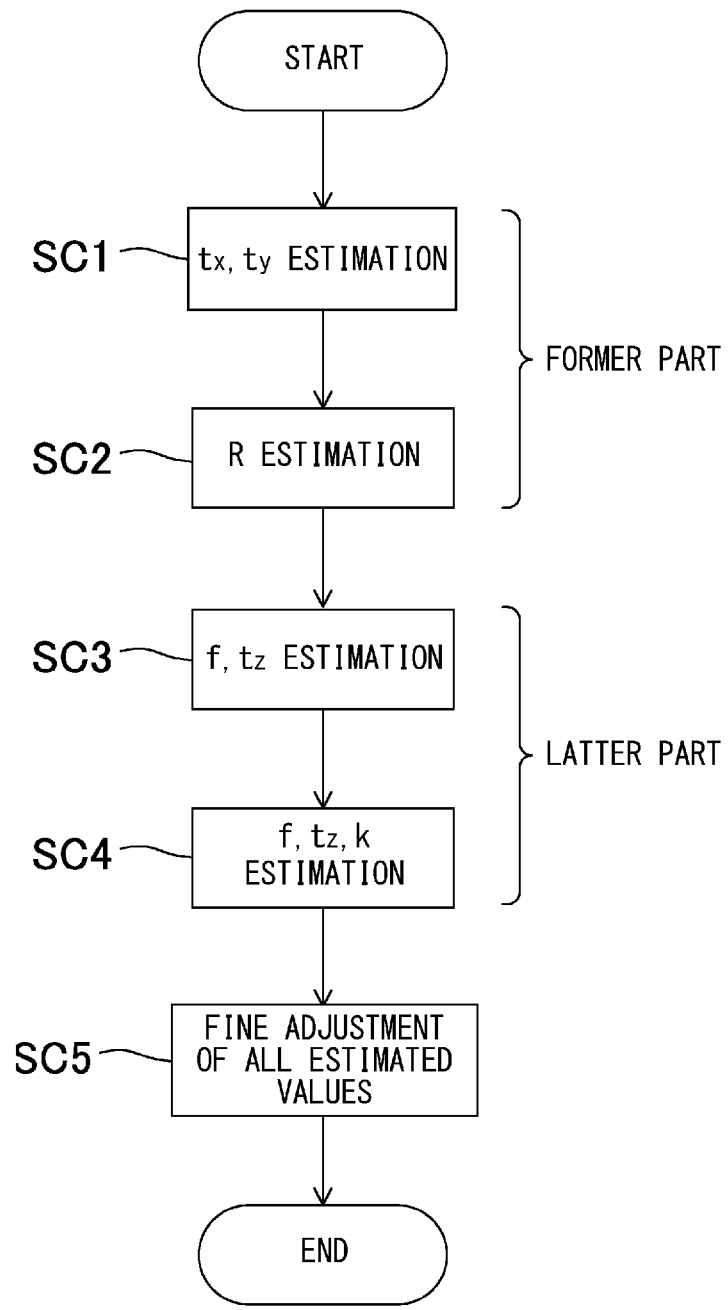
FIG. 27 is a flow chart showing an estimation procedure.

FIG. 27 is a flow chart showing an estimation procedure of each parameter. In step SC1, tx and ty are estimated, and in step SC2, R is estimated. Step SC1 and step SC2 are processing similar to 2D calibration, and tx, ty, and R are obtained relatively stably. However, when there is a pixel with an incorrect height at an edge of the visual field or the like, it will have a great influence. Therefore, robust estimation (RANZAC method) is performed.

In step SC3, f and tz are roughly estimated, and in step SC4, f and tz are precisely estimated and k is estimated. Step SC3 and step SC4 are processing for 3D calibration and lens distortion estimation, which have large variations and may not be stable by the least squares method. Therefore, the RANZAC method is applied. Step SC5 is not an essential step. However, it is a step of finely adjusting all estimated values.

The f and tz values are affected by outer side pixels (pixels outside the center of the image sensor) which are easily affected by an angle of field. Therefore, the pixels at the outer side of the image sensor maybe used when performing calibration. In addition, a point that is not affected by the angle of field can be omitted.

Further, in order to improve the reliability of the sampling point SP, information on X coordinate, Y coordinate, and Z coordinate of a point around the sampling point SP may be taken into account for the X coordinate, the Y coordinate, and the Z coordinate of the sampling point SP. For example, an average value (for example, 3×3, Median, etc.) of the X coordinates, the Y coordinates, and the Z coordinates of the sampling point SP and a point around the sampling point SP may be used as the X coordinate, the Y coordinate, and the Z coordinate of the sampling point SP. In this way, a highly reliable calibration target can be generated.

When the first LED 31*b*, the second LED 32*b*, the third LED 33*b*, and the fourth LED 34*b* are fixed and the phase P is known, the world coordinate (wx, wy, wz) can be derived from the camera coordinate (xf, yf) and the phase P.

The estimation of the aforementioned camera parameter can be performed by the controller section 4 shown in FIG. 1, etc. The camera parameter is a calibration target, and the generation of the camera parameter is performed by a calibration target generating section 48*a* shown in FIG. 2. The calibration target generating section 48*a* can, when generating a calibration target, use the X coordinate, the Y coordinate, and the Z coordinate of the sampling point SP on the surface of the measuring object W to generate the calibration target. That is, since the first pattern light generating section 31*d* and the second pattern light generating section 32*d* form a pair, and the third pattern light generating section 33*d* and the fourth pattern light generating section 34*d* form a pair, it becomes possible to sequentially project each pattern light onto the measuring object W from a plurality of different directions. As a result, blind spots of a pattern image decrease, and thus the X coordinate, the Y coordinate, and the Z coordinate of the sampling point SP can be measured based on each pattern image. The measurement result becomes a calibration target.

A calibration executing section 48*b* shown in FIG. 2 executes camera calibration using the calibration target generated by the calibration target generating section 48*a*. In this way, the world coordinate and the coordinate of the imaging device 2 are associated. Therefore, a calibration board is not required for associating the world coordinate and the coordinate of the imaging device 2.

(Adjustment Mechanism of Light Projecting Section)

Figure 28:
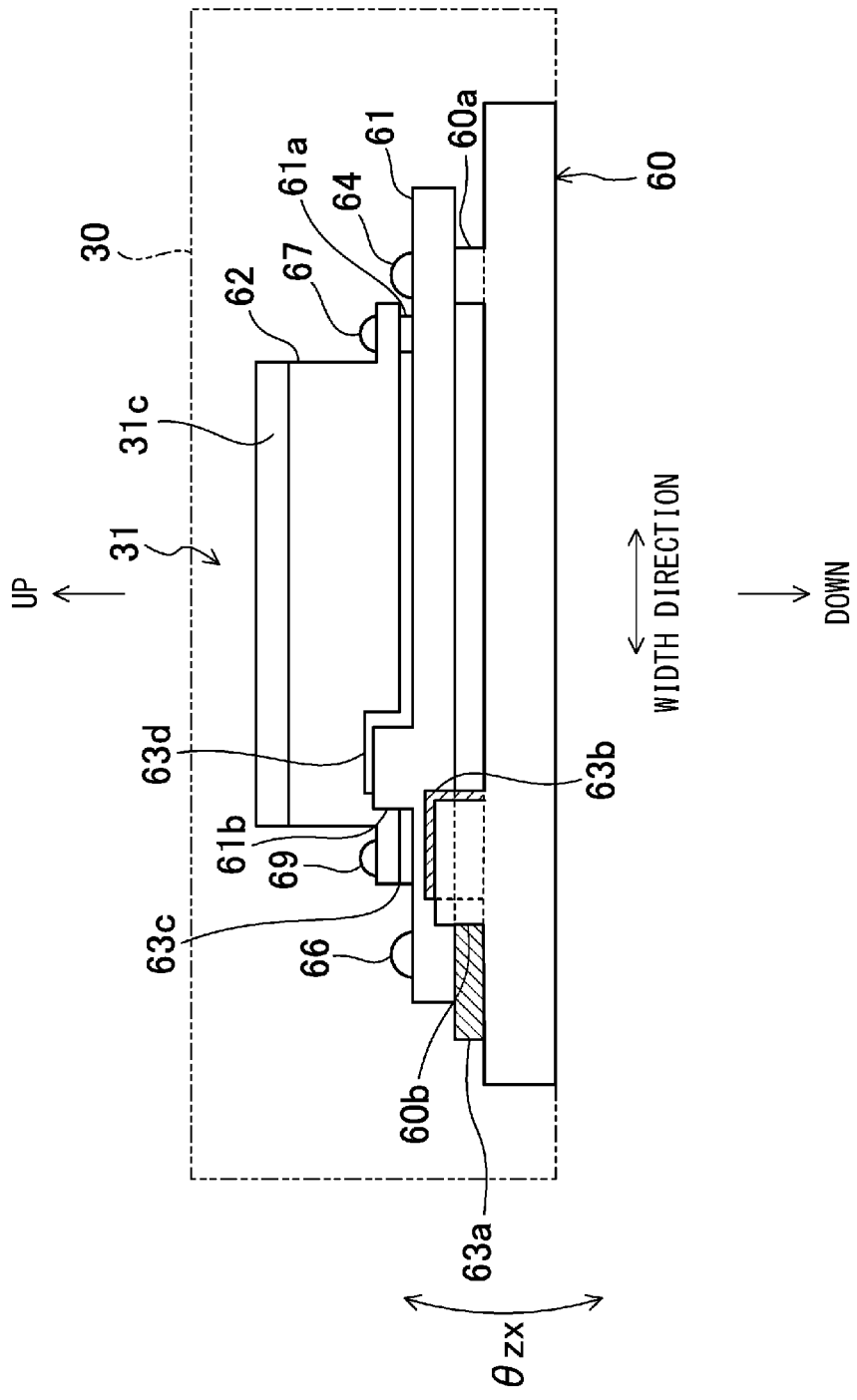
FIG. 28 is a side view showing a structural example of a first light projecting section having an adjustment mechanism.
Figure 29:
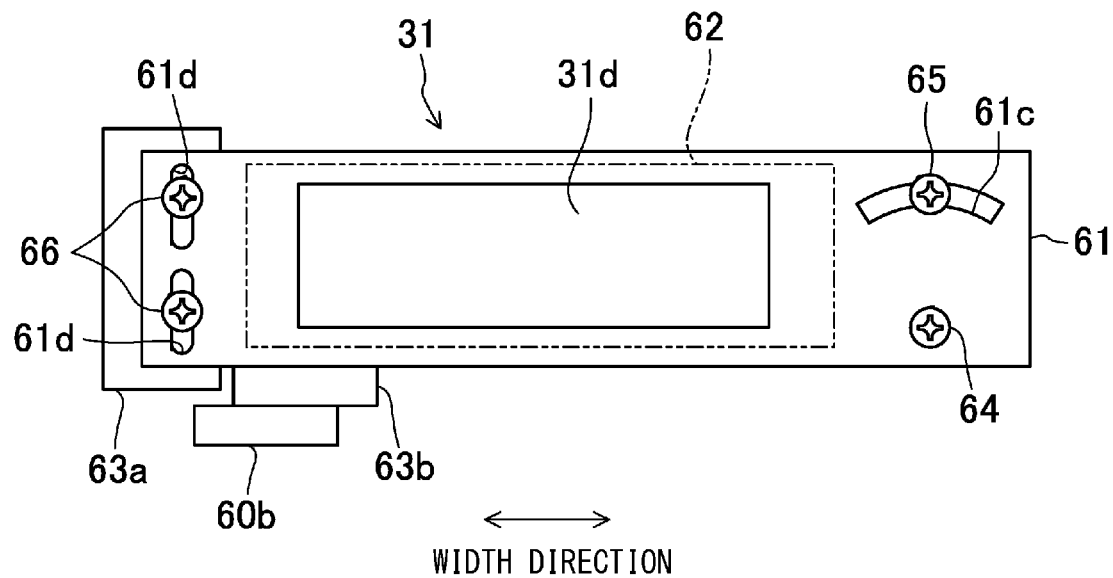
FIG. 29 is a plane view showing a structural example of a first light projecting section having an adjustment mechanism.

FIG. 28 and FIG. 29 show a structural example of the first light projecting section 31 including an adjustment mechanism. The illumination housing 30 of the illumination device 3 includes a base member 60, an LCD holder (first pattern light generating section holder member) 61 to which the first LCD 31*d* is fixed, and an LED holder (first light source holder member) 62 to which the first LED 31*b* is fixed. The LCD holder 61 is attached to the base member 60 such that the position of the LCD holder 61 is adjustable, and the LED holder 62 is also attached to the base member 60 such that the position of the LED holder 62 is adjustable. The width direction in FIG. 28 and FIG. 29 refers to a direction in which the first LEDs 31*b* are arranged.

That is, as shown in FIG. 28, on an upper surface of the base member 60, a boss portion 60*a* is provided so as to protrude upward, and a patch plate portion 60*b* is provided so as to protrude upward at a portion away from the boss portion 60*a* in the width direction. A first shim 63*a* (indicated by left-downward oblique lines in FIG. 28) is placed on the upper surface of the base member 60 at a portion away from the boss portion 60*a* in the width direction. The LCD holder 61 is placed on an upper end surface of the boss portion 60*a* and an upper surface of the first shim 63*a*. As shown in FIG. 29, the LCD holder 61 is fastened and fixed to the base member 60 by a first screw 64, a second screw 65, and two third screws 66. The first screw 64 and the second screw 65 are screwed into the boss portion 60*a* of the base member 60. The two third screws 66 are screwed into the base member 60 passing through the first shim 63*a*. Therefore, by changing the thickness of the first shim 63*a*, the inclination of the LCD holder 61, that is, the inclination of the LED holder 62 can be changed. In a word, θzx of the LED holder 62 can be adjusted, and θzx can be adjusted between the first light projecting section 31 and the second light projecting section 32.

An arc-shaped slit 61*c* into which the second screw 65 is inserted is formed in the LCD holder 61. The arc-shaped slit 61*c* extends so as to draw an arc centering a center line of the first screw 64. In addition, a slit 61*d* into which the third screw 66 is inserted is formed in the LCD holder 61. By forming the arc-shaped slit 61*c* and the slit 61*d*, the LCD holder 61 can be rotated around the center line of the first screw 64 and can be fixed at an arbitrary rotation position. A second shim 63*b* (indicated by right-downward oblique lines in FIG. 28) is arranged between the patch plate portion 60*b* of the base member 60 and a side surface of the LCD holder 61 As a result, by changing the thickness of the second shim 63*b*, the direction of the LCD holder 61, that is, the direction of the LED holder 62 can be changed. In a word, θxy of the LED holder 62 can be adjusted, and θxy can be adjusted between the first light projecting section 31 and the second light projecting section 32.

As shown in FIG. 28, on an upper surface of the LCD holder 61, a boss portion 61*a* is provided so as to protrude upward, and a patch plate portion 61*b* is provided so as to protrude upward at a portion away from the boss portion 61*a* in the width direction. A third shim 63*c* is placed on the upper surface of the LCD holder 61 at a portion away from the boss portion 61*a* in the width direction. The LED holder 62 is placed on an upper end surface of the boss portion 61*a* and an upper surface of the third shim 63*c*. The LED holder 62 is fastened and fixed to the LCD holder 61 in the same manner as the fixing structure of the LCD holder 61 to the base member 60. Therefore, by changing the thickness of the third shim 63*c*, θzx of the LED holder 62 can be adjusted. In this case, θzx can be adjusted in the first light projecting section 31.

Further, a fourth shim 63*d* is arranged between the patch plate portion 61*b* of the LCD holder 61 and a side surface of the LED holder 62. Therefore, by changing the thickness of the fourth shim 63*d*, θxy of the LED holder 62 can be adjusted. In this case, θxy can be adjusted in the first light projecting section 31. Each adjustment is performed such that errors during height measurement are minimized.

Figure 30:
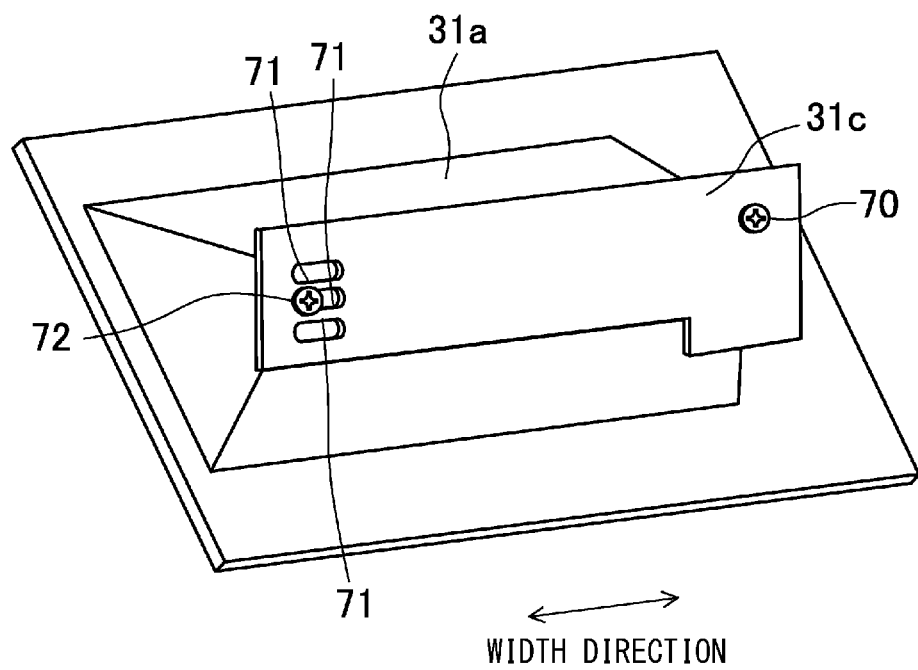
FIG. 30 is a perspective view showing a structural example of a first light projecting section having another adjustment mechanism.

In the structural example shown in FIG. 30, one end side in the width direction of the substrate 31*c* on which the first LED 31*b* is mounted is fixed to a casing 31*a* by a screw 70. On the other end side in the width direction of the substrate 31*c*, a plurality of long holes 71 that are long in the width direction of the substrate 31*c* are provided at intervals. A screw 72 is screwed into a portion corresponding to each long hole 71 in the casing 31*a*. By selecting a position to be fastened with the screw 72 on the substrate 31*c*, the angle of the substrate 31*c*, that is, the angle of the first LED 31*b* can be adjusted.

In the case of the structural example shown in FIG. 30, the first LED 31*b* and the first LCD 31*d* are integrated via the casing 31*a*, and it is easy to improve the positional accuracy of each other. However, it is inevitable that a manufacturing error may occur. When an error occurs, the substrate 31*c* may be rotated so as to minimize the errors during height measurement.

In addition, the aforementioned adjustment mechanism can also be provided in the second light projecting section 32, the third light projecting section 33, and the fourth light projecting section 34.

(Change of Segment-in-Use)

Figure 31A:
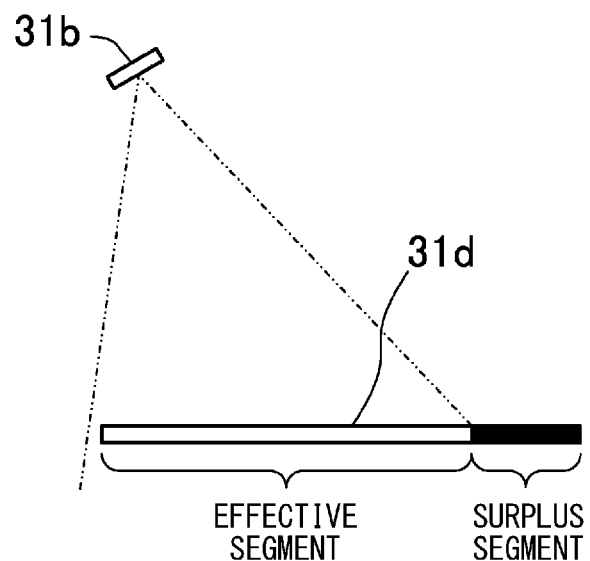
FIGS. 31A and B are diagrams explaining a segment in use before and after a change.

Each error can be estimated by the error estimating section 49*a* shown in FIG. 2, and in this case, a projection error of the pattern light projected by the first LCD 31*d* can also be estimated. FIG. 31A shows a state in which the relative position between the first LED 31*b* and the first LCD

31*d* is deviated and light emitted from the first LED 31*b* reaches the outside of the first LCD 31*d*. In this case, the first LCD 31*d* having a size larger than the irradiation range (0° to 45°) of the first LED 31*b* is used, and an effective segment and a surplus segment are secured.

Figure 31B:
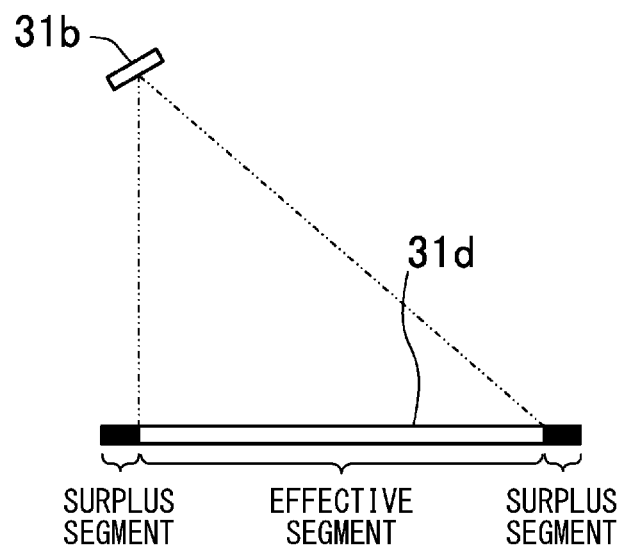

As shown in FIG. 31B, the first LED 31*b* is aligned with a visual field as designed, and a projection pattern can be generated from the segment positioned directly below the first LED 31*b*. A segment-in-use of the first LCD 31*d* is determined so as to correct the projection error of the pattern light projected by the first LCD 31*d* based on an estimation result of the error estimating section 49*a*. This is performed by a segment-in-use determining section 49*b* shown in FIG. 2.

The effective segment in FIG. 31B is a segment that forms a pattern, and the surplus segment is a segment that does not contribute to pattern formation. A start position and an end position of the effective segment can be arbitrarily set, and can be determined such that the projection errors of the pattern light are minimized. Since the change of the segment-in-use can be performed on software, it is easier as compared with an adjustment by a physical adjustment mechanism. In the case of the phase shift method, it is only necessary to shift the phase while irradiating the entire region, and thus the start position and the end position of the effective segment do not need to be the projection ends. In the case of gray code, since it is always an all black pattern outside the irradiation range, in general, a boundary between the all black pattern and another space code can be the start position and the end position.

The change of the segment-in-use is also possible in the third light projecting section 33 and the fourth light projecting section 34.

(Relation Between Illumination Structure Error and Correction Method)

Most of the errors described above are caused by the structure of illumination. For example, θxy and θzx between the first light projecting section 31 and the second light projecting section 32, and θxy and θzx of each of the light projecting sections 31 to 34 can be corrected by the aforementioned adjustment mechanism. Further, a visual field (θ0, θ1) can be corrected by changing the segment-in-use. In addition, the visual field (θ0, θ1) and a tilt angle θyz can be corrected by absolute phase correction. Further, the distance (1) between the LEDs of the paired light projecting sections and the height difference (d) of the LEDs of the paired light projecting sections can be corrected by parameters at the time of height measurement.

(Correction During Operation)

When there is a deviation in the height direction of the first LED 31*b* and the second LED 32*b* or a deviation in the height direction of the third LED 33*b* and the fourth LED 34*b* due to the influence of ambient temperature and the like, the deviation can be corrected during operation of the image processing apparatus 1. For example, the height of the first LED 31*b* is assumed to be true, and calibration is performed by the least squares method.

(During operation of image processing apparatus 1) Next, the operation of the image processing apparatus 1 will be described. FIG. 32 to FIG. 36 show a case where the measuring object W is a rectangular parallelepiped box and is measured by projecting pattern light from the first light projecting section 31 and the second light projecting section 32.

Figure 32:
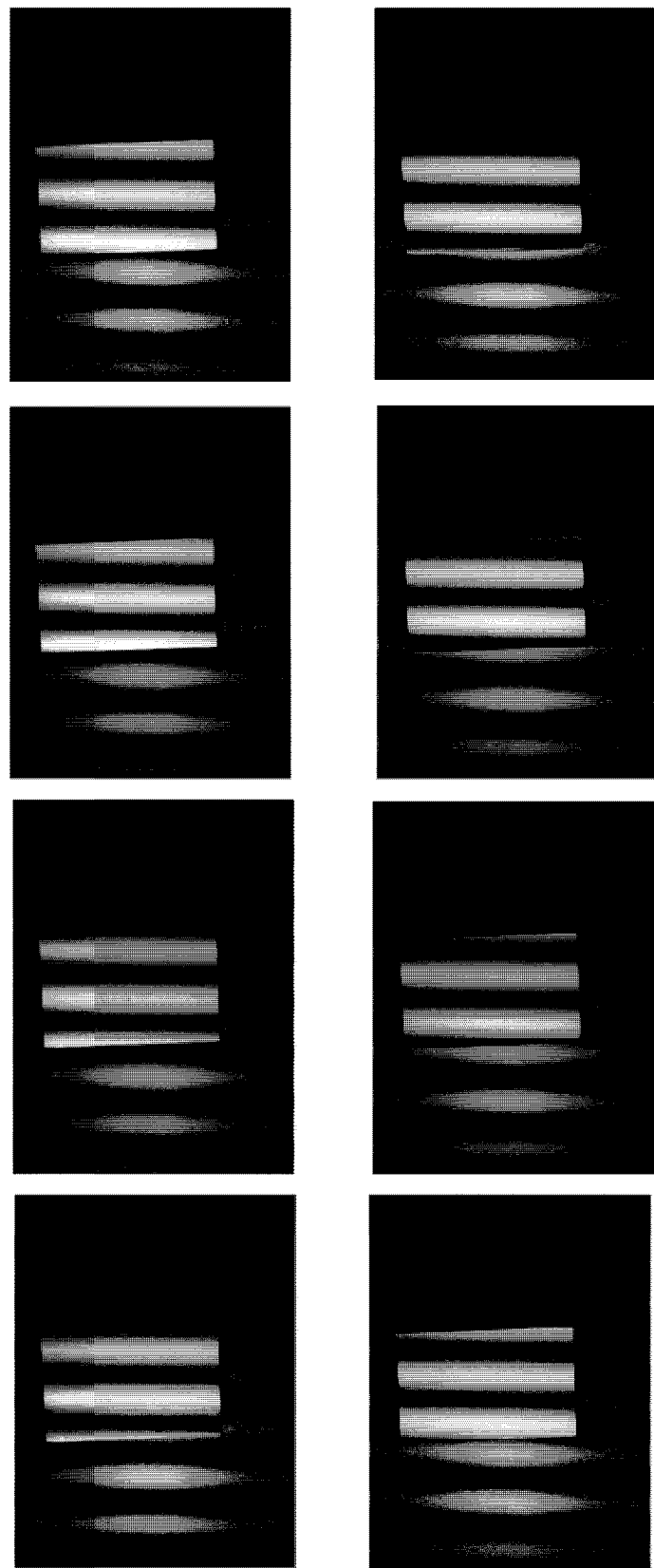
FIG. 32 is a diagram showing a phase shift pattern image set obtained by projecting pattern light by the first light projecting section when a measuring object is a rectangular parallelepiped box.

First, when the user places the measuring object W on the placement surface 100 and performs a measurement start operation or an inspection start operation, eight pattern lights for the phase shift method are sequentially generated and projected onto the measuring object W from the first light projecting section 31 and the second light projecting section 32, respectively. The imaging device 2 captures images at the timing when each pattern light is projected. The phase shift pattern image set shown in FIG. 32 is images obtained by imaging the pattern light projected onto the measuring object W from the first light projecting section 31. When a phase image is generated based on the phase shift pattern image set shown in FIG. 32, it becomes a phase image as shown on the left side in FIG. 33. When an intermediate image is generated from the phase image, it becomes the image shown on the right side in FIG. 33. Note that the gray code pattern image is not shown.

Figure 34:
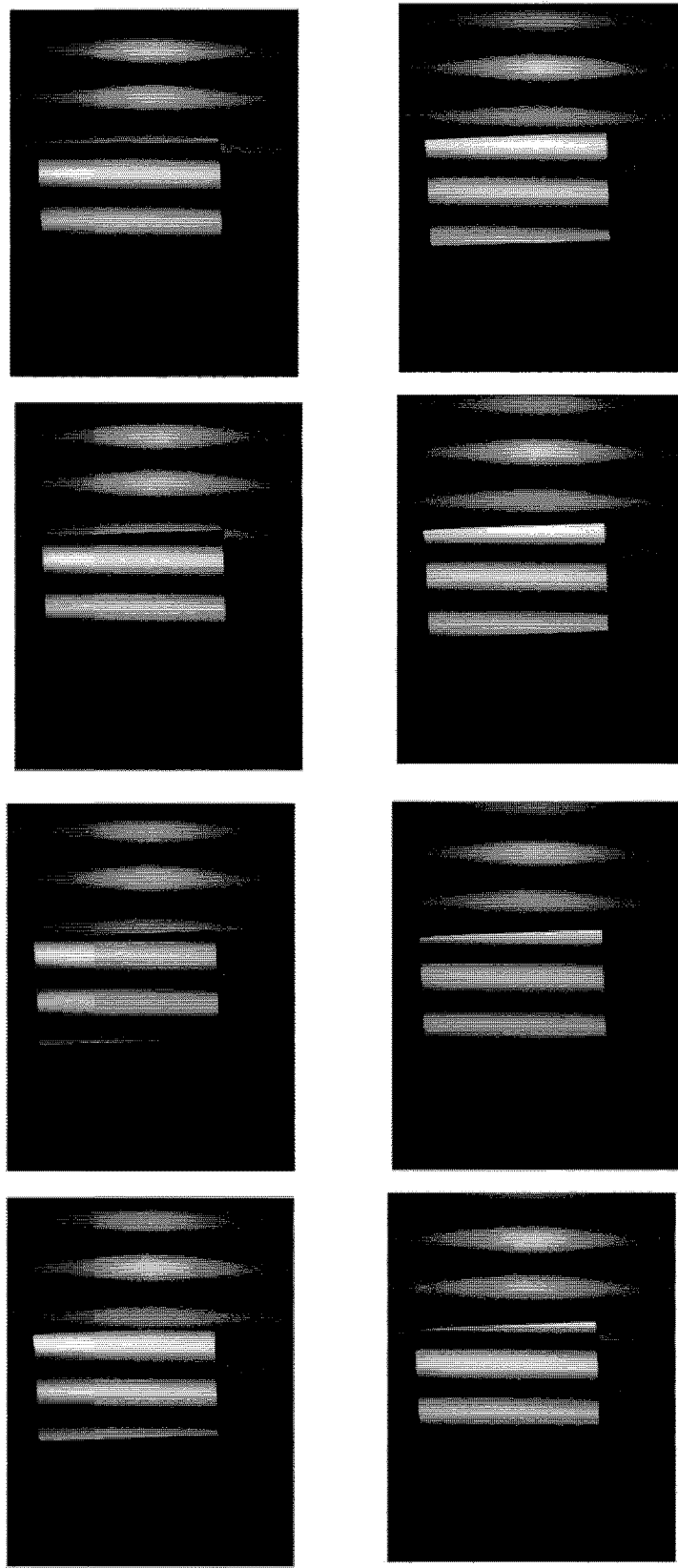
FIG. 34 is a diagram showing a phase shift pattern image set obtained by projecting pattern light by a second light projecting section when a measuring object is a rectangular parallelepiped box.

On the other hand, the phase shift pattern image set shown in FIG. 34 is images obtained by imaging the pattern light projected onto the measuring object W from the second light projecting section 32. When a phase image is generated based on the phase shift pattern image set shown in FIG. 34, it becomes a phase image as shown on the left side in FIG. 35. When an intermediate image is generated from the phase image, it becomes the image shown on the right side in FIG. 35.

Figure 33:
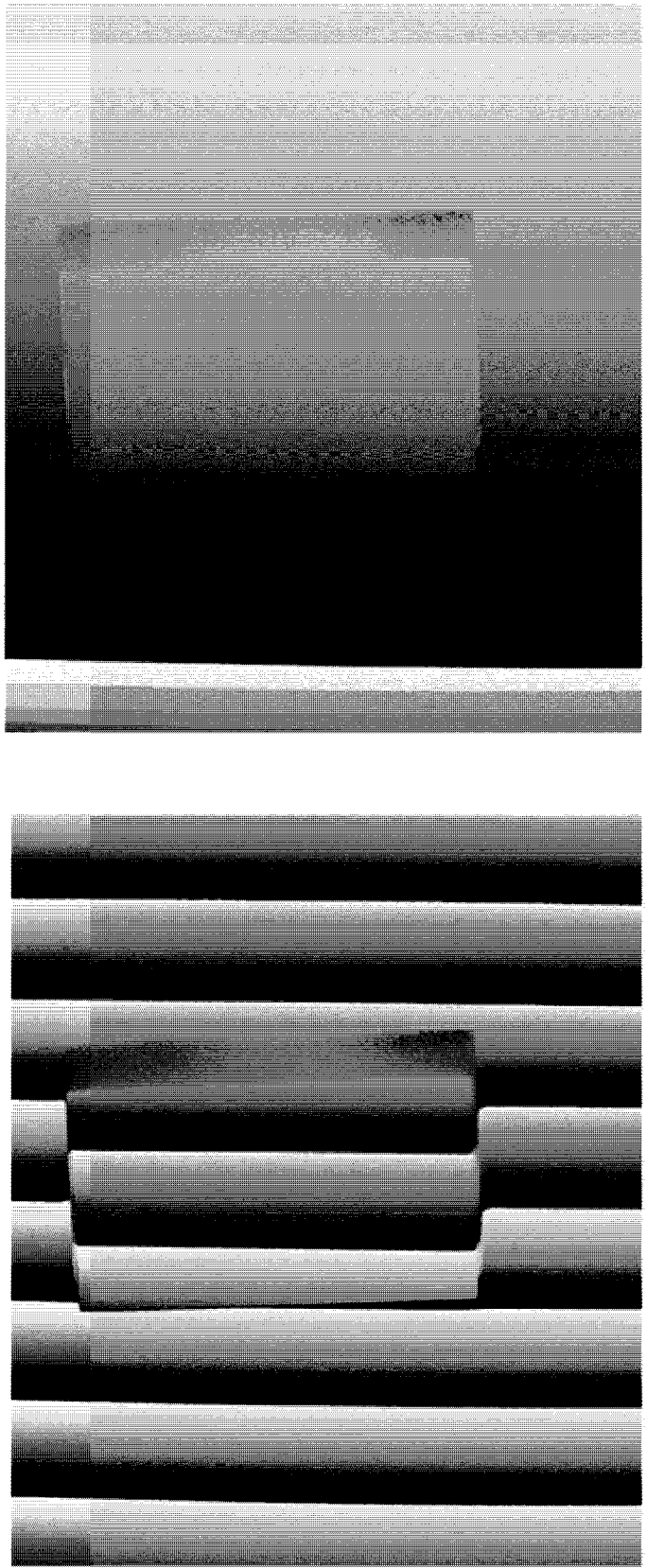
FIG. 33 is a diagram showing a relative phase image obtained based on the phase shift pattern image set shown in FIG. 32, and an intermediate image corresponding to the phase shift pattern image set shown in FIG. 32.

When the intermediate image shown on the right side in FIG. 33 and the intermediate image shown on the right side in FIG. 35 are synthesized, a height image as shown on the left side in FIG. 36 is generated. A cross-sectional shape in the vertical direction of the height image can be displayed on the display section 5 by a user interface as shown on the right side in FIG. 36.

When the measurement start operation or the inspection start operation is performed, eight pattern lights for the phase shift method are sequentially generated and projected onto the measuring object W from the third light projecting section 33 and the fourth light projecting section 34, respectively. The imaging device 2 captures images at the timing when each pattern light is projected.

(Effect of Embodiment)

As described above, according to the embodiment, a plurality of first pattern images and second pattern images can be generated by the first light projecting section 31 that projects the first measurement pattern light, the second light projecting section 32 that projects the second measurement pattern light, and the imaging device 2. The first angle image in which each pixel has the irradiation angle information of the first measurement pattern light onto the measuring object W and the second angle image in which each pixel has the irradiation angle information of the second measurement pattern light onto the measuring object W can be generated based on the first pattern images and the second pattern images.

Since the relative position between the first light projecting section 31 and the second light projecting section 32 inside the illumination housing 30 of the illumination device 3 is known, the height of the measuring object W in the direction of the central axis A of the illumination device 3 can be measured based on the relative position information, the irradiation angle information of each pixel of the first angle image, and the irradiation angle information of each pixel of the second angle image regardless of the relative positional relation between the imaging device 2 and the illumination device 3.

In a word, when the illumination device 3 and the imaging device 2 are separately provided so that they can be installed separately to increase the degree of freedom during installation, an absolute shape of the measuring object W can be measured even without strictly adjusting the position of the imaging device 2 with respect to the illumination device 3. Therefore, the burden on the user during installation is not increased.

Further, since a liquid crystal panel is used for the illumination device 3 as a unit for generating pattern light, a reflection optical system as in a case of using a DMD becomes unnecessary, and a drive system as in a case of moving a mask having a pattern also becomes unnecessary. Therefore, the configuration of the illumination device 3 is simplified and the illumination device 3 is miniaturized. Particularly in the case of a reflection optical system, the optical system including a lens is expensive and strict accuracy is required. A pattern maybe distorted due to the occurrence of distortion of the lens, which may cause deterioration in the accuracy. However, the embodiment can have an effect that such a risk can be avoided.

Moreover, the first LED 31b and the second LED 32b are provided apart from each other in the circumferential direction of the opening 30a of the illumination housing 30, and the first LCD 31d and the second LCD 32d onto which the diffused light emitted from the first LED 31b and the second LED 32b is respectively incident are provided on the same plane orthogonal to the central axis A of the opening 30a of the illumination housing 30. Therefore, it is possible to miniaturize the illumination device 3 which is capable of projecting pattern light from a plurality of directions to the measuring object W and increase the degree of freedom of installation of the illumination device 3 while suppressing occurrence of luminance unevenness corresponding to the position of the pattern light due to the angle characteristics of each of the LCDs 31d and 32d.

In addition, since the relative position between the first LCD 31d and the first LED 31b is set such that the diffused light emitted from the first LED 31b is incident on the first LCD 31d within an effective angle range of the first LCD 31d, it is possible to miniaturize the illumination device 3 while suppressing the occurrence of luminance unevenness corresponding to the position of the pattern light due to the angle characteristics of the first LCD 31d.

Further, when the dimension of the light emitting surface of the first LED 31b is equal to or less than the dimension of a half cycle of the wave of the pattern light, the plurality of first LEDs 31b are arranged so as to be deviated from each other in a direction in which the illuminance of the pattern light changes. Therefore, the apparent dimension of the light emitting surface can be made longer than the dimension of the half cycle of the wave of the pattern light. In this way, it is possible to generate wave-shaped pattern light as intended and to prevent the occurrence of high-frequency waviness in the height image.

Moreover, the positional deviation of the first LED 31b can be corrected by providing an adjustment mechanism in the first light projecting section 31 and making it possible to change the segment-in-use. In this way, an accurate measurement result can be obtained when measuring the height of the measuring object W based on the irradiation angle information of the first LED 31b and the second LED 32b as well as the relative position between the two LEDs 31b and 32b.

In addition, since a calibration target can be generated based on a pattern image obtained by receiving measurement pattern light, it is possible to associate the world coordinate with the coordinate of the imaging device 3 without using a calibration board.

The embodiment described above is merely an example in all respects and should not be interpreted in a limited way.

Moreover, all variations and modifications falling into an equivalent scope of the scope of the claims are within the scope of the invention.

For example, it is possible to provide a program configured to be capable of realizing the processing and functions described above on a computer to realize the aforementioned processing and functions on a user's computer.

Further, the form of providing the program is not particularly limited. For example, there are a method of providing by using a network line of the Internet, etc., a method of providing a recording medium in which the program is stored, etc. In any of the providing methods, the aforementioned processing and functions can be realized by installing a program on the user's computer.

Moreover, as an apparatus which realizes the aforementioned processing and functions, it includes a general-purpose or dedicated apparatus on which the aforementioned program has been mounted in an executable state in forms of software, firmware, etc. In addition, a part of the aforementioned processing and functions may be realized in a form of being mixed with hardware such as a predetermined gate array (FPGA, ASCI), or with a partial hardware module that realizes a part of the elements of the program software and hardware.

In addition, the aforementioned processing and functions may also be realized by a combination of steps (processes). In this case, the user executes the image processing method.

In the embodiment, description has been made to the case where the pattern light generating section is a liquid crystal panel. However, it is not limited thereto, and for example, the pattern light generating section may be one using a DMD (digital micro-mirror device) or one that moves a mask on which a pattern has been physically formed. In addition, the light source is not limited to a light emitting diode.

As described above, the image processing apparatus according to the invention can be used in, for example, a case of measuring a height of a measuring object or a case of inspecting a measuring object.

What is claimed is:

1. An image processing apparatus which measures a height of a measuring object, wherein the image processing apparatus includes
an illumination device including a light source including a plurality of light emitting diodes, a liquid crystal panel onto which light emitted from the light source is incident, and a light projection control section which controls the light source and the liquid crystal panel such that a sinusoidal pattern light whose illuminance changes in one direction is projected a plurality of times onto the measuring object by shifting the phase of the pattern light,
an imaging device which receives reflected light from the measuring object of the pattern light projected from the liquid crystal panel and generates a pattern image set,
an inspection target image generating section which generates an inspection target image including height information of the measuring object in a central axis direction of the illumination device based on the pattern image set generated by the imaging device, and
an inspecting section which executes inspection processing based on the inspection target image generated by the inspection target image generating section,
a dimension of light emitting surfaces of the light emitting diodes in a direction parallel to the direction in which the illuminance of the pattern light changes is set to be equal to or less than a dimension of a half cycle of the sine-wave formed in the liquid crystal panel, and the plurality of light emitting diodes are arranged in a direction in which the illuminance of the pattern light does not change, and are deviated from each other in a direction in which the illuminance of the pattern light changes.

2. The image processing apparatus according to claim 1, wherein
the plurality of light emitting diodes are arranged such that a center of the light emitting surfaces is positioned within a predetermined range in a direction in which the illuminance of the pattern light changes,
the plurality of light emitting diodes include a one-end light emitting diode, a center of the light emitting surface of which is positioned at one end of the predetermined range, and
an other-end light emitting diode, a center of the light emitting surface of which is positioned at the other end of the predetermined range.

3. The image processing apparatus according to claim 2, wherein
the plurality of light emitting diodes include an intermediate light emitting diode, a center of the light emitting surface of which is positioned in a middle of the predetermined range.

4. The image processing apparatus according to claim 3, wherein
there are a plurality of the intermediate light emitting diodes, and
the plurality of intermediate light emitting diodes are arranged so as to be deviated in a direction in which the illuminance of the pattern light changes.

5. The image processing apparatus according to claim 4, wherein
the plurality of intermediate light emitting diodes are arranged in a direction in which the illuminance of the pattern light does not change, and are arranged such that the centers of the light emitting surfaces are deviated in multiple stages from a vicinity of one end to a vicinity of the other end of the predetermined range.

6. The image processing apparatus according to claim 2, wherein
the light projection control section causes, when generating the pattern light, a region that transmits light and a region that does not transmit light to be alternately formed on the liquid crystal panel with a same width in a direction in which the sine-wave is continuous, and
a dimension of the light emitting surfaces of the light emitting diodes in the direction in which the sine-wave is continuous is set to be equal to or less than a width of the region that does not transmit light.

7. The image processing apparatus according to claim 1, wherein
a ratio between the dimension of the half cycle of the sine-wave formed on the liquid crystal panel and the dimension in the direction in which the sine-wave is continuous on the apparent light emitting surfaces of the plurality of light emitting diodes is set within a range of 1:1.2 to 1:1.4.

8. An image processing apparatus which measures a height of a measuring object, wherein the image processing apparatus includes
an illumination device including a light source including a plurality of light emitting diodes, a liquid crystal panel onto which light emitted from the light source is incident, and a light projection control section which controls the light source and the liquid crystal panel such that a sinusoidal pattern light whose illuminance changes in one direction is projected a plurality of times onto the measuring object by shifting the phase of the pattern light,
an imaging device which receives reflected light from the measuring object of the pattern light projected from the liquid crystal panel and generates a pattern image set,
an inspection target image generating section which generates an inspection target image including height information of the measuring object in a central axis direction of the illumination device based on the pattern image set generated by the imaging device, and
an inspecting section which executes inspection processing based on the inspection target image generated by the inspection target image generating section,
a dimension of light emitting surfaces of the light emitting diodes in a direction parallel to the direction in which the illuminance of the pattern light changes is set to be equal to or less than a dimension of a half cycle of the sine-wave, and
a diffusing unit that diffuses light emitted from the light emitting surfaces and makes the light incident on the liquid crystal panel is provided between the light emitting surfaces of the light emitting diodes and the liquid crystal panel.

9. The image processing apparatus according to claim 8, wherein
the diffusing unit is a diffusing plate or a diffusing lens.

* * * * *